US008401496B2

(12) United States Patent
Goto et al.

(10) Patent No.: US 8,401,496 B2
(45) Date of Patent: Mar. 19, 2013

(54) SEMICONDUCTOR ANTENNA SWITCH

(75) Inventors: Satoshi Goto, Kawasaki (JP); Masao Kondo, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 130 days.

(21) Appl. No.: 13/113,743

(22) Filed: May 23, 2011

(65) Prior Publication Data

US 2011/0294445 A1 Dec. 1, 2011

(30) Foreign Application Priority Data

May 25, 2010 (JP) ................................ 2010-119473

(51) Int. Cl.
*H04B 1/44* (2006.01)

(52) U.S. Cl. ........... 455/83; 455/333; 455/26.1; 455/78; 257/280; 343/876

(58) Field of Classification Search .................... 455/83, 455/333, 26.1, 78, 425, 550.1, 556.1, 560; 257/280, 281, 341; 343/876
See application file for complete search history.

(56) References Cited

U.S. PATENT DOCUMENTS

| | | | | |
|---|---|---|---|---|
| 6,256,000 | B1 * | 7/2001 | Yanagisawa et al. | 343/903 |
| 6,996,376 | B2 * | 2/2006 | Clifton | 455/78 |
| 7,010,274 | B2 * | 3/2006 | Choi | 455/83 |
| 8,244,199 | B2 * | 8/2012 | Goto et al. | 455/333 |
| 2004/0116082 | A1 * | 6/2004 | Choi | 455/121 |
| 2010/0188163 | A1 * | 7/2010 | Goto et al. | 333/103 |
| 2011/0001543 | A1 * | 1/2011 | Kondo et al. | 327/419 |

FOREIGN PATENT DOCUMENTS

JP 2008-011320 1/2008

* cited by examiner

*Primary Examiner* — Minh D Dao
(74) *Attorney, Agent, or Firm* — Womble Carlyle

(57) ABSTRACT

A semiconductor antenna switch has an antenna terminal, a transmission terminal and a reception terminal. The antenna switch is capable of reducing harmonic distortion even though it includes field effect transistors formed over a silicon substrate. A shunt transistor including a plurality of series-connected field effect transistors is connected between the transmission terminal and a common terminal, such as a common terminal, which may be an electrical ground. Off capacitances and/or gate widths of a plurality of the series-connected field effect transistors increase monotonically in the direction from the common terminal to the transmission terminal, or equivalently, decrease monotonically in the direction from the transmission terminal to the common terminal.

25 Claims, 28 Drawing Sheets

$$V_{L1(peak)} > V_{L2(peak)} > V_{L3(peak)} > V_{L4(peak)} > V_{L5(peak)}$$

$$Coff1 = Coff2 = Coff3 = Coff4 = Coff5 = Coff$$

$$V_{L1(peak)} \propto \frac{(Q - Qa)}{Coff}, V_{L2(peak)} \propto \frac{(Q - 2Qa)}{Coff}, V_{L3(peak)} \propto \frac{(Q - 3Qa)}{Coff} \quad \cdots$$

$$V_{L1(peak)} > V_{L2(peak)} > V_{L3(peak)} > V_{L4(peak)} > V_{L5(peak)}$$

$$Coff1 > Coff2 > Coff3 > Coff4 > Coff5$$

$$V_{L1(peak)} \propto \frac{(Q-Qa)}{Coff1},\ V_{L2(peak)} \propto \frac{(Q-2Qa)}{Coff2},\ V_{L3(peak)} \propto \frac{(Q-3Qa)}{Coff3}\ \cdots$$

$$\frac{(Q-Qa)}{Coff1} \cong \frac{(Q-2Qa)}{Coff2} \cong \frac{(Q-3Qa)}{Coff3} \cong \frac{(Q-4Qa)}{Coff4} \cong \frac{(Q-5Qa)}{Coff5}$$

$$V_{L1(peak)} \cong V_{L2(peak)} \cong V_{L3(peak)} \cong V_{L4(peak)} \cong V_{L5(peak)}$$

Ca > Cb > Cc > Cd $$\left(\frac{Ca\,Ca'}{Ca+Ca'}\right)>\left(\frac{Cb\,Cb'}{Cb+Cb'}\right)>\left(\frac{Cc\,Cc'}{Cc+Cc'}\right)>\left(\frac{Cd\,Cd'}{Cd+Cd'}\right)$$

$$\left[Ca+\left(\frac{Ca'Ca''}{Ca'+Ca''}\right)\right]>\left[Cb+\left(\frac{Cb'Cb''}{Cb'+Cb''}\right)\right]>\left[Cc+\left(\frac{Cc'Cc''}{Cc'+Cc''}\right)\right]>\left[Cd+\left(\frac{Cd'Cd''}{Cd'+Cd''}\right)\right]$$

SEMICONDUCTOR ANTENNA SWITCH

CROSS-REFERENCE TO RELATED APPLICATIONS

The disclosure of Japanese Patent Application No. 2010-119473 filed on May 25, 2010 including the specification, drawings and abstract is incorporated herein by reference in its entirety.

BACKGROUND

The present invention relates to a semiconductor device, and particularly to a technique effectively applied to a semiconductor antenna switch mounted onto radio communication equipment, for example.

Japanese Unexamined Patent Publication No. 2008-11320 (patent document 1) has described a configuration in which the gate widths of some field effect transistors in a plurality of stages of field effect transistors coupled in series are set narrower than those of other field effect transistors, and capacitors having fixed capacitances are respectively coupled between the gates and drains of the field effect transistors set narrow in gate width and between the gates and sources thereof.

SUMMARY

In recent portable phones, not only a voice call function but also various application functions have been added. Namely, the functions of watching and listening to distributed music, video transmission, data transfer, and the like using a portable phone, other than the voice call function, have been added to the portable phone. With the progress of such a multi-function of portable phone, there exist a number of frequency bands (GSM (Global System for Mobile communications) band, PCS (Personal Communication Services) band, and the like) and a number of modulation schemes (GSM, EDGE (Enhanced Data rates for GSM Evolution), WCDMA (Wideband Code Division Multiplex Access), and the like) around the world. Accordingly, a portable phone needs to deal with transmission/reception signals accommodating a plurality of different frequency bands and different modulation schemes. Therefore, in such a portable phone, one antenna is shared between transmission and reception of these transmission/reception signals, and switching of coupling to the antenna is performed by an antenna switch.

For example, in a portable phone, the power of a transmission signal becomes usually high as such as exceeding 1 W. The antenna switch is therefore required to have performance to secure high quality in high-power transmission signals and reduce the generation of interfering waves (high-order harmonics) adversely affecting communications in other frequency bands. Therefore, when a field effect transistor is used as a switching element that configures the antenna switch, the field effect transistor is required to have not only high breakdown-voltage characteristics but also performance that can reduce high-order harmonic distortion.

In view of the foregoing, as the field effect transistor that configures the antenna switch, a field effect transistor (e.g., HEMT (High Electron Mobility Transistor)) formed over a GaAs substrate or sapphire substrate having less parasitic capacitance and being excellent in linearity is used in order to realize a low loss and low harmonic distortion. However, a compound semiconductor substrate excellent in high frequency characteristics is expensive and not desirable in view of a cost reduction in the antenna switch. In order to realize a cost reduction in the antenna switch, the use of a field effect transistor formed over an inexpensive silicon substrate (SOI (Silicon On Insulator) substrate) is effective. The inexpensive silicon substrate has, however, problems in that the parasitic capacitance is large as compared with the expensive compound semiconductor substrate and that the harmonic distortion becomes larger than that of the field effect transistor formed over the compound semiconductor substrate.

An object of the present invention is to provide a technique capable of reducing harmonic distortion generated from an antenna switch as much as possible particularly even when the antenna switch is comprised of field effect transistors formed over a silicon substrate, in terms of achieving a cost reduction in the antenna switch.

The above and other objects and novel features of the present invention will be apparent from the description of the specification and the accompanying drawings.

A summary of typical ones of the inventive aspects of the invention disclosed in this application will be briefly described as follows:

A semiconductor device according to a typical embodiment includes an antenna switch having a transmission terminal, an antenna terminal and a reception terminal. Then, the antenna switch has (a) a plurality of first field effect transistors coupled in series between the transmission terminal and the antenna terminal, (b) a plurality of second field effect transistors coupled in series between the reception terminal and the antenna terminal, (c) a plurality of third field effect transistors coupled in series between the transmission terminal and a common terminal GND, and (d) a fourth field effect transistor coupled between the reception terminal and the common terminal GND. At this time, in the third field effect transistors, at least the third field effect transistor coupled to the transmission terminal is larger than the third field effect transistor coupled to the common terminal GND in terms of an off capacitance indicative of a capacitance between source and drain regions of the third field effect transistor that is OFF.

A semiconductor device according to another typical embodiment includes an antenna switch having a transmission terminal, an antenna terminal and a reception terminal. Then, the antenna switch has (a) a plurality of first field effect transistors coupled in series between the transmission terminal and the antenna terminal, (b) a plurality of second field effect transistors coupled in series between the reception terminal and the antenna terminal, (c) a plurality of third field effect transistors coupled in series between the transmission terminal and a common terminal GND, and (d) a fourth field effect transistor coupled between the reception terminal and the common terminal GND. Further, capacitive elements are respectively coupled between source and drain regions of at least some of the third field effect transistors. At this time, in the third field effect transistors, a capacitive element is coupled between the source and drain regions of the third field effect transistor coupled to the transmission terminal while off capacitances each indicative of a capacitance between the source and drain regions of the third field effect transistor being OFF are the same.

An advantageous effect obtained by a typical one of the inventive aspects of the invention disclosed in the present application will be briefly explained as follows:

It is possible to reduce harmonic distortion generated from an antenna switch as much as possible.

DETAILED DESCRIPTION

Figure 1:
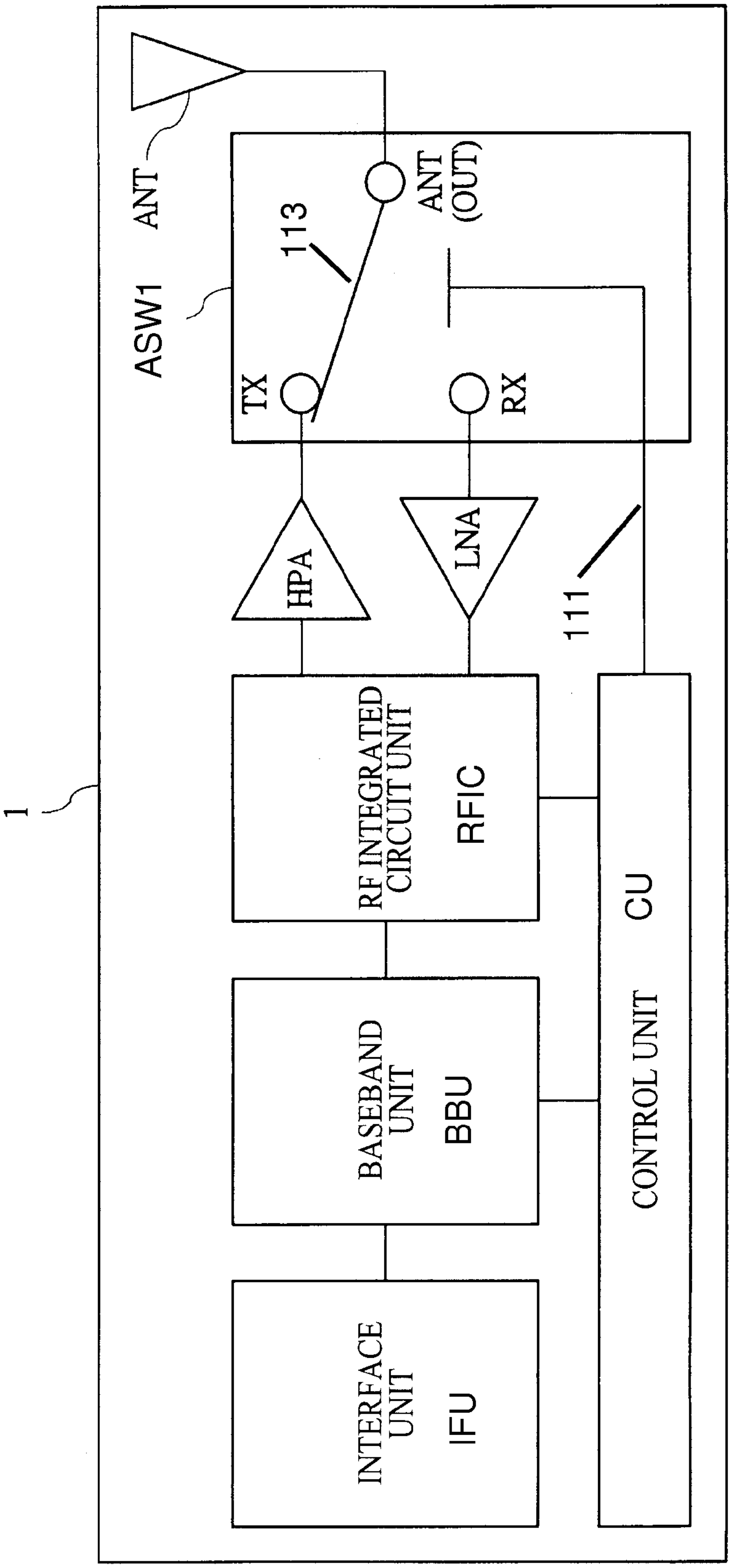
FIG. 1 is a block diagram showing a configuration of a portable phone according to a first embodiment of the present invention.

Whenever circumstances require it for convenience in the following embodiments, the subject matter will be described as being divided into a plurality of sections or embodiments. However, unless otherwise specified in particular, they are not irrelevant to one another. One section or embodiment has to do with modifications, details, supplementary explanations and the like of some or all of the others.

When reference is made to the number of elements or the like (including the number of pieces, numerical values, quantity, range, etc.) in the following embodiments, the number thereof is not limited to a specific number and may be greater than or less than or equal to the specific number unless otherwise specified in particular and definitely limited to the specific number in principle.

It is further needless to say that components (including element steps, etc.) employed in the following embodiments are not always essential unless otherwise specified in particular and considered to be definitely essential in principle.

Similarly, when reference is made to the shapes, positional relations and the like of the components or the like in the following embodiments, they will include ones substantially analogous or similar to their shapes or the like unless otherwise specified in particular and considered not to be definitely so in principle, etc. This is similarly applied even to the above-described numerical values and range.

In all the drawings for explaining the embodiments, the same reference numerals are respectively attached to the same components in principle, and their repetitive description will be omitted. Incidentally, some hatching may be provided to make it easy to read the drawings even in the case of plan views.

First Embodiment

Configuration and Operation of Portable Phone

FIG. 1 is a block diagram showing a configuration of a transmission/reception section of a portable phone. As shown in FIG. 1, the portable phone 1 includes a control unit CU, an interface unit IFU, a baseband unit BBU, an RF integrated circuit unit RFIC, a power amplifier HPA, a low noise amplifier LNA, an antenna switch ASW1 and an antenna ANT. It is understood that a portable phone may have other modules which, for simplicity's sake, have been omitted from FIG. 1.

The interface unit IFU has the function of processing an audio signal from a user (caller). Namely, the interface unit IFU has the function of interfacing between the user and the portable phone. The baseband unit BBU has therein a CPU corresponding to a central control unit and digitally processes an audio signal (analog signal) sent from the user (caller) via an operation unit at the time of transmission to thereby enable a baseband signal to be generated. On the other hand, at the time of reception, the baseband unit BBU is able to generate an audio signal from the baseband signal which is a digital signal. Further, the control unit CU is coupled to the baseband unit BBU and has the function of controlling the processing of the baseband signal in the baseband unit BBU.

The RF integrated circuit unit RFIC is capable of modulating a baseband signal to generate a radio frequency signal at the time of transmission and demodulating a reception signal to generate a baseband signal at the time of reception. The control unit CU is coupled to the RF integrated circuit unit RFIC and also has the function of controlling the modulation of a transmission signal and demodulation of a reception signal in the RF integrated circuit unit RFIC.

The power amplifier HPA is a circuit which newly generates a high power signal in response to a weak input signal using power supplied from a power supply. On the other hand, the low noise amplifier LNA amplifies the reception signal without amplifying noise contained in the reception signal.

The antenna switch ASW1 is provided to separate a reception signal inputted to the portable phone 1 and a transmission signal outputted from the portable phone 1 from each other. The antenna ANT is used to transmit and receive radio waves. The antenna switch ASW1 comprises, for example, a transmission terminal TX, a reception terminal RX and an antenna terminal ANT (OUT). The transmission terminal TX is coupled to the power amplifier HPA, and the reception terminal RX is coupled to the low noise amplifier LNA. Further, the antenna terminal ANT (OUT) is electrically coupled to the antenna ANT. The antenna switch ASW1 is coupled to the control unit CU, which controls the switching operation of a switch 113 in the antenna switch ASW1 via a signal line shown generally as 111.

The portable phone 1 is configured in the above-described manner. The operation thereof will be briefly explained below. A description will first be given to the case in which a signal is transmitted. When a signal such as an audio signal is inputted to the baseband unit BBU via the interface unit IFU, the baseband unit BBU digitally processes the analog signal such as the audio signal. Thus, the generated baseband signal is inputted to the RF integrated circuit unit RFIC. The RF integrated circuit unit RFIC converts the input baseband signal to a signal of an RF (Radio Frequency) frequency by means of a modulation signal source and a mixer. The so-converted signal is outputted from the RF integrated circuit unit RFIC to the power amplifier (RF module) HPA. The RF signal inputted to the power amplifier HPA is first amplified by the power amplifier HPA and then transmitted from the antenna ANT through the antenna switch ASW1. Described concretely, the antenna switch ASW1 performs its switching in such a manner that the transmission terminal TX electrically coupled to the power amplifier HPA is electrically coupled to the antenna ANT. Thus, the RF signal amplified by the power amplifier HPA is transmitted from the antenna ANT via the antenna switch ASW1.

A description will next be given to the case in which a signal is received. An RF signal (reception signal) received by the antenna ANT is inputted to the low noise amplifier LNA via the antenna switch ASW1. Described specifically, the antenna switch ASW1 performs its switching to electrically couple the antenna ANT and the reception terminal RX to each other. Thus, the reception signal received by the antenna ANT is transmitted to the reception terminal RX of the antenna switch ASW1. Since the reception terminal RX of the antenna switch ASW1 is coupled to the low noise amplifier LNA, the reception signal is inputted from the reception terminal RX of the antenna switch ASW1 to the low noise amplifier LNA. Then, the reception signal is amplified by the low noise amplifier LNA and thereafter inputted to the RF integrated circuit unit RFIC. The RF integrated circuit unit RFIC performs its frequency conversion using the modulation signal source and the mixer. Then, the frequency-converted signal is detected to extract a baseband signal. Thereafter, the baseband signal is outputted from the RF integrated circuit unit RFIC to the baseband unit BBU. The baseband signal is processed by the baseband unit BBU, so that an audio signal is outputted from the portable phone 1 through the interface unit IFU. The above shows the simple configuration of the portable phone 1 that transmits and receives a single band signal, and its operation.

In recent years, in addition to voice call functions, various application functions have been added to the portable phone. Namely, functions other than the voice call function, such as watching and listening to distributed music, video transmission, data transfer and the like using a portable phone have been added to the portable phone. With such multifunctioning of a portable phone, frequency bands and modulation schemes exist in large numbers around the world. Accordingly, portable phones exist which adapt to transmission/reception signals corresponding to a plurality of different frequency bands and modulation schemes.

Figure 2:
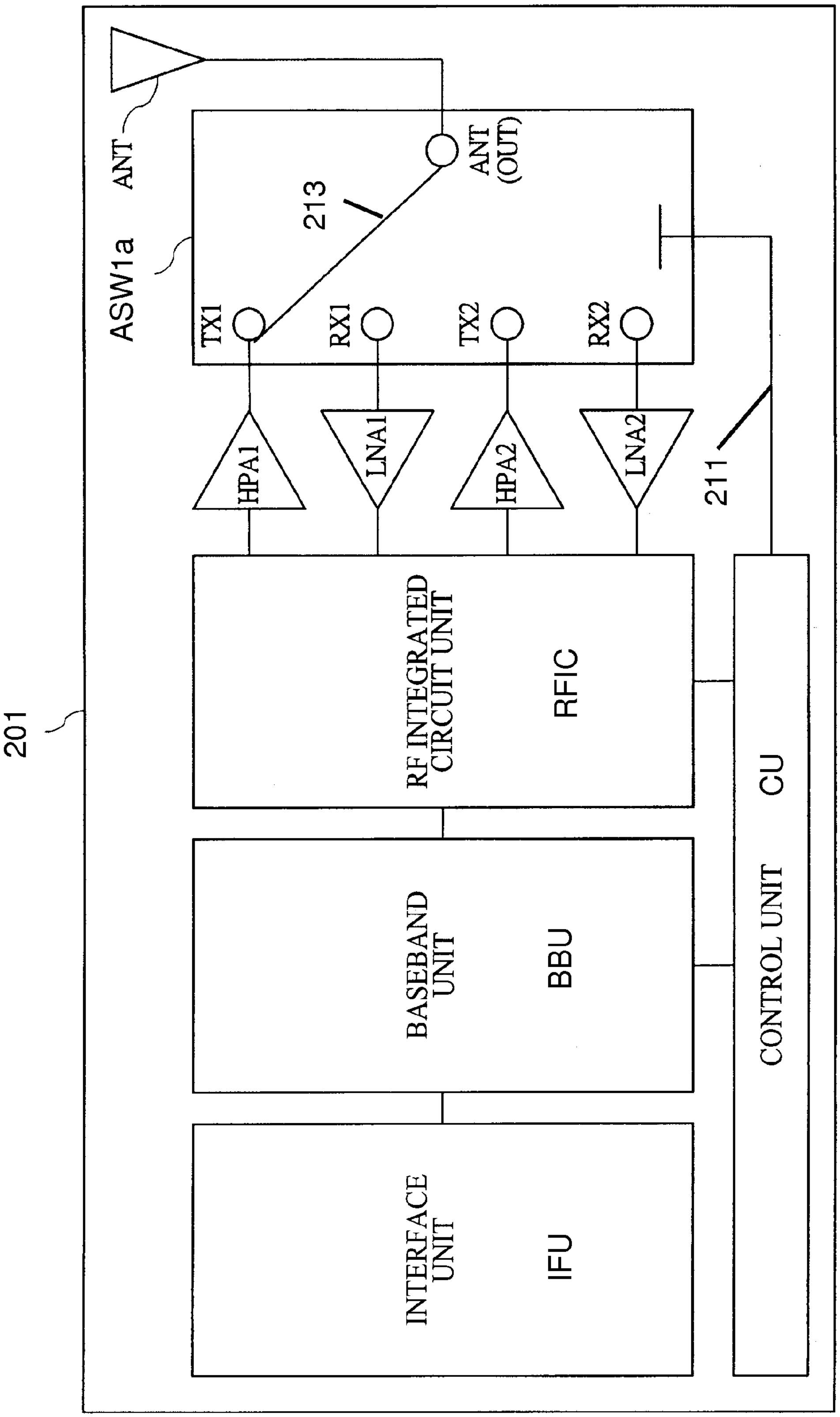
FIG. 2 is a block diagram illustrating a configuration of a portable phone of a dual band structure.

FIG. 2 is a block diagram showing a configuration of a portable phone 1 which selectively transmits and receives a dual-band signal (i.e., signals which belong to different frequency bands and/or employ different modulation schemes. The configuration of the portable phone 201 shown in FIG. 2 is similar to the basic configuration of the portable phone 1 shown in FIG. 1. However, the portable phone 201 shown in FIG. 2 is different from the portable phone shown in FIG. 1 in that in order to transmit and receive signals in different bands, different power amplifiers and low noise amplifiers are provided which correspond to the signals of the respective frequency bands. There are known, for example, signals lying in a first frequency band and signals lying in a second frequency band as the signals lying within the different frequency bands. As the signals of the first frequency band, there may be mentioned, signals using a GSM (Global System for Mobile Communication) scheme. They are signals using 824 MHz to 915 MHz of a GSM low frequency band as the frequency band. On the other hand, as the signals lying in the second frequency band, there may be mentioned, signals using the GSM (Global System for Mobile Communication) scheme. They are signals using 1710 MHZ to 1910 MHz of a GSM high frequency band as the frequency band.

In the portable phone 201 shown in FIG. 2, the interface unit IFU, baseband unit BBU, RF integrated circuit unit RFIC and control unit CU are capable of processing the signals lying within the first and second frequency bands. A power amplifier HPA1 and a low noise amplifier LNA1 are provided corresponding to the signals lying within the first frequency band. A power amplifier HPA2 and a low noise amplifier LNA2 are provided corresponding to the signals lying within the second frequency band. That is, two transmission paths and two reception paths exist in the portable phone 201 of the dual band system shown in FIG. 2 in association with the signals of a plurality of different frequency bands.

Accordingly, four switching terminals exist in the antenna switch ASW of FIG. 2. Namely a transmission terminal TX1 is provided corresponding to the transmission signals of the first frequency band, and a reception terminal RX1 is provided corresponding to the reception signals of the first frequency band. A transmission terminal TX2 is provided corresponding to the transmission signals of the second frequency band, and a reception terminal RX2 is provided corresponding to the reception signals of the second frequency band. Thus, the four switching terminals exist in the antenna switch ASW1*a*, but the switching of these terminals is controlled by the control unit CU via a signal line 211 connecting to a switch 213 within the antenna switch ASW1*a* seen in FIG. 2.

The above-described FIG. 2 shows a simple configuration of the portable phone 201 that transmits and receives dual-band signals. The operation of the portable phone 201 is similar to that of the portable phone 1 of FIG. 1 that transmits and receives single-band signals.

Circuit Configuration of Antenna Switch According to Comparative Example

The circuit configuration of the antenna switch will next be explained. Although the circuit configuration of the antenna switch ASW1 used in the portable phone 1 of the single-band system shown in FIG. 1 is mainly explained in the present specification, the circuit configuration of the antenna switch ASW used in the portable phone 201 of the dual-band system shown in FIG. 2 is somewhat similar.

Figure 3:
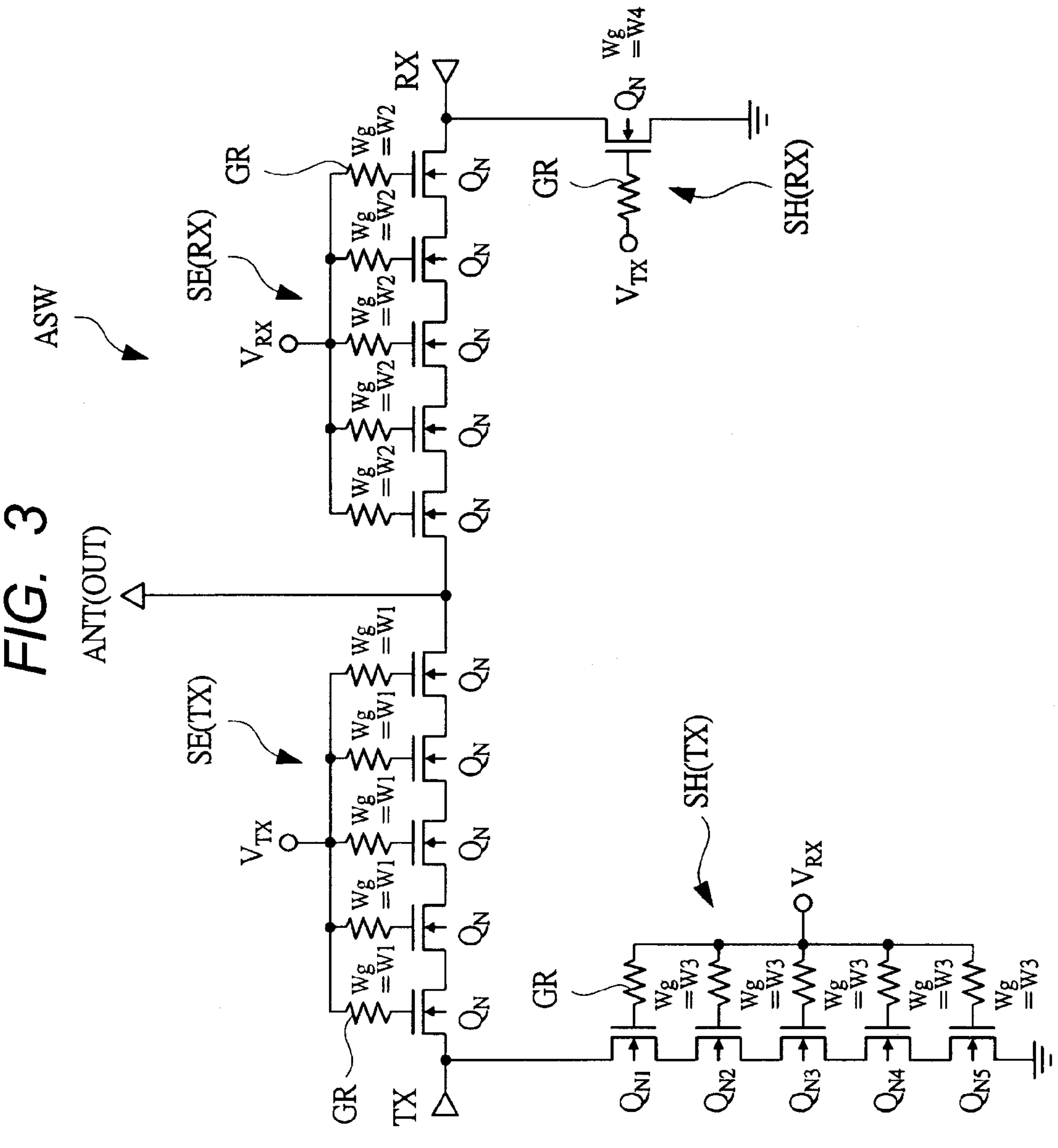
FIG. 3 is a diagram depicting a circuit configuration of an antenna switch according to a comparative example.

FIG. 3 is a diagram showing a circuit configuration of an antenna switch ASW according to a comparative example studied by the present inventors. As shown in FIG. 3, the antenna switch ASW according to the comparative example has a single transmission terminal TX, a single reception terminal RX and an antenna terminal ANT (OUT). The antenna switch ASW according to the comparative example has a TX series transistor SE (TX) provided between the transmission terminal TX and the antenna terminal ANT (OUT), and an RX series transistor SE (RX) provided between the reception terminal RX and the antenna terminal ANT (OUT). Further, the antenna switch ASW according to the comparative example has a TX shunt transistor SH (TX) provided between the transmission terminal TX and a common terminal GND, and has an RX shunt transistor SH (RX) provided between the reception terminal RX and the common terminal GND.

The TX series transistor SE (TX) provided between the transmission terminal TX and the antenna terminal ANT (OUT) is comprised of five MISFETs (Metal Insulator semiconductor Field Effect Transistors) $Q_N$ coupled in series, for example. Each of the MISFETs $Q_N$ has a source region, a drain region and a gate electrode. In the present specification, the source region and the drain region of the MISFET $Q_N$ are symmetric with respect to each other. In the MISFETs $Q_N$ configuring the TX series transistor SE (TX), however, a region on the transmission terminal TX side is defined as the drain region, and a region on the antenna terminal ANT (OUT) side is defined as the source region.

Further, the gate electrode of each MISFET $Q_N$ is coupled to a control terminal $V_{TX}$ through a gate resistor GR. The gate resistor GR is an isolation resistor for preventing high frequency signals from leaking to the control terminal $V_{TX}$. In other words, the gate resistor GR has the function of attenuating the high frequency signals.

In the TX series transistor SE (TX) thus configured, the ON/OFF of the series-coupled MISFETs $Q_N$ is controlled by controlling the voltage applied to the control terminal $V_{TX}$, thereby selectively either electrically coupling between the transmission terminal TX and the antenna terminal ANT (OUT) or electrically cutting off therebetween. That is, the TX series transistor SE (TX) functions as a switch for performing switching between electrical coupling and decoupling of the transmission terminal TX and the antenna terminal ANT (OUT).

The gate widths (Wg=W1) of the five MISFETs $Q_N$ that configure the TX series transistor SE (TX) are the same and relatively large. This is because the on resistance can be reduced as each of the gate widths becomes larger. Thus, when the transmission terminal TX and the antenna terminal ANT (OUT) are electrically coupled to each other to transmit a transmission signal, the power loss can be reduced by reducing the on resistance of the transmission path.

Subsequently, the RX series transistor SE (RX) provided between the reception terminal RX and the antenna terminal ANT (OUT) is also comprised of five MISFETs $Q_N$ coupled in series, for example, much as the TX series transistor SE (TX). Each MISFET $Q_N$ has a source region, a drain region, and a gate electrode. In this specification, the source region and the drain region of the MISFET $Q_N$ are in a symmetrical relation. In the MISFET $Q_N$ configuring the RX series transistor SE (RX), however, a region on the antenna terminal ANT (OUT) side is defined as the drain region, and a region on the reception terminal RX side is defined as the source region.

Further, the gate electrode of the MISFET $Q_N$ is coupled to a control terminal $V_{RX}$ via a gate resistor GR. The gate resistor GR is an isolation resistor for preventing high frequency signals from leaking into the control terminal $V_{RX}$. In other words, the gate resistor GR has the function of attenuating the high frequency signals. In the RX series transistor SE (RX) thus configured, the ON/OFF of the MISFETs $Q_N$ coupled in series is controlled by controlling the voltage applied to the control terminal $V_{RX}$, so that the reception terminal RX and the antenna terminals ANT (OUT) are selectively either electrically coupled to each other or electrically cut off from each other. That is, the RX series transistor SE (RX) functions as a switch to switch electrical coupling/decoupling between the reception terminal RX and the antenna terminal ANT (OUT).

The gate widths (Wg=W2) of the five MISFETs $Q_N$ configuring the RX series transistor SE (RX) are the same and relatively large. This is because as the gate width of each MISFET increases, the on resistance can be reduced. Thus, when the reception terminal RX and the antenna terminal ANT (OUT) are coupled to each other to transmit a reception signal, the power loss can be reduced by reducing the on resistance of the reception path.

Next, the TX shunt transistor SH (TX) provided between the transmission terminal TX and the common terminal GND is comprised of five MISFETs $Q_{N1}$ through $Q_{N5}$ coupled in series, for example. In this case, each of the MISFETs $Q_{N1}$ through $Q_{N5}$ has a source region, a drain region, and a gate electrode. In the present specification, the source region and the drain region of each of the MISFETs $Q_{N1}$ through $Q_{N5}$ are symmetrical with respect to each other. In each of the MISFETs $Q_{N1}$ through $Q_{N5}$ that configure the TX shunt transistor SH (TX), however, a region on the transmission terminal TX side is defined as the drain region, and a region on the common terminal GND side is defined as the source region. Further, the gate electrode of each of the MISFETs $Q_{N1}$ through $Q_{N5}$ is coupled to the control terminal $V_{RX}$ via a gate resistor GR. The gate resistor GR is an isolation resistor for preventing high frequency signals from leaking into the control terminal $V_{RX}$. In other words, the gate resistor GR has the function of attenuating the high frequency signals.

Here, the TX series transistor SE (TX) referred to above is a component required as the antenna switch ASW because the TX series transistor SE (TX) functions as the switch to switch the coupling/decoupling of the transmission path for transmitting a transmission signal between the transmission terminal TX and the antenna terminal ANT (OUT). In contrast, the TX shunt transistor SH (TX) serves to switch the coupling/decoupling between the transmission terminal TX and the common terminal GND, and a transmission signal is not transmitted directly through the path between the transmission terminal TX and the common terminal GND. It is therefore questionable that the TX shunt transistor SH (TX) needs to be provided. However, the TX shunt transistor SH (TX) has an important function in receiving a reception signal with the antenna.

The function of the TX shunt transistor SH (TX) will hereinafter be described. When a reception signal is received from the antenna, in the antenna switch ASW, the RX series transistor SE (RX) is turned ON to electrically couple the antenna terminal ANT (OUT) to the reception terminal RX. Thus, the reception signal received by the antenna is transmitted from the antenna terminal ANT (OUT) to a reception circuit via the reception terminal RX. Since it is then necessary not to allow the reception signal to be transmitted to the transmission path side, the TX series transistor SE (TX) provided between the antenna terminal ANT (OUT) and the transmission terminal TX is turned OFF. Thus, the reception signal input from the antenna to the antenna terminal ANT (OUT) is not transmitted to the transmission terminal TX side.

Since the transmission path between the antenna terminal ANT (OUT) and the transmission terminal TX is electrically cut off by turning OFF the TX series transistor SE (TX), the reception signal ideally does not leak into the transmission path. However, the fact that the TX series transistor SE (TX) is OFF in the MISFET $Q_N$ configuring the TX series transistor SE (TX) can be regarded as an off capacitance being electrically generated between the source region and the drain region of the MISFET $Q_N$. For this reason, the reception signal that is a high frequency signal will leak to the transmission terminal TX side via this off capacitance.

Since the power of a reception signal is small, it is preferable that the reception signal be efficiently transmitted from the antenna terminal ANT (OUT) to the reception terminal RX side. That is, it is necessary to suppress the leakage of the reception signal to the transmission terminal TX side via the off capacitance of the TX series transistor SE (TX). In particular, the gate width of each of the MISFETs $Q_N$ configuring the TX series transistor SE (TX) is increased in view of reducing the on resistance. Such an increase in the gate width of the MISFET $Q_N$ may be, in other words, an increase in the off capacitance. In this case, since the TX series transistor SE (TX) has five MISFETs $Q_N$ coupled in series, the combined capacitance of the TX series transistor SE (TX) is smaller than the off capacitance of one MISFET $Q_N$. Although it is so, the off capacitance of the TX series transistor SE (TX) is non-negligibly large. An increase in the off capacitance of the TX series transistor SE (TX) means that a reception signal that is a high frequency signal is accordingly more likely to leak to the transmission side. Therefore, the provision of only the TX series transistor SE (TX) between the transmission terminal TX and the antenna terminal ANT (OUT) cannot sufficiently suppress the leakage of a reception signal.

Therefore, the TX shunt transistor SH (TX) is provided between the transmission terminal TX and the common terminal GND. That is, a reception signal leaks to the transmission terminal TX side even when the TX series transistor SE (TX) is in an OFF state. However, if the reception signal having leaked to the transmission terminal TX side can be sufficiently reflected at the transmission terminal TX, the reception signal leaking to the transmission terminal TX side can be suppressed. The shunt transistor SH (TX) provided between the transmission terminal TX and the common terminal GND is provided for the purpose of sufficiently reflecting the reception signal at the transmission terminal TX.

Sufficient reflection of a reception signal, which is a high frequency signal, at the transmission terminal TX can be realized by grounding the transmission terminal TX to GND. In other words, if it is possible to set the impedance as low as possible between the transmission terminal TX and the common terminal GND, the reception signal can be reflected at the transmission terminal TX sufficiently. Therefore, at the time of reception, on the transmission terminal TX side, the transmission terminal TX and the common terminal GND are electrically coupled to each other by turning OFF the TX series transistor SE (TX) and turning ON the TX shunt transistor SH (TX) at the same time. Thus, even if the reception signal leaks to the transmission terminal TX side, the reception signal can be sufficiently reflected at the transmission terminal TX. It is therefore possible to suppress the reception signal leaking to the transmission terminal TX side.

The TX shunt transistor SH (TX) is comprised of five MISFETs $Q_{N1}$ through $Q_{N5}$, for example. Here, the reason why a plurality of the MISFETs $Q_{N1}$ through $Q_{N5}$ are coupled in series is that at the time of transmission, a high-power transmission signal flows into the transmission terminal TX and from its relation a large voltage amplitude is applied between the transmission terminal TX and the common terminal GND. That is, by coupling the MISFETs $Q_{N1}$ through $Q_{N5}$ in series, the voltage amplitude applied to each of the MISFETs $Q_{N1}$ through $Q_{N5}$ can be reduced to its breakdown voltage or lower even if the large voltage amplitude is applied between the transmission terminal TX and the common terminal GND.

Further, it is desirable that the on resistance of the TX shunt transistor SH (TX) is reduced. This is because when the TX shunt transistor SH (TX) is turned ON, the transmission terminal TX and the common terminal GND will be electrically coupled to each other, and in this case, however, if the on-resistance of the TX shunt transistor SH (TX) is high, the impedance between the transmission terminal TX and the common terminal GND will increase and consequently the reception signal leaking to the transmission terminal TX side cannot be sufficiently reflected at the transmission terminal TX. Accordingly, one would think that the gate width of each of the MISFETs $Q_{N1}$ through $Q_{N5}$ configuring the TX shunt transistor SH (TX) should be set large as the TX series transistor SE (TX).

However, actually, the gate width of each of the MISFETs $Q_{N1}$ through $Q_{N5}$ configuring the TX shunt transistor SH (TX) is reduced to about 1/10 the gate width (Wg=W1) of each MISFET $Q_N$ configuring the TX series transistor SE (TX). This is based on the reason shown below. That is, when a transmission signal is transmitted from the antenna, the transmission terminal TX and the antenna terminal ANT (OUT) are electrically coupled to each other by turning ON the TX series transistor SE (TX). At this time, the TX shunt transistor SH (TX) provided between the transmission terminal TX and the common terminal GND is being turned OFF. In this case, when the gate width of each of the MISFETs $Q_{N1}$ through $Q_{N5}$ that configure the TX shunt transistor SH (TX) is increased, the off capacitance thereof becomes large. Increasing the off capacitance of the TX shunt transistor SH (TX) means that the transmission signal leaking from the transmission terminal TX to the common terminal GND through the off capacitance of the TX shunt transistor SH (TX) increases. Namely, the gate width of each of the MISFETs $Q_{N1}$ through $Q_{N5}$ that configure the TX shunt transistor SH (TX) cannot be set larger in a manner similar to the TX series transistor SE (TX) because it is necessary to suppress the increase in the transmission signal leaking from the transmission terminal TX to the common terminal GND. From the above, the gate width (Wg=W3) of each of the five MISFETs $Q_{N1}$ through $Q_{N5}$ configuring the TX shunt transistor SH (TX) is smaller than the gate width of each MISFET $Q_N$ that configures the TX series transistor SE (TX). Incidentally, the gate widths (Wg=W3) of the five MISFETs $Q_{N1}$ through $Q_{N5}$ configuring the TX shunt transistor SH (TX) are the same.

The RX shunt transistor SH (RX) provided between the reception terminal RX and the common terminal GND is comprised of one MISFET $Q_N$, for example. In this case, the MISFET $Q_N$ has a source region, a drain region, and a gate electrode. The source region and the drain region of the MISFET $Q_N$ are symmetrical in the present specification. In the MISFET $Q_N$ configuring the RX shunt transistor SH (RX), however, a region on the reception terminal RX side is defined as the drain region, and a region on the common terminal GND side is defined as the source region. Further, the gate electrode of the MISFET $Q_N$ is coupled to the control terminal $V_{TX}$ via the gate resistor GR. The gate resistor GR is an isolation resistor for preventing high frequency signals from leaking into the control terminal $V_{TX}$. In other words, the gate resistor GR has the function of attenuating the high frequency signals.

Here, at the time of transmission, even when the RX series transistor SE (TX) is in an OFF state, a transmission signal leaks to the reception terminal RX side because the RX series transistor SE (RX) has an off capacitance. However, if the transmission signal that has leaked out to the reception terminal RX side can be sufficiently reflected at the reception terminal RX, the transmission signal leaking to the reception terminal RX side can be suppressed. That is, the RX shunt transistor SH (RX) provided between the reception terminal RX and the common terminal GND is provided for the purpose of sufficiently reflecting the transmission signal at the reception terminal RX.

Sufficiently reflecting a transmission signal, which is a high frequency signal, at the reception terminal RX can be achieved by grounding the reception terminal RX to GND. In other words, if it is possible to set the impedance as low as possible between the reception terminal RX and the common terminal GND, the transmission signal can be reflected sufficiently at the reception terminal RX. For this reason, at the time of transmission, on the reception terminal RX side, the reception terminal RX and the common terminal GND are electrically coupled to each other by turning OFF the RX series transistor SE (RX) and turning ON the RX shunt transistor SH (RX) at the same time. Thus, even if a transmission signal leaks to the reception terminal RX side, the transmission signal leaking to the reception terminal RX side can be suppressed because the transmission signal can be sufficiently reflected at the reception terminal RX.

The RX shunt transistor SH (RX) is comprised of one MISFET $Q_N$, for example. Here, unlike the TX shunt transistor SH (TX), the reason why a plurality of MISFETs $Q_N$ are not coupled in series is that at the time of reception, only a small-power reception signal flows into the reception terminal RX and from its relation a breakdown voltage can be sufficiently ensured even at one MISFET $Q_N$. Further, it is desirable that the on resistance of the RX shunt transistor SH (RX) is reduced. This is because when the RX shunt transistor SH (RX) is turned ON, the reception terminal RX and the common terminal GND will be electrically coupled to each other, and in this case, however, if the on-resistance of the RX shunt transistor SH (RX) is high, the impedance between the reception terminal RX and the common terminal GND will increase and consequently the transmission signal leaking to the reception terminal RX side cannot be sufficiently reflected at the reception terminal RX. However, even at the RX shunt transistor SH (RX), when the gate width is excessively increased to reduce the on resistance thereof, the reception signal leaking from the antenna terminal ANT (OUT) to the common terminal GND via the off capacitance of the RX shunt transistor SH (RX) increases. For this reason, the gate width of the first MISFET $Q_{N1}$ configuring the RX shunt transistor SH (RX) cannot be increased as with the TX series transistor SE (TX) because it is necessary to suppress an increase in the transmission signal leaking from the transmission terminal TX to the common terminal GND. From the above, the gate width (Wg=W4) of one MISFET $Q_N$ that configures the RX shunt transistor SH (RX) is smaller than the gate width (Wg=W2) of each MISFET $Q_N$ that configures the RX series transistor SE (RX).

The antenna switch ASW according to the comparative example is configured as described above. The operation thereof will be explained below. First, the operation at the time of transmission will be described. In FIG. 3, at the time of transmission, the TX series transistor SE (TX) and the RX shunt transistor SH (RX) are turned ON, and the TX shunt transistor SH (TX) and the RX series transistor SE (RX) are turned OFF. Thus, the transmission terminal TX and the antenna terminal ANT (OUT) are electrically coupled to each other, and the reception terminal RX and the antenna terminal ANT (OUT) are electrically cut off from each other. As a result, a transmission signal is output from the transmission terminal TX to the antenna terminal ANT (OUT). At this time, there exists an off capacitance although the RX series transistor SE (RX) is OFF. Therefore, a part of the transmission signal that is a high frequency signal will leak out to the reception terminal RX side via the off capacitance of the RX series transistor SE (RX). However, since the RX shunt transistor SH (RX) is ON, the reception terminal RX and the common terminal GND are electrically coupled to each other and the impedance between the reception terminal RX and the common terminal GND is placed in a low impedance state. For this reason, a transmission signal having leaked out to the reception terminal RX side is sufficiently reflected at the reception terminal RX. As a result, the transmission signal leaking out to the reception terminal RX is suppressed, and therefore the transmission signal is efficiently transmitted from the transmission terminal TX to the antenna terminal ANT (OUT). The transmission signal is outputted from the antenna terminal ANT (OUT) in this way.

The operation at the time of reception will next be described. In FIG. 3, at the time of reception, the RX series transistor SE (RX) and the TX shunt transistor SH (TX) are turned ON, and the RX shunt transistor SH (RX) and the TX series transistor SE (TX) are turned OFF. Thus, the reception terminal RX and the antenna terminal ANT (OUT) are electrically coupled to each other, and the transmission terminal TX and the antenna terminal ANT (OUT) are electrically cut off from each other. As a result, a reception signal is transmitted from the antenna terminal ANT (OUT) to the reception terminal RX. At this time, there exists an off capacitance although the TX series transistor SE (TX) is OFF. Therefore, a part of the reception signal that is a high frequency signal will leak out to the transmission terminal TX side via the off capacitance of the TX series transistor SE (TX). However, since the TX shunt transistor SH (TX) is ON, the transmission terminal TX and the common terminal GND are electrically coupled to each other and the impedance between the transmission terminal TX and the common terminal GND is placed in a low impedance state. For this reason, a reception signal having leaked out to the transmission terminal TX side is sufficiently reflected at the transmission terminal TX. As a result, the reception signal is efficiently transmitted from the antenna terminal ANT (OUT) to the reception terminal RX side because the reception signal leaking out to the transmission terminal TX is suppressed. The reception signal is transmitted from the antenna terminal ANT. (OUT) to the reception terminal RX side in this way.

Problem of Antenna Switch in Comparative Example

Although the antenna switch ASW according to the comparative example is configured as described above, the antenna switch ASW in the comparative example causes a problem that the nonlinearity (harmonic distortion) of a transmission signal increases. The antenna switch ASW is required to have performance to secure high quality in high-power transmission signals and reduce the generation of interfering waves (high-order harmonics) adversely affecting the communications in other frequency bands. However, in the antenna switch ASW according to the comparative example, particularly the generation of high-order harmonics becomes a problem. The mechanism of how this problem occurs will be described below.

Figure 4:
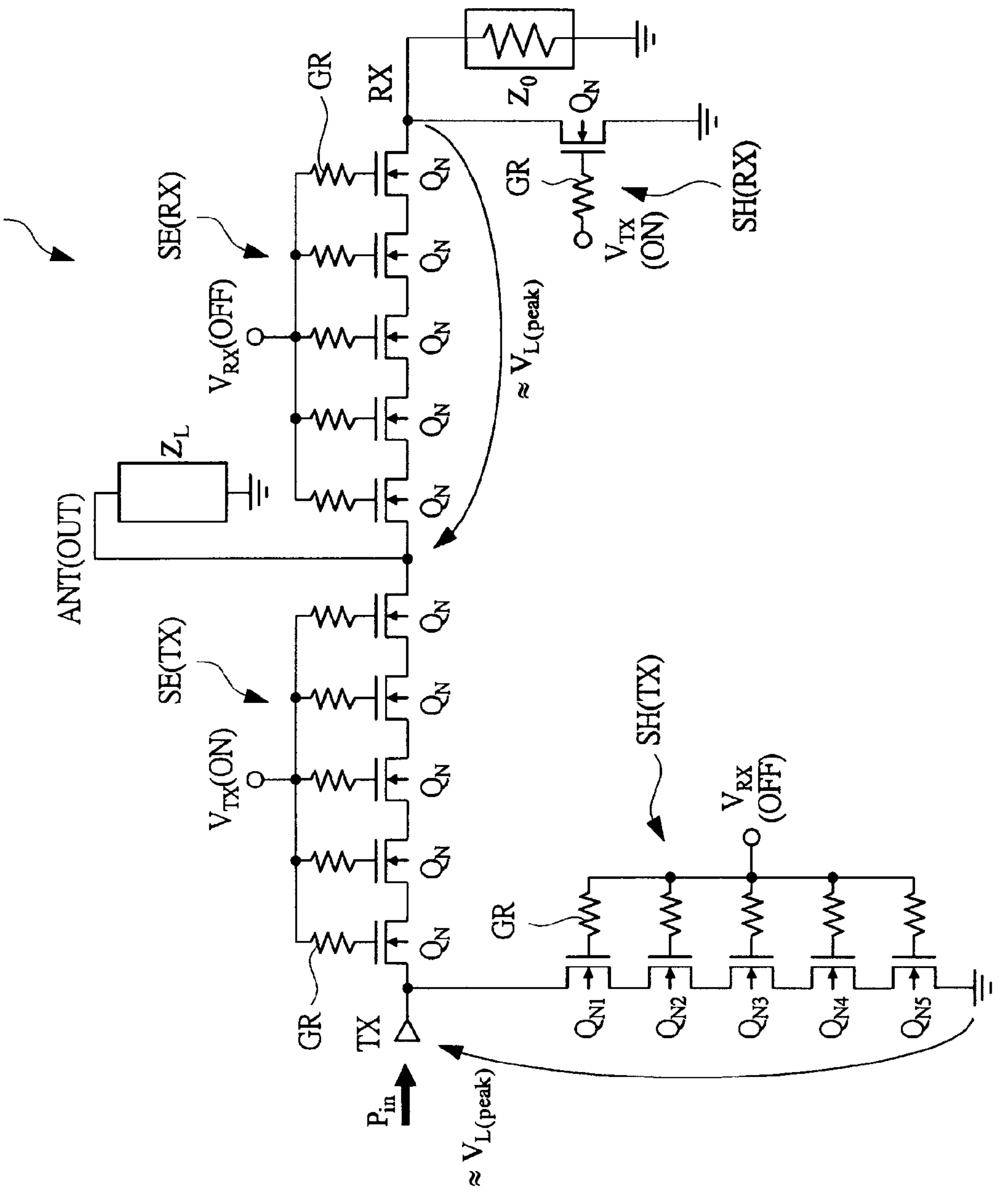
FIG. 4 is a diagram for describing that an equivalent voltage amplitude is applied to a TX shunt transistor and an RX series transistor.

FIG. 4 is a circuit diagram showing a state of the antenna switch ASW showing the comparative example at the time of transmission. In FIG. 4, a load coupled between the antenna terminal ANT (OUT) and the common terminal GND of the antenna switch ASW is assumed to be a load $Z_L$, and a load coupled between the reception terminal RX and the common terminal GND of the antenna switch ASW is assumed to be a load $Z_0$. In this state, consider a case where a transmission signal having a power $P_{in}$ is inputted from the transmission terminal TX of the antenna switch ASW. At this time, in the antenna switch ASW, the TX series transistor SE (TX) and the RX shunt transistor SH (RX) are ON, and the TX shunt transistor SH (TX) and the RX series transistor SE (RX) are OFF. Therefore, substantially the same voltage amplitude as that applied to the load $Z_L$ is applied to the TX shunt transistor SH (TX) coupled between the transmission terminal TX and the common terminal GND and to the RX series transistor SE (RX) coupled between the antenna terminal ANT (OUT) and the reception terminal RX. The maximum value of this voltage amplitude is assumed to be a voltage amplitude $V_{L(peak)}$.

Figure 5:
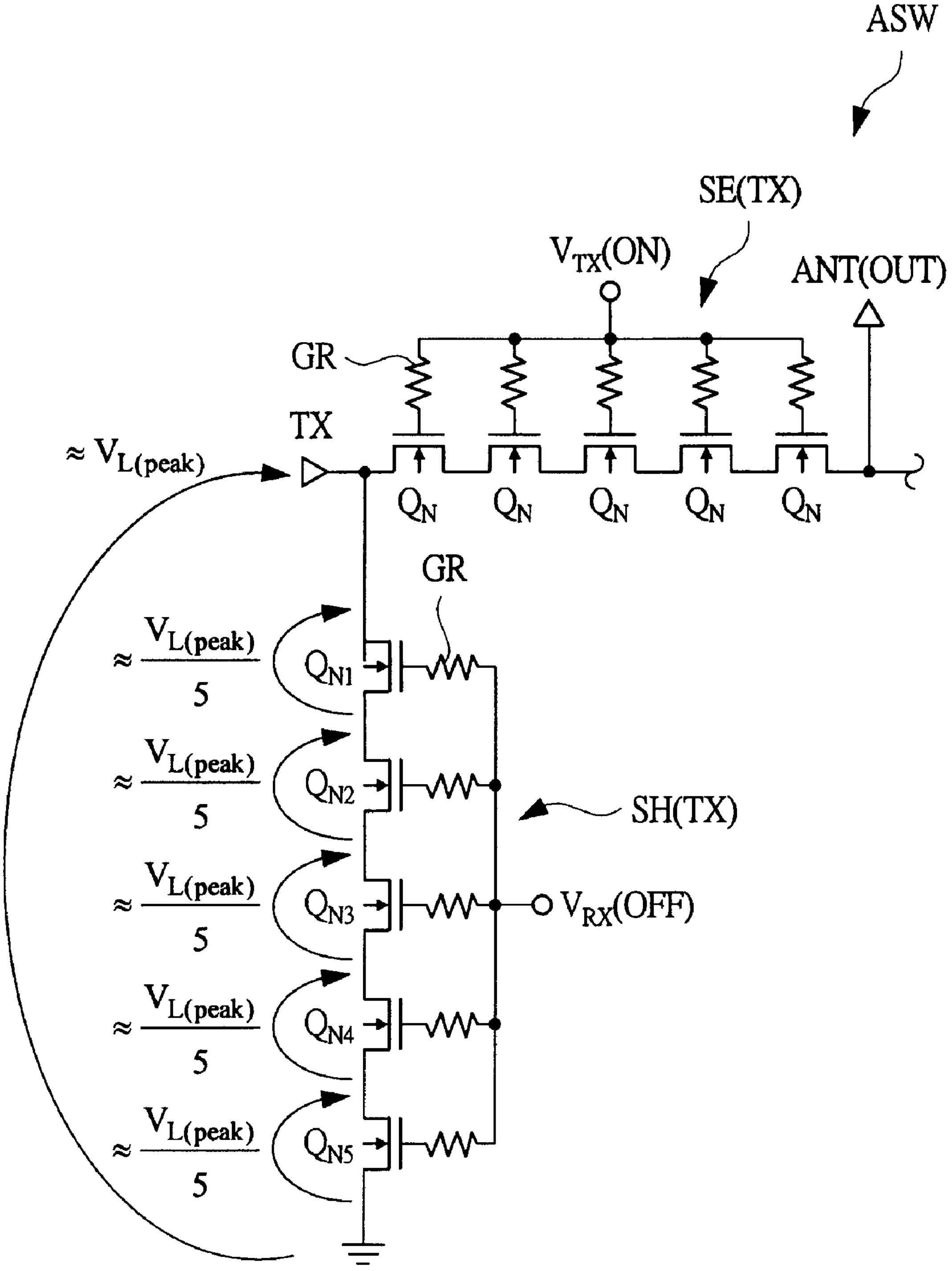
FIG. 5 is a diagram showing an ideal state in which a voltage amplitude is uniformly distributed to each of MISFETs that configure the TX shunt transistor.
Figure 6:
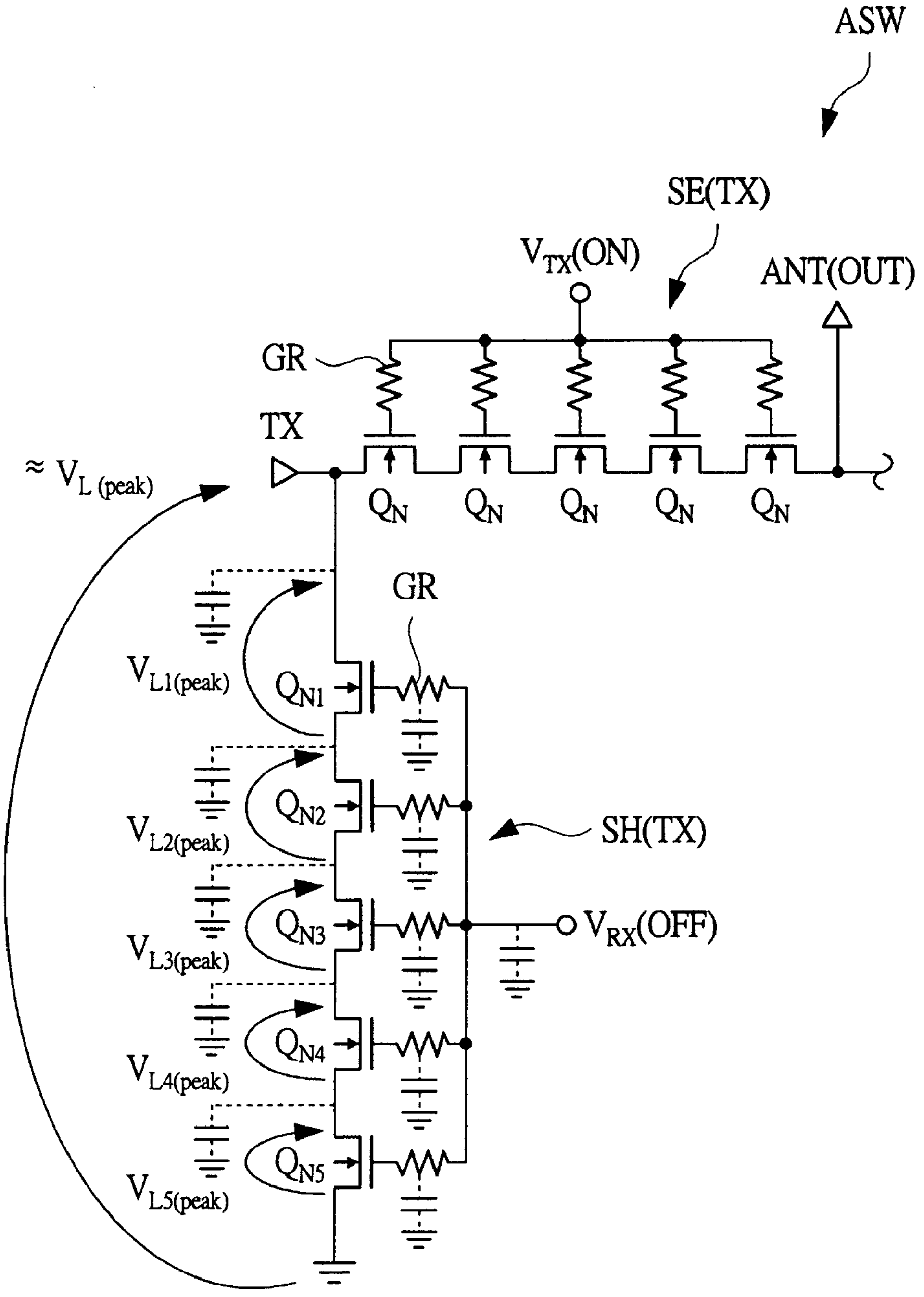
FIG. 6 is a diagram illustrating a state in which the voltage amplitudes applied to the respective MISFETs that configure the TX shunt transistor become nonuniform.

Attention will now be paid to the TX shunt transistor SH (TX). Since the TX shunt transistor SH (TX) is comprised of five MISFETs $Q_{N1}$ through $Q_{N5}$ coupled in series between the transmission terminal TX and the common terminal GND, the voltage amplitude $V_{L(peak)}$ is considered to be equally divided and distributed to each of these MISFETs $Q_{N1}$ to $Q_{N5}$. That is, as shown in FIG. 5, a voltage amplitude $V_{L(peak)}/5$ is ideally applied to each of the five MISFETs $Q_{N1}$ to $Q_{N5}$ configuring the TX shunt transistor SH (TX). However, actually, the equal voltage amplitude of $V_{L(peak)}/5$ will not be applied to each of the five MISFETs $Q_{N)}$ to $Q_{N5}$. Instead, as shown in FIG. 6, different voltage amplitudes $V_{L1(peak)}$ to $V_{L5(peak)}$ are applied to the five MISFETs $Q_{N1}$ to $Q_{N5}$, respectively. Namely, the voltage amplitude $V_{L1(peak)}$ is applied to the first MISFET $Q_{N1}$, and the voltage amplitude $V_{L2(peak)}$ is applied to the MISFET $Q_{N2}$. Likewise, the voltage amplitude $V_{L3(peak)}$ is applied to the MISFET $Q_{N3}$, and the voltage amplitude $V_{L4(peak)}$ is applied to the MISFET $Q_{N4}$. Further, the voltage amplitude $V_{L5(peak)}$ is applied to the last MISFET $Q_{N5}$. At this time, the following relationship is established between the voltage amplitudes $V_{L1(peak)}$ through $V_{L5(peak)}$: voltage amplitude $V_{L1(peak)}$>voltage amplitude $V_{L2(peak)}$> voltage amplitude $V_{L3(peak)}$>voltage amplitude $V_{L4(peak)}$> voltage amplitude $V_{L5(peak)}$. Namely, among the MISFETs $Q_{N1}$ to $Q_{N5}$, the transistor disposed at the position closer to the GND terminal will have a smaller voltage amplitude applied thereto. In other words, a larger voltage amplitude is applied to the transistor disposed at the position closer to the transmission terminal TX. Specifically, among the MISFETs $Q_{N1}$ to $Q_{N5}$ configuring the TX shunt transistor SH (TX), the voltage amplitude $V_{L1(peak)}$ applied to the first MISFET $Q_{N1}$ becomes the largest.

The reason why the applied voltage amplitudes become nonuniform without being equally divided, even for the MISFETs $Q_{N1}$ to $Q_{N5}$ each having the same structure as described above, is described. The causes of the nonuniformity of the voltage amplitudes applied to the MISFETs $Q_{N1}$ to $Q_{N5}$ configuring the TX shunt transistor SH (TX) include the one as shown below, for example. That is, the presence of a parasitic capacitance to the semiconductor substrate (coupled to the GND potential) of the respective MISFETs $Q_{N1}$ to $Q_{N5}$, a parasitic capacitance to the semiconductor substrate of the gate resistor GR coupled to the gate electrode of each of the MISFETs $Q_{N1}$ to $Q_{N5}$ and a parasitic capacitance to the semiconductor substrate of wirings coupled to the MISFETs $Q_{N1}$ to $Q_{N5}$ becomes the cause of this problem. The presence of these parasitic capacitances results in the nonuniformity of the voltage amplitudes applied to the MISFETs $Q_{N1}$ to $Q_{N5}$ configuring the TX shunt transistor SH (TX).

Figure 7:
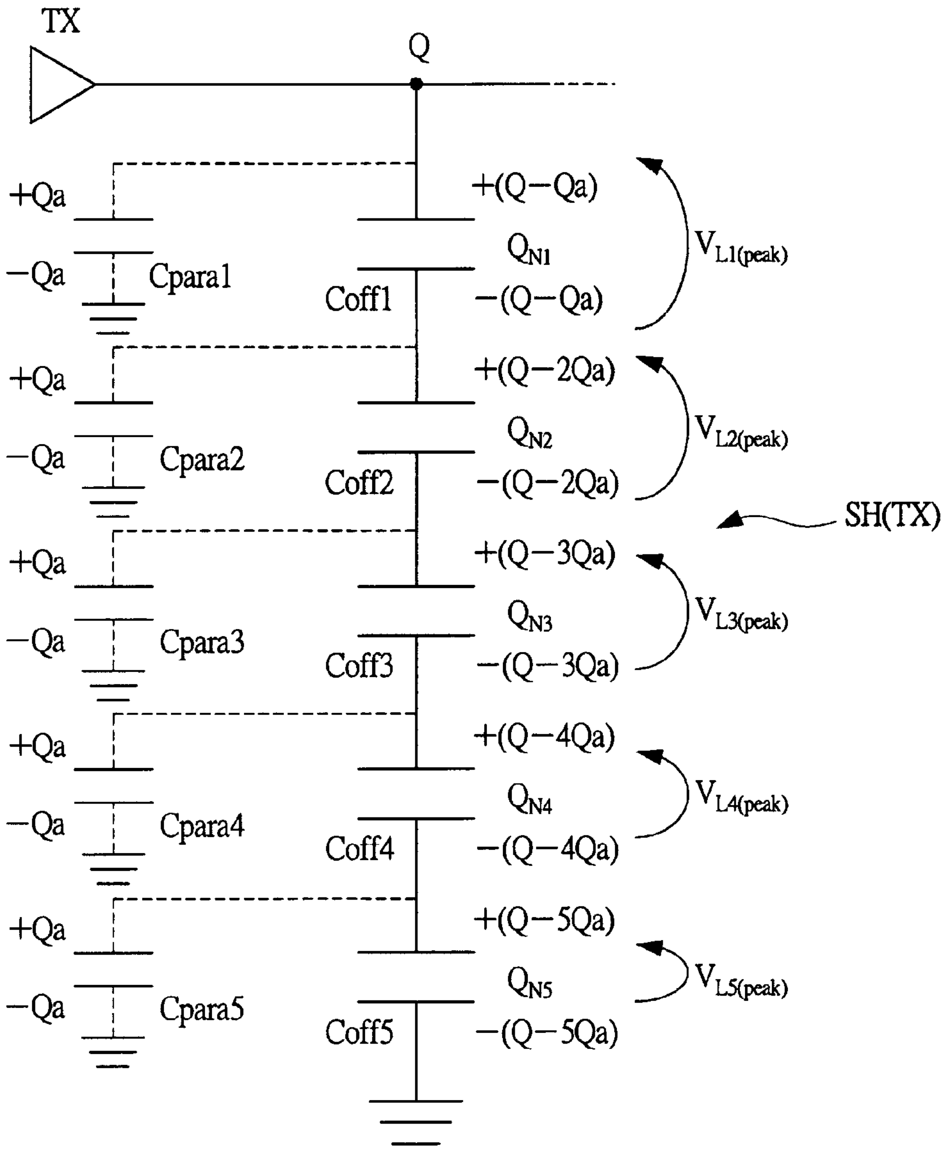
FIG. 7 is a diagram for describing a mechanism in which nonuniformity of the voltage amplitude applied to each of the MISFETs that configure the TX shunt transistor is generated.

FIG. 7 is a diagram showing in an equivalent circuit, the MISFETs $Q_{N1}$ to $Q_{N5}$ coupled in series between the transmission terminal TX and the GND terminal. That is, the TX shunt transistor SH (TX) comprised of the serially-coupled MISFETs $Q_{N1}$ to $Q_{N5}$ is formed between the transmission terminal TX and the GND terminal. In FIG. 7, the time of transmission of a transmission signal is shown, and the TX shunt transistor SH (TX) is OFF. In this state, all of the MISFETs $Q_{N1}$ to $Q_{N5}$ configuring the TX shunt transistor SH (TX) are OFF. Accordingly, the off MISFETs $Q_{N1}$ to $Q_{N5}$ can be represented by off capacitances Coff1 through Coff5 generated between the source region and the drain region, respectively. Thus, in FIG. 7, the MISFETs $Q_{N1}$ to $Q_{N5}$ coupled in series are shown with the five off capacitances Coff1 to Coff5 coupled in series. Since the MISFETs $Q_{N1}$ to $Q_{N5}$ have a similar structure to each other, the five off capacitances Coff1 to Coff5 shown as the equivalent circuit have a similar electrostatic capacitance value (Coff1=Coff2=Coff3=Coff4=Coff5=Coff). In FIG. 7, the respective parasitic capacitances (to the GND potential) present in the respective MISFETs $Q_{N1}$ to $Q_{N5}$ are shown with parasitic capacitances Cpara1 to Cpara5. The parasitic capacitances Cpara1 through Cpara5 are formed corresponding to the respective off capacitances Coff1 to Coff5.

In the equivalent circuit diagram shown in FIG. 7, consider a case where the power of a transmission signal is applied to the transmission terminal TX and a charge amount Q is generated on the transmission terminal TX side. At this time, assuming that there exist no parasitic capacitances Cpara1 to Cpara5, the charge amounts stored in the off capacitances Coff1 to Coff5 are all the same charge amount Q. Accordingly, in an ideal state where there are no parasitic capacitances Cpara1 to Cpara5, the capacitance values of the off capacitances Coff1 to Coff5 are the same and the charge amounts accumulated therein are the charge amount Q. Therefore, the voltage amplitudes applied to the off capacitances Coff1 to Coff5 become equal to each other.

However, actually, there exist the parasitic capacitances Cpara1 to Cpara5. For this reason, for example, a charge amount Qa of the charge amounts Q is accumulated in the parasitic capacitance Cpara1. Thus, a charge amount Q-Qa is stored in the off capacitance Coff1. Further, since the charge amount Qa is accumulated in the parasitic capacitance Cpara2, a charge amount Q-2Qa is accumulated in the off capacitance Coff2. Likewise, a charge amount Q-3Qa is accumulated in the off capacitance Coff3, and a charge amount Q-4Qa is accumulated in the off capacitance Coff4. Then, a charge amount Q-5Qa is accumulated in the off capacitance Coff5. If the parasitic capacitances Cpara1 to Cpara5 are take into account from this point of view, then the charge amounts stored in the off capacitances Coff1 to Coff5 differ from each other. Specifically, the charge amount accumulated in the off capacitance Coff1 closest to the transmission terminal TX is the largest (charge amount of Q-Qa), and the charge amount accumulated in the off capacitance becomes smaller as the off capacitance comes away from the transmission terminal TX and approaches the GND terminal. Then, the charge amount stored in the off capacitance Coff5 coupled to the GND terminal is the smallest (charge amount of Q-5Qa). At this time, since the electrostatic capacitance values of the off capacitances Coff1 to Coff5 are equal to each other, the voltage amplitudes applied to the off capacitances Coff1 to Coff5 respectively are proportional to the charge amounts accumulated in the off capacitances Coff1 to Coff5, respectively.

In this case, since the charge amounts stored in the off capacitances Coff1 to Coff5 differ from each other, the voltage amplitudes applied to the off capacitances Coff1 to Coff5 are not uniform but instead are nonuniform and thus differ from one another. Specifically, the voltage amplitude applied to the off capacitance Coff1 is the largest, and the applied voltage amplitude decreases gradually from the off capacitance Coff2 to the off capacitance Coff4. Then, the applied voltage amplitude becomes the smallest at the off capacitance Coff5 coupled to the GND terminal. Thus, when the parasitic capacitances Cpara1 to Cpara5 are not taken into consideration, one fifth of the maximum voltage amplitude applied between the transmission terminal TX and the GND terminal is the largest voltage amplitude applied to the respective off capacitances Coff1 to Coff5. On the other hand, since there actually exist the parasitic capacitances Cpara1 to Cpara5, the voltage amplitudes applied to the off capacitances Coff1 to Coff5 become nonuniform as described above. For example, since the largest voltage is applied to the off capacitance Coff1, a large voltage amplitude no less than one fifth of the maximum voltage amplitude applied between the transmission terminal TX and the GND terminal becomes the largest voltage amplitude applied to the off capacitance Coff1.

As described above, it is understood that when the parasitic capacitances are taken into consideration where the TX shunt transistor SH (TX) provided between the transmission terminal TX and the GND terminal is OFF, the voltage amplitudes applied to the MISFETs QN1 to $Q_{N5}$ configuring the TX shunt transistor SH (TX) become nonuniform.

Figure 8:
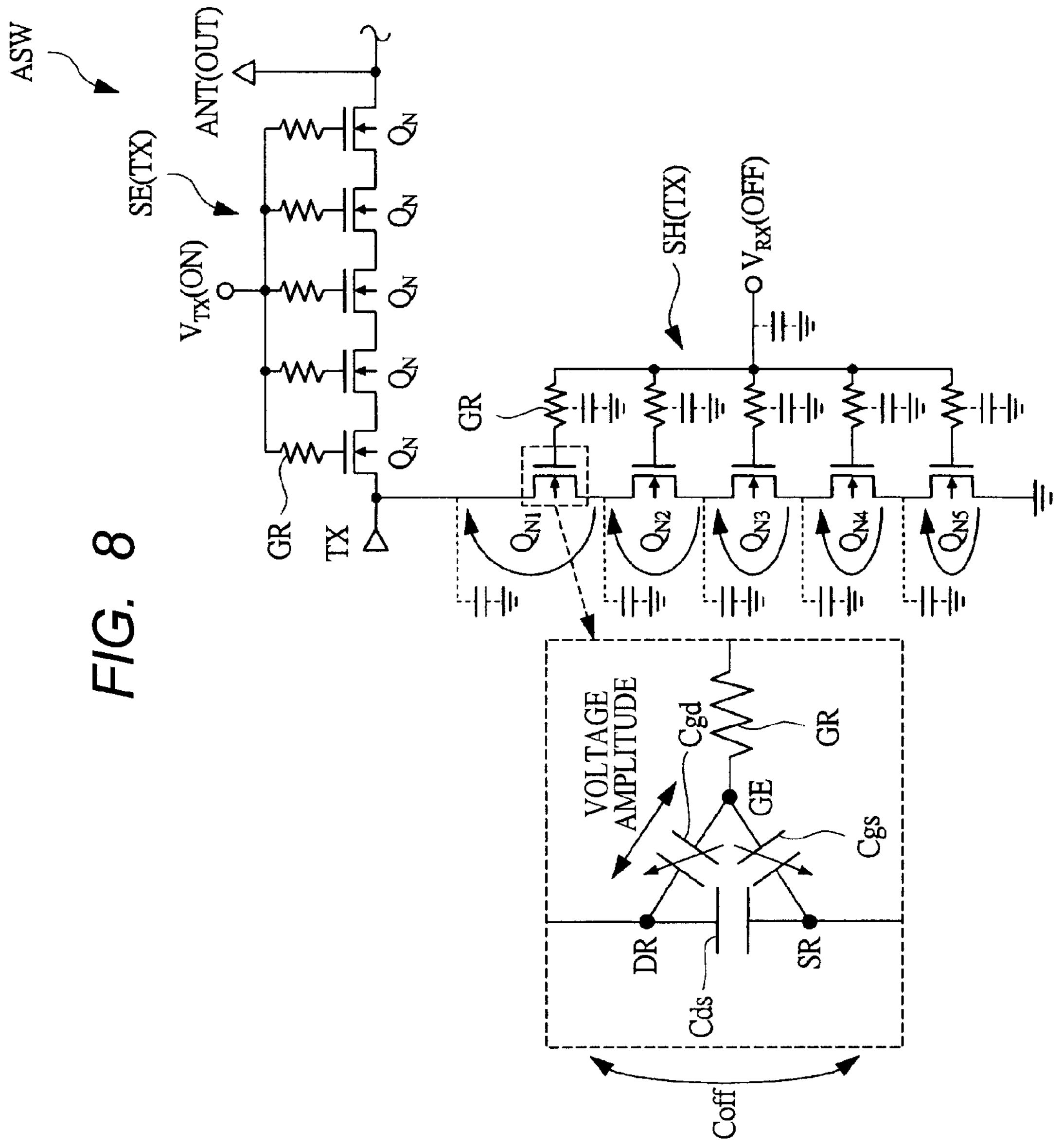
FIG. 8 is a diagram for describing that high-order harmonics are generated as a result of the generation of the nonuniformity of the voltage amplitude applied to each of the MISFETs that configure the TX shunt transistor.

A description will next be given to a case in which the generation of high-order harmonics increases when the voltage amplitude applied to each of the MISFETs $Q_{N1}$ to $Q_{N5}$ becomes nonuniform. FIG. 8 is a diagram for explaining an equivalent circuit of the five MISFETs QN1 to $Q_{N5}$ configuring the TX shunt transistor SH (TX) when the TX shunt transistor SH (TX) provided between the transmission terminal TX and the GND terminal is OFF. As shown in FIG. 8, when the MISFETs $Q_{N1}$ to $Q_{N5}$ are OFF, they can be respectively represented by an off capacitance Coff formed between a drain region DR and a source region SR, i.e., an inter-wire capacitance Cds formed between a wiring coupled to the drain region DR and a wiring coupled to the source region SR, a capacitance Cgd formed between the drain region DR and the gate electrode GE, and a capacitance Cgs formed between the source region SR and the gate electrode GE. At this time, although the inter-wire capacitance Cds is approximately constant, the capacitance Cgd formed between the drain region DR and the gate electrode GE and the capacitance Cgs formed between the source region SR and the gate electrode GE serve as variable capacitances. This is because the width of a depletion layer formed in a diffusion layer (semiconductor region) that configures the source region SR and the drain region DR varies. That is, the dependence of the electrostatic capacitance value on an applied voltage value exists with respect to the capacitance Cgd and the capacitance Cgs.

Figure 9:
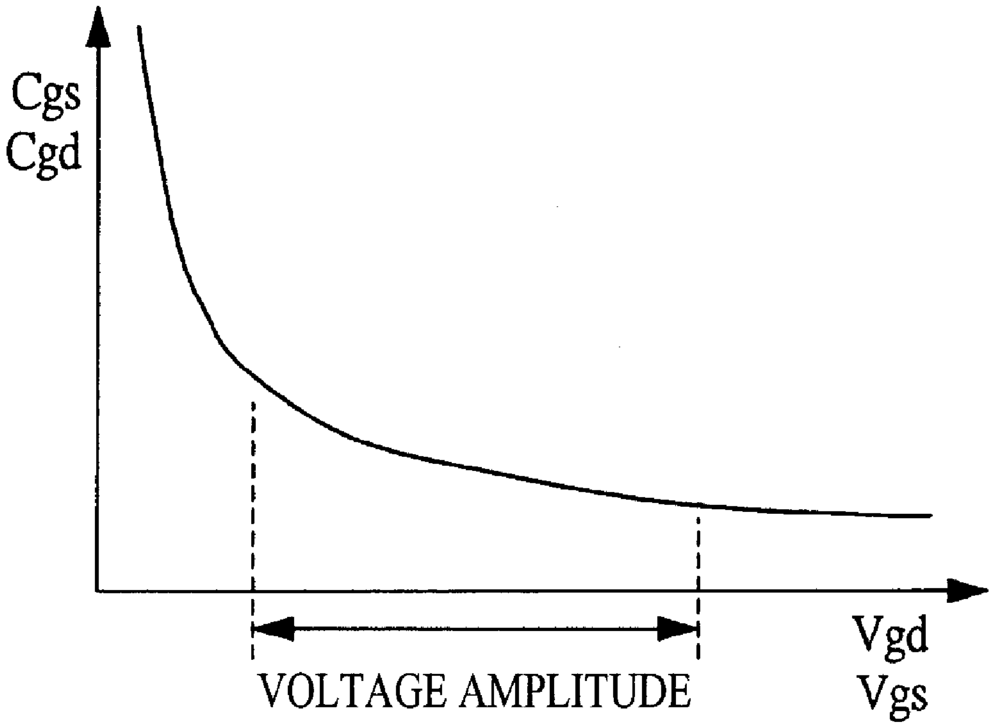
FIG. 9 is a diagram showing that voltage dependence exists between a source-to-gate capacitance and a drain-to-gate capacitance.

FIG. 9 is a graph showing a relationship between the capacitance Cgd (capacitance Cgs) and a voltage Vgd applied between the gate electrode GE and the drain region DR (a voltage Vgs applied between the gate electrode GE and the source region SR). It is understood that as shown in FIG. 9, the capacitance Cgd (capacitance Cgs) varies greatly with respect to the voltage Vgd (voltage Vgs). It is understood that this curve indicative of the variation in the capacitance Cgd (capacitance Cgs) is a curve including a lot of nonlinear components. Accordingly, the higher the voltage amplitude applied to the voltage Vgd (voltage Vgs), the larger the variation in the electrostatic capacitance value of the capacitance Cgd (capacitance Cgs). Since the capacitance variation in the capacitance Cgd (capacitance Cgs) is nonlinear as also apparent from FIG. 9, high-order harmonics are generated in accordance with the variation in the nonlinear capacitance Cgd (capacitance Cgs).

The voltage amplitude applied to each of the MISFETs $Q_{N1}$ to $Q_{N5}$ configuring the TX shunt transistor SH (TX) becomes nonuniform. As a result, the voltage amplitude applied to the first MISFET $Q_{N1}$ which is coupled closest to the transmission terminal TX becomes large. This voltage amplitude corresponds to the voltage amplitude applied between the source region and the drain region of the first MISFET $Q_{N1}$. The fact that the voltage amplitude applied between the source region and the drain region of the first MISFET $Q_{N1}$ increases simultaneously means that the voltage amplitude applied between the source region and the gate electrode of the first MISFET $Q_{N1}$ or the voltage amplitude applied between the drain region and the gate electrode increases. Thus, as the variation in the voltage Vgd or voltage Vgs of the first MISFET $Q_{N1}$ changes, the variation of the capacitance Cgd (capacitance Cgs) will also change. As a result, high-order harmonics increases reflecting on the nonlinearity of the capacitance variation. That is, since the voltage amplitude applied to each of the MISFETs $Q_{N1}$ to $Q_{N5}$ configuring the TX shunt transistor SH (TX) becomes nonuniform in the comparative example, the voltage amplitude applied to the first MISFET $Q_{N1}$ coupled closest to the transmission terminal TX increases more than necessary, thereby increasing the generation of high-order harmonics.

Further, an increase in the generation of high-order harmonics will be described in the comparative example. For example, a large parasitic capacitance or the like increases the nonuniformity of the voltage amplitude applied to each of the MISFETs $Q_{N1}$ to $Q_{N5}$ configuring the TX shunt transistor SH (TX). In this case, for example, the voltage amplitude applied to the first MISFET $Q_{N1}$ becomes much larger than an average value of the uniformly equally-divided voltage amplitudes. Therefore, the voltage applied between the source region and the drain region of the first MISFET $Q_{N1}$ may exceed the breakdown voltage (breakdown voltage BVds between the source region and the drain region) of the first MISFET $Q_{N1}$. On the other hand, in the MISFET $Q_{N5}$ coupled to the GND terminal for example, the voltage amplitude applied thereto becomes smaller than the average value of the uniformly equally-divided voltage amplitudes. When the nonuniformity of the voltage amplitude applied to each of the MISFETs $Q_{N1}$ to $Q_{N5}$ configuring the TX shunt transistor SH (TX) increases in this way, the first MISFET $Q_{N1}$ to which a large voltage amplitude is applied will break down. Then, the generation of high-order harmonics from the broken-down first MISFET $Q_{N1}$ increases.

Figure 10:
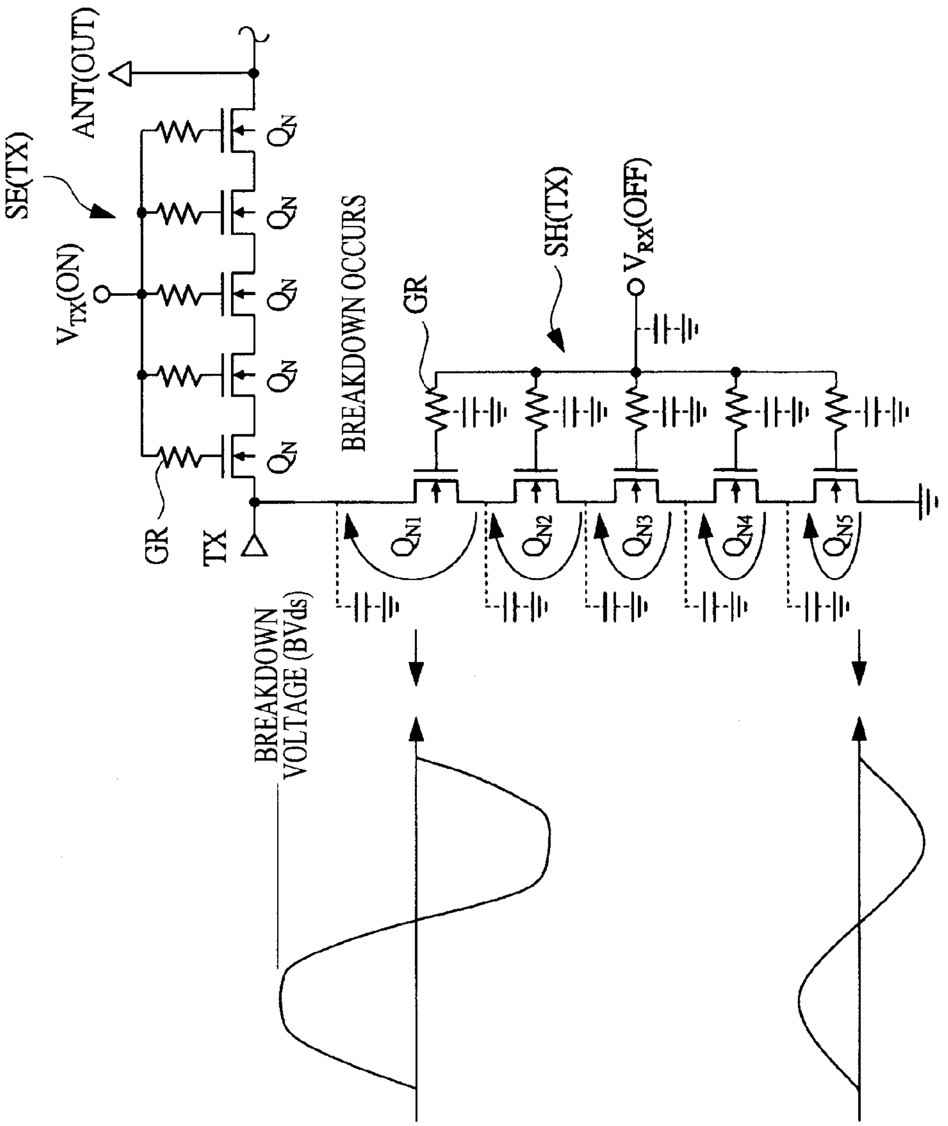
FIG. 10 is a diagram for describing that high-order harmonics are generated as a result of the generation of the nonuniformity of the voltage amplitude applied to each of the MISFETs that configure the TX shunt transistor.

FIG. 10 is a diagram showing the broken-down first MISFET $Q_{N1}$ and a voltage waveform associated with the first MISFET $Q_{N1}$, and the non-broken down last MISFET $Q_{N5}$, and a voltage waveform associated with the MISFET $Q_{N5}$. In FIG. 10, the voltage waveform of the non-broken down MISFET $Q_{N5}$ has a shape close to a sine wave and hardly generates nonlinear components. On the other hand, since the voltage waveform of the broken-down first MISFET $Q_{N1}$ varies as if the upper part of the sine wave is clipped, the nonlinearity will suddenly increase. Therefore, the generation of high-order harmonics due to the nonlinearity will increase from the broken-down first MISFET $Q_{N1}$.

As described above, the high-order harmonics outputted from the antenna switch are generated mainly from the TX shunt transistor SH (TX), which is OFF. It is understood that in particular, when the nonuniformity of the voltage amplitude applied to each of the MISFETs $Q_{N1}$ to $Q_{N5}$ configuring the TX shunt transistor SH (TX) increases, the generation of high-order harmonics increases. Thus, in order to suppress the high-order harmonics outputted from the antenna switch, it is sufficient if the nonuniformity of the voltage amplitude applied to each of the MISFETs $Q_{N1}$ to $Q_{N5}$ configuring the TX shunt transistor SH (TX) can be suppressed. Thus, in an antenna switch according to the first embodiment shown below, a description will be given about a technical idea capable of suppressing the nonuniformity of the voltage amplitude applied to each of the MISFETs $Q_{N1}$ to $Q_{N5}$ configuring the TX shunt transistor SH (TX).

Circuit Configuration of Antenna Switch According to the First Embodiment

The circuit configuration of the antenna switch according to the first embodiment will be explained. Although the circuit configuration of the antenna switch ASW1 used in the single band portable phone 1 shown in FIG. 1 will be mainly described in the present specification, the circuit configuration of the antenna switch ASW1*a* used in the dual band portable phone 201 shown in FIG. 2 is similar thereto.

Figure 11:
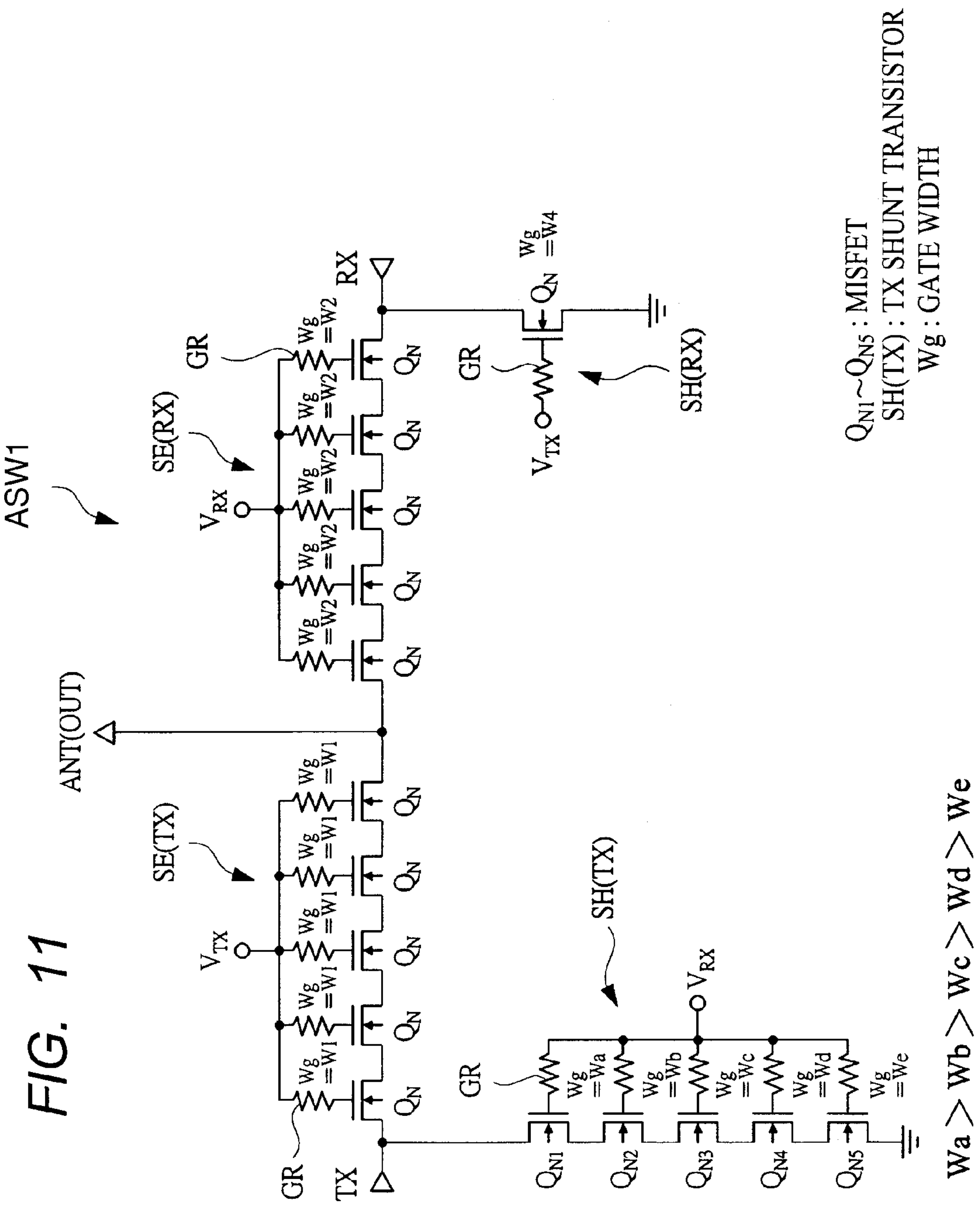
FIG. 11 is a diagram showing a circuit configuration of an antenna switch according to the first embodiment.

FIG. 11 is a diagram showing a circuit configuration of the antenna switch ASW1 according to the first embodiment. As shown in FIG. 11, the antenna switch ASW1 according to the first embodiment has the transmission terminal TX, reception terminal RX, and antenna terminal ANT (OUT). The antenna switch ASW1 according to the first embodiment includes the TX series transistor SE (TX) between the transmission terminal TX and the antenna terminal ANT (OUT) and includes the RX series transistor SE (RX) between the reception terminal RX and the antenna terminal ANT (OUT). Further, the antenna switch ASW1 according to the first embodiment has the TX shunt transistor SH (TX) between the transmission terminal TX and the GND terminal and has the RX shunt transistor SH (RX) between the reception terminal RX and the GND terminal. The transmission terminal TX formed in the antenna switch ASW1 is electrically coupled to the power amplifier HPA shown in FIG. 1. The reception terminal RX is electrically coupled to the low noise amplifier LNA shown in FIG. 1. At this time, it can be said that since the low noise amplifier LNA is a part of the reception circuit, the reception terminal RX of the antenna switch ASW1 is electrically coupled to the reception circuit. Furthermore, the antenna terminal ANT (OUT) formed in the antenna switch ASW1 is electrically coupled to the antenna ANT shown in FIG. 1.

In the antenna switch ASW1 according to the first embodiment shown in FIG. 11, the TX series transistor SE (TX), the RX series transistor SE (RX) and the RX shunt transistor SH (RX) are similar in configuration to those in the comparative example shown in FIG. 3. That is, even in the antenna switch ASW1 according to the first embodiment, the TX series transistor SE (TX) is comprised of five MISFETs $Q_N$ coupled in series between the transmission terminal TX and the antenna terminal ANT (OUT), for example. The RX series transistor SE (RX) is comprised of five MISFETs $Q_N$ coupled in series between the antenna terminal ANT (OUT) and the reception terminal RX, for example. Further, the RX shunt transistor SH (RX) is comprised of one MISFET $Q_N$ coupled between the reception terminal RX and the GND terminal, for example.

The distinguishing characteristics of the antenna switch ASW1 according to the first embodiment reside in the configuration of the TX shunt transistor SH (TX). As described above, when a high-power transmission signal is outputted, high-order harmonics generated from the TX shunt transistor SH (TX) which is OFF, present a problem in particular. From this, in the first embodiment, the high-order harmonics generated from the TX shunt transistor SH (TX) being OFF are suppressed by improving the configuration of the TX shunt transistor SH (TX) seen in the comparative example of FIG. 3 in order to suppress the generation of the high-order harmonics from the TX shunt transistor SH (TX) which is OFF.

The configuration of the TX shunt transistor SH (TX), which is the feature of the first embodiment, will be specifically explained. In the antenna switch ASW1 according to the first embodiment shown in FIG. 11, the TX shunt transistor SH (TX) is comprised of five MISFETs $Q_{N1}$ through $Q_{N5}$ coupled in series between the transmission terminal TX and the common terminal GND, for example. The first embodiment is different from the comparative example of FIG. 3 in that the five MISFETs $Q_{N1}$ through $Q_{N5}$ configuring the TX shunt transistor SH (TX) of the first embodiment are configured so as to differ from one another in gate width. That is, in the comparative example of FIG. 3, the gate widths Wg of the five MISFETs QN1 through $Q_{N5}$ that configure the TX shunt transistor SH (TX) are configured so as to be identical to each other (refer to FIG. 3 (Wg=W3)), whereas in the first embodiment, the gate widths Wg of the five MISFETs $Q_{N1}$ through $Q_{N5}$ configuring the TX shunt transistor SH (TX) are different from each other.

Described in detail, assuming that as shown in FIG. 11, the gate width Wg of the first MISFET $Q_{N1}$=Wa, the gate width Wg of the MISFET $Q_{N2}$=Wb, the gate width Wg of the MISFET $Q_{N3}$=Wc, the gate width Wg of the MISFET $Q_{N4}$=Wd, and the gate width Wg of the last MISFET $Q_{N5}$=We, the gate electrodes of the MISFETs $Q_{N1}$ through $Q_{N5}$ are formed in such a manner that a relationship of Wa>Wb>Wc>Wd>We is established. In other words, it can be said that the feature of the first embodiment is that in a plurality of the MISFETs $Q_{N1}$ through $Q_{N5}$, their gate widths Wg decrease gradually from the transmission terminal TX to the common terminal GND. Alternatively, one can say that their gate widths Wg increase gradually from the last MISFET $Q_{N5}$ coupled to the side close to the common terminal GND to the first MISFET $Q_{N1}$ coupled to the side close to the transmission terminal TX. Thus, according to the first embodiment, when a high-power transmission signal is output, high-order harmonics generated from the TX shunt transistor SH (TX) which is OFF, can be suppressed.

A description will be given below to the case in which according to the antenna switch ASW in the first embodiment, the high-order harmonics generated from the TX shunt transistor SH (TX) being OFF can be suppressed, referring to the drawing.

Figure 12:
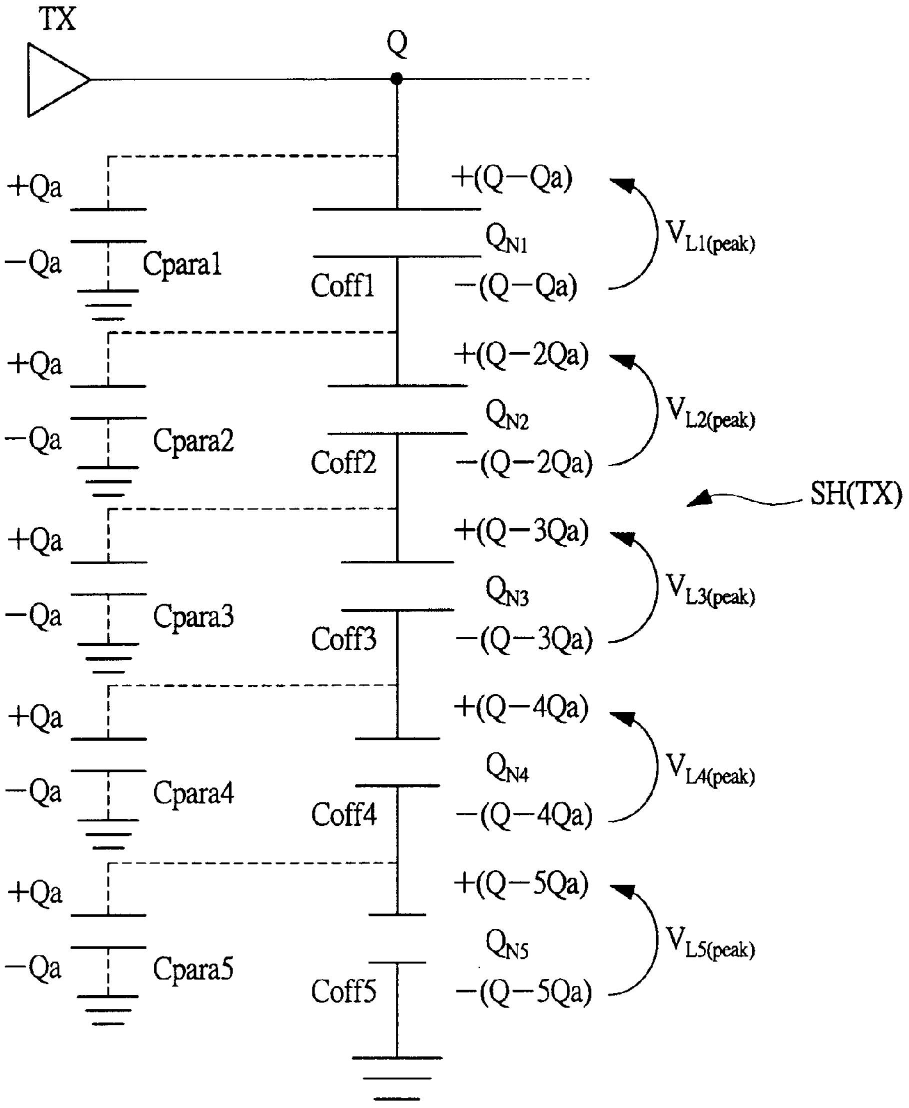
FIG. 12 is a diagram for explaining a mechanism in which the nonuniformity of a voltage amplitude applied to each MISFET that configure the TX shunt transistor is suppressed according to the first embodiment.

FIG. 12 is a diagram showing, in an equivalent circuit, the MISFETs $Q_{N1}$ to $Q_{N5}$ coupled in series between the transmission terminal TX and the common terminal GND. That is, the TX shunt transistor SH (TX) comprised of the serially-coupled MISFETs $Q_{N1}$ to $Q_{N5}$ is formed between the transmission terminal TX and the common terminal GND. In FIG. 12, however, the time of transmission of a transmission signal is shown, and the TX shunt transistor SH (TX) is OFF. In this state, all of the MISFETs $Q_{N1}$ to $Q_{N5}$ configuring the TX shunt transistor SH (TX) are OFF. Accordingly, the off MISFETs $Q_{N1}$ to $Q_{N5}$ can be represented by off capacitances Coff1 through Coff5 generated between the source region and the drain region, respectively. Thus, in FIG. 12, the MISFETs $Q_{N1}$ to $Q_{N5}$ coupled in series are shown with the five off capacitances Coff1 to Coff5 coupled in series.

Here, the feature of the first embodiment resides in that the capacitance values of the five off capacitances Coff1 through Coff5 coupled in series between the transmission terminal TX and the common terminal GND are different from one another. That is, in the first embodiment, the capacitance values of the five off capacitances Coff1 through Coff5 are set so as to meet a relationship of Coff1>Coff2>Coff3>Coff4>Coff5.

In FIG. 12, the parasitic capacitances (to the GND potential) present in the respective MISFETs $Q_{N1}$ to $Q_{N5}$ are shown with parasitic capacitances Cpara1 to Cpara5. The parasitic capacitances Cpara1 through Cpara5 are formed corresponding to the respective off capacitances Coff1 to Coff5.

In the equivalent circuit diagram shown in FIG. 12, consider a case where the power of a transmission signal is applied to the transmission terminal TX and a charge amount Q is generated on the transmission terminal TX side. At this time, there exist parasitic capacitances Cpara1 to Cpara5. For this reason, for example, a charge amount Qa of the charge amounts Q is accumulated in the parasitic capacitance Cpara1. Thus, a charge amount Q-Qa is stored in the off capacitance Coff1. Further, since the charge amount Qa is accumulated in the parasitic capacitance Cpara2, a charge amount Q-2Qa is accumulated in the off capacitance Coff2. Likewise, a charge amount Q-3Qa is accumulated in the off capacitance Coff3, and a charge amount Q-4Qa is accumulated in the off capacitance Coff4. Then, a charge amount Q-5Qa is accumulated in the off capacitance Coff5. If the parasitic capacitances Cpara1 to Cpara5 are take into account from this point of view, then the charge amounts stored in the off capacitances Coff1 to Coff5 differ from each other. Described specifically, the charge amount accumulated in the off capacitance Coff1 closest to the transmission terminal TX is the largest (charge amount of Q-Qa), and the charge amount accumulated in the off capacitance becomes smaller as the off capacitance comes away from the transmission terminal TX and approaches the common terminal GND. Then, the charge amount stored in the off capacitance Coff5 coupled to the common terminal GND becomes the smallest (charge amount of Q-5Qa).

As shown in FIG. 12, when the voltage amplitude applied to the off capacitance Coff1 is a voltage amplitude $V_{L1(peak)}$, the voltage amplitude applied to the off capacitance Coff2 is a voltage amplitude $V_{L2(peak)}$, the voltage amplitude applied to the off capacitance Coff3 is a voltage amplitude $V_{L3(peak)}$, the voltage amplitude applied to the off capacitance Coff4 is a voltage amplitude $V_{L4(peak)}$, and the voltage amplitude applied to the off capacitance Coff5 is a voltage amplitude $V_{L5(peak)}$, there are obtained from the capacitance formula, $V_{L1(peak)} \propto (Q-Qa)/Coff1$, $V_{L2(peak)} \propto (Q-2Qa)/Coff2$, $V_{L3(peak)} \propto (Q-3Qa)/Coff3$, $V_{L4(peak)} \propto (Q-4Qa)/Coff4$, and $V_{L5(peak)} \propto (Q-5Qa)/Coff5$.

Thus, when the electrostatic capacitance values of the off capacitances Coff1 through Coff5 are equal to each other as in the comparative example, the voltage amplitude $V_{L1(peak)}$ through the voltage amplitude $V_{L5(peak)}$ respectively applied to the off capacitances Coff1 through Coff5 are proportional to the charge amounts accumulated in the off capacitances Coff1 through Coff5. Since, in this case, the charge amounts stored in the off capacitances Coff1 through Coff5 are different from one another, the voltage amplitudes applied to the off capacitances Coff1 through Coff5 are not uniform but instead are nonuniform and thus differ from one another. Specifically, the voltage amplitude applied to the off capacitance Coff1 becomes the largest, and the applied voltage amplitude decreases gradually from the off capacitance Coff2 to the off capacitance Coff4. Then, the applied voltage amplitude becomes the smallest at the off capacitance Coff5 coupled to the common terminal GND.

On the other hand, in the first embodiment, the electrostatic capacitance values of the off capacitances Coff1 through Coff5 are different from one another. They are configured so as to meet a relationship of Coff1>Coff2>Coff3>Coff4>Coff5. For this reason, in the first embodiment, not only the charge amount placed in the denominator but also the off capacitance placed in the numerator vary at the capacitance formula (V=Q/C). In the first embodiment, at the off capacitances Coff1 through Coff5, the charge amount decreases like Q-Qa>Q-2Qa>Q-3Qa>Q-4Qa>Q-5Qa, respectively and correspondingly the off capacitance also decreases like Coff1>Coff2>Coff3>Coff4>Coff5. Accordingly, $(Q-Qa)/Coff1 \approx (Q-2Qa)/Coff2 \approx (Q-3Qa)/Coff3 \approx (Q-4Qa)/Coff4 \approx (Q-5Qa)/Coff5$. This means that the various voltage amplitudes are roughly similar in magnitude to one another, i.e., $V_{L1(peak)} \approx$ the voltage amplitude $V_{L2(peak)} \approx$ the voltage amplitude $V_{L3(peak)} \approx$ the voltage amplitude $V_{L4(peak)} \approx$ the voltage amplitude $V_{L5(peak)}$. That is, in the first embodiment, the electrostatic capacitance values of the off capacitances Coff1 through Coff5 are configured so as to meet the relationship of Coff1>Coff2>Coff3>Coff4>Coff5, so that the voltage amplitudes $V_{L1(peak)}$ through $V_{L5(peak)}$ respectively applied to the off capacitances Coff1 through Coff5 can be made roughly uniform.

In other words, according to the first embodiment, when the TX shunt transistor SH (TX) provided between the transmission terminal TX and the common terminal GND is OFF, the voltage amplitudes respectively applied to the MISFETs $Q_{N1}$ through $Q_{N5}$ configuring the TX shunt transistor SH (TX) can be made uniform even when the parasitic capacitances are taken into consideration. Thus, according to the first embodiment, since the nonuniformity of the voltage amplitudes applied to the MISFETs $Q_{N1}$ through $Q_{N5}$ configuring the TX shunt transistor SH (TX) is suppressed, the application of a large voltage amplitude to the specific MISFET (first MISFET $Q_{N1}$ coupled in series to the transmission terminal TX in particular) is suppressed, thus making it hard to cause a breakdown due to the application of the large voltage amplitude to the specific MISFET. Therefore, according to the first embodiment, there can be obtained an outstanding advantage that high-order harmonics generated from the TX shunt transistor SH (TX) that is OFF can be suppressed.

As described above, the technical idea in the first embodiment is that the TX shunt transistor SH (TX) provided between the transmission terminal TX and the common terminal GND is given a contrivance. Described specifically, the essence of the technical idea in the first embodiment resides in that in order to configure the TX shunt transistor SH (TX), a plurality of MISFETs coupled in series between the transmission terminal TX and the common terminal GND are configured in such a manner that the off capacitances each indicative of the capacitance between the source region and the drain region of the MISFET being OFF increase gradually from the MISFET coupled to the side closest to the common terminal GND to the MISFET coupled to the side closest to the transmission terminal TX.

The above-described technical idea is embodied by paying attention to the fact that the off capacitance of each MISFET is substantially proportional to the size of the gate width of each MISFET. Specifically, a plurality of MISFETs coupled in series between the transmission terminal TX and the common terminal GND are configured in such a manner that the gate widths of the MISFETs increase gradually from the MISFET coupled to the side closest to the common terminal GND to the MISFET coupled to the side closest to the transmission terminal TX. Thus, when the TX shunt transistor SH (TX) is OFF, the voltage amplitudes applied to the MISFETs $Q_{N1}$ through $Q_{N5}$ respectively, which configure the TX shunt transistor SH (TX), can be made roughly uniform even when the parasitic capacitances are taken into consideration.

That is, although the first embodiment is characterized in that the gate widths of a plurality of MISFETs are varied in such a manner that the electrostatic capacitance values of the off capacitances Coff1 through Coff5 meet the relationship of Coff1>Coff2>Coff3>Coff4>Coff5, there are known various methods to vary the gate widths of the MISFETs in such a manner as to meet this relationship. A description will be given below, particularly to, as examples for varying the gate widths of the plural MISFETs in such a manner as to meet the relationship of Coff1>Coff2>Coff3>Coff4>Coff5 referred to above, a case in which the gate widths of a plurality of MISFETs are varied on a linear function basis, and a case in which the gate widths of a plurality of MISFETs are varied on a quadratic function basis. The technical idea in the first embodiment is however not limited to it, but may be applied even when the gate widths of the MISFETs are varied on cubic, quartic and quintic function bases or an exponential function basis. Even in these cases, the voltage amplitudes applied to a plurality of the MISFETs that configure the TX shunt transistor SH (TX) being OFF can be made uniform. As a result, high-order harmonics generated from the TX shunt transistor SH (TX) that is OFF can be suppressed.

Figure 13:
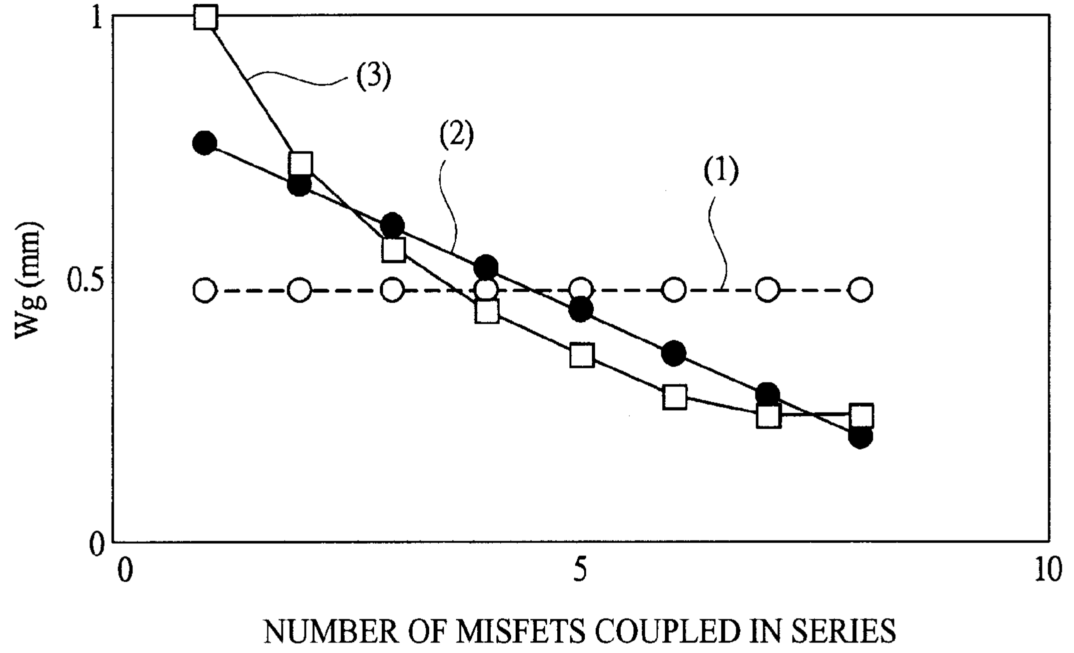
FIG. 13 is a graph showing a relationship between numbers of MISFETs series-coupled between a transmission terminal and a common terminal GND, and gate widths of the MISFETs.

FIG. 13 is a graph showing a relationship between numbers of MISFETs coupled in series between a transmission terminal TX and a common terminal GND, and gate widths Wg of the respective MISFETs. FIG. 13 shows that the horizontal axis indicates the numbers of the MISFETs coupled in series, and the vertical axis indicates the size of each of the gate widths Wg of the MISFETs. In FIG. 13, the first MISFET is a MISFET coupled directly to the transmission terminal TX, and the second, third, fourth, fifth, six and seventh MISFETs are respectively MISFETs disposed in such a manner as to approach the common terminal GND side gradually from the second MISFET to the seventh MISFET. Then, the eighth MISFET is a MISFET coupled directly to the common terminal GND. That is, the example of FIG. 13 shows the configuration in which the first through eighth MISFETs are coupled in series from the transmission terminal TX to the common terminal GND.

A graph (1) shown in FIG. 13 will first be explained, predicated on this. As apparent from FIG. 13, the graph (1) shows an example in which the gate widths Wg of all the first through eighth MISFETs are constant, and corresponds to the comparative example.

A graph (2) shown in FIG. 13 will next be explained. The graph (2) shows a case in which the gate widths Wg decrease on a linear function basis gradually from the first MISFET to the eighth MISFET. That is, the graph (2) shows an example in which the eight MISFETs coupled in series between the transmission terminal TX and the common terminal GND are configured in such a manner that the gate widths Wg of the MISFETs decrease on a linear function basis gradually from the MISFET coupled to the side close to the transmission terminal TX to the MISFET coupled to the side close to the common terminal GND. In other words, the graph (2) shows an example in which the eight MISFETs coupled in series between the transmission terminal TX and the common terminal GND are configured in such a manner that the gate widths Wg of the MISFETs increase on a linear function basis gradually from the MISFET coupled to the side close to the common terminal GND to the MISFET coupled to the side close to the transmission terminal TX.

Subsequently, a graph (3) shown in FIG. 13 will be explained. The graph (3) shows a case in which the gate widths Wg decrease on a quadric function basis gradually from the first MISFET to the eighth MISFET. That is, the graph (3) shows an example in which the eight MISFETs coupled in series between the transmission terminal TX and the common terminal GND are configured in such a manner that the gate widths Wg of the MISFETs decrease on a quadric function basis gradually from the MISFET coupled to the side close to the transmission terminal TX to the MISFET coupled to the side close to the common terminal GND. In other words, the graph (3) shows an example in which the eight MISFETs coupled in series between the transmission terminal TX and the common terminal GND are configured in such a manner that the gate widths Wg of the MISFETs increase on a quadric function basis gradually from the MISFET coupled to the side close to the common terminal GND to the MISFET coupled to the side close to the transmission terminal TX.

It can be said from the above that the graph (1) of FIG. 13 shows a configuration in which the gate widths of a plurality of MISFETs that configure the TX shunt transistor SH (TX) are uniform, and that the graph (2) of FIG. 13 shows a configuration in which as the gate widths of a plurality of MISFETs that configure the TX shunt transistor SH (TX) are transitioned gradually from the MISFET coupled to the side close to the common terminal GND to the MISFET coupled to the side close to the transmission terminal TX, the gate widths Wg of the MISFETs increase on a linear function basis. Further, it can be said that the graph (3) of FIG. 13 shows a configuration in which as the gate widths of a plurality of MISFETs that configure the TX shunt transistor SH (TX) are transitioned from the MISFET coupled to the side close to the common terminal GND to the MISFET coupled to the side close to the transmission terminal TX, the gate widths Wg of the MISFETs increase on a quadric function basis.

Subsequently, a description will be given about the voltage amplitude applied to each of the first through eighth MISFETs configuring the TX shunt transistor SH (TX) when the TX shunt transistor SH (TX) having the structure shown in each of the graphs (1) through (3) of FIG. 13 is OFF.

Figure 14:
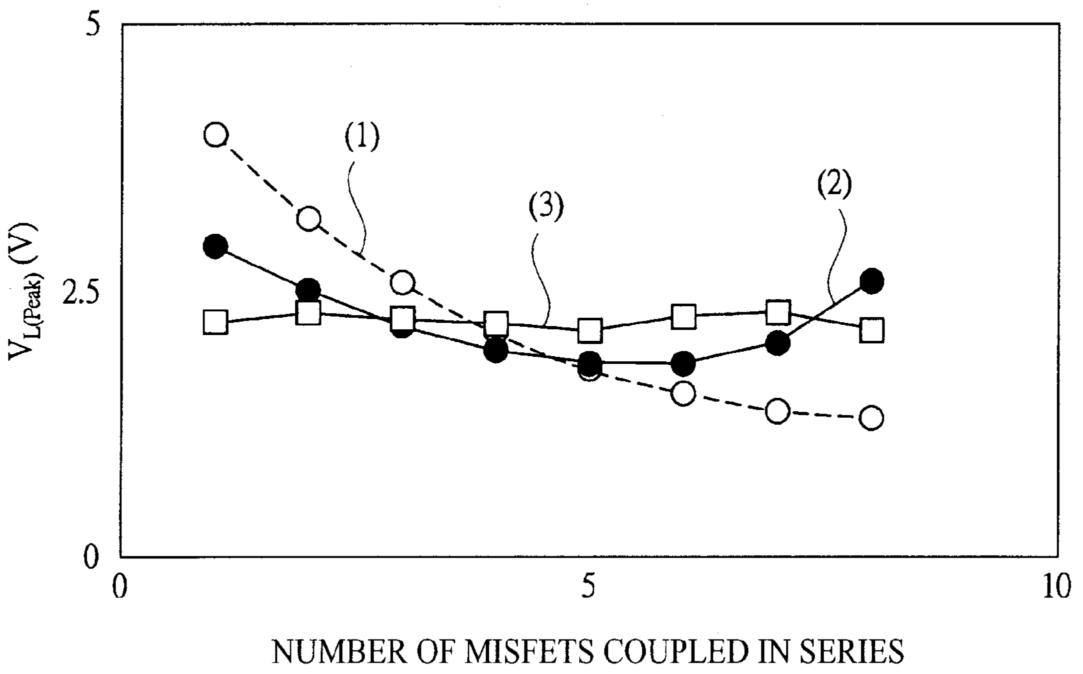
FIG. 14 is a graph illustrating a relationship between the numbers of the MISFETs series-coupled between the transmission terminal and the common terminal GND, and the voltage amplitudes applied to the MISFETs.

FIG. 14 is a graph showing a relationship between numbers of MISFETs coupled in series between a transmission terminal TX and a common terminal GND, and voltage amplitudes $V_{L(peak)}$ applied to the respective MISFETs. In FIG. 14, the horizontal axis indicates the numbers of the MISFETs coupled in series, and the vertical axis indicates the magnitude of each of the voltage amplitudes $V_{L(peak)}$ applied to the respective MISFETs. In FIG. 14, the first MISFET is a MISFET coupled directly to the transmission terminal TX, and the second, third, fourth, fifth, six and seventh MISFETs are respectively MISFETs disposed in such a manner as to approach the common terminal GND side gradually from the second MISFET to the seventh MISFET. Then, the eighth MISFET is a MISFET coupled directly to the common terminal GND. That is, the example of FIG. 14 shows a configuration in which the first through eighth MISFETs are coupled in series from the transmission terminal TX to the common terminal GND.

A graph (1) shown in FIG. 14 will first be explained, predicated on this. The graph (1) shown in FIG. 14 is graph corresponding to the structure (uniform in gate width) shown in the graph (1) of FIG. 13. It is understood that as shown in the graph (1) of FIG. 14, the voltage amplitudes $V_{L(peak)}$ applied to the first through eighth MISFETs, respectively, which configure the TX shunt transistor SH (TX), become nonuniform. Described concretely, it is understood that the voltage amplitude $V_{L(peak)}$ applied to the first MISFET (i.e., the MISFET closest to the TX terminal) is the largest, and the voltage amplitude $V_{L(peak)}$ applied to each subsequent MISFET decreases gradually from the second MISFET to the eight MISFET. It is thus understood that, in the graph (1) of FIG. 14 showing the comparative example, the variation in the voltage amplitude $V_{L(peak)}$ applied to each of the first through eighth MISFETs that configure the TX shunt transistor SH (TX) is large, and the first MISFET to which the largest voltage amplitude $V_{L(peak)}$ is applied, is likely to break down. As a result, the generation of high-order harmonics can be considered to increase due to the breakdown of the first MISFET that is OFF.

A graph (2) shown in FIG. 14 will next be explained. The graph (2) shown in FIG. 14 is a graph corresponding to the structure (the gate width varies on the linear function basis) shown in the graph (2) of FIG. 13. It is understood that in the graph (2) of FIG. 14, the nonuniformity (variation) of the voltage amplitudes $V_{L(peak)}$ applied to the first through eight MISFETs respectively, configuring the TX shunt transistor SH (TX) is reduced as compared with the graph (1) of FIG. 14. Specifically, it is understood that in the first through fifth MISFETs, the voltage amplitude $V_{L(peak)}$ applied to each MISFET decreases gradually, whereas in the sixth through eighth MISFETs, the voltage amplitude $V_{L(peak)}$ applied to each MISFET increases gradually. Accordingly, it is understood that in the graph (2) of FIG. 14, the nonuniformity (variation) of the voltage amplitude $V_{L(peak)}$) applied to each of the first through eighth MISFETs decreases because the voltage amplitudes $V_{L(peak)}$) applied to the MISFETs do not decrease monotonously between the first MISFET and the eight MISFET as in the graph (1) of FIG. 14. It is thus understood that in one example (graph (2) of FIG. 14) in the first embodiment, the nonuniformity of the voltage amplitude $V_{L(peak)}$ applied to each of the first through eighth MISFETs that configure the TX shunt transistor SH (TX) can be suppressed and consequently the generation of high-order harmonics can be suppressed.

Subsequently, a graph (3) of FIG. 14 will be explained. The graph (3) shown in FIG. 14 is a graph corresponding to the structure (the gate width varies on the quadric function basis) shown in the graph (3) of FIG. 13. It is understood that in the graph (3) of FIG. 14, the nonuniformity of the voltage amplitudes $V_{L(peak)}$ applied to the first through eight MISFETs respectively configuring the TX shunt transistor SH (TX) is reduced as compared with the graph (1) of FIG. 14. Specifically, it is understood that in the first through eighth MISFETs, the voltage amplitudes $V_{L(peak)}$ applied to the MISFETs are substantially uniform. Accordingly, it is understood that in the graph (3) of FIG. 14, the nonuniformity (variation) of the voltage amplitudes $V_{L(peak)}$ applied to the first through eighth MISFETs decreases as compared with the graph (1) of FIG. 14 showing the comparative example. It is thus understood that in one example (graph (3) of FIG. 14) in the first embodiment, the nonuniformity of the voltage amplitudes $V_{L(peak)}$ applied to the first through eighth MISFETs that configure the TX shunt transistor SH (TX) can be suppressed and consequently the generation of high-order harmonics can be suppressed.

Comparing the graph (2) (the gate width varies on the linear function basis) of FIG. 14 explaining one example of the first embodiment and the graph (3) (the gate width varies on the quadric function basis) of FIG. 14, the nonuniformity (variation) of the voltage amplitudes $V_{L(peak)}$ applied to the first through eighth MISFETs respectively can be made smaller than the comparative example (graph (1) of FIG. 14) even in both cases. Further, it is understood that when the graph (2) of FIG. 14 and the graph (3) of FIG. 14 are compared, the graph (3) of FIG. 14 enables the nonuniformity (variation) of the voltage amplitudes $V_{L(peak)}$ applied to the first through eighth MISFETs respectively to be made further smaller than the graph (2) of FIG. 14. It is understood from this that when the gate widths of a plurality of MISFETs that configure the TX shunt transistor SH (TX) are varied on a linear function basis and the gate widths of a plurality of MISFETs are varied on a quadric function basis, the latter is more desirable from the viewpoint that the voltage amplitudes applied to the MISFETs respectively are more uniform.

As described above, the feature of the first embodiment resides in that the MISFETs coupled in series between the transmission terminal TX and the common terminal GND are configured in such a manner that the gate widths of the MISFETs increase gradually from the MISFET coupled to the side close to the common terminal GND to the MISFET coupled to the side close to the transmission terminal TX. A configuration of laying out MISFETs, which implements this feature, will be described below. Upon explaining the layout configuration of the MISFETs, a configuration of mounting the antenna switch will first be described and thereafter a configuration of laying out a semiconductor chip having formed the antenna switch therein will be described. Then, a configuration of laying out each MISFET formed in the semiconductor chip will be described.

Configuration of Mounting the Antenna Switch According to the First Embodiment

Figure 15:
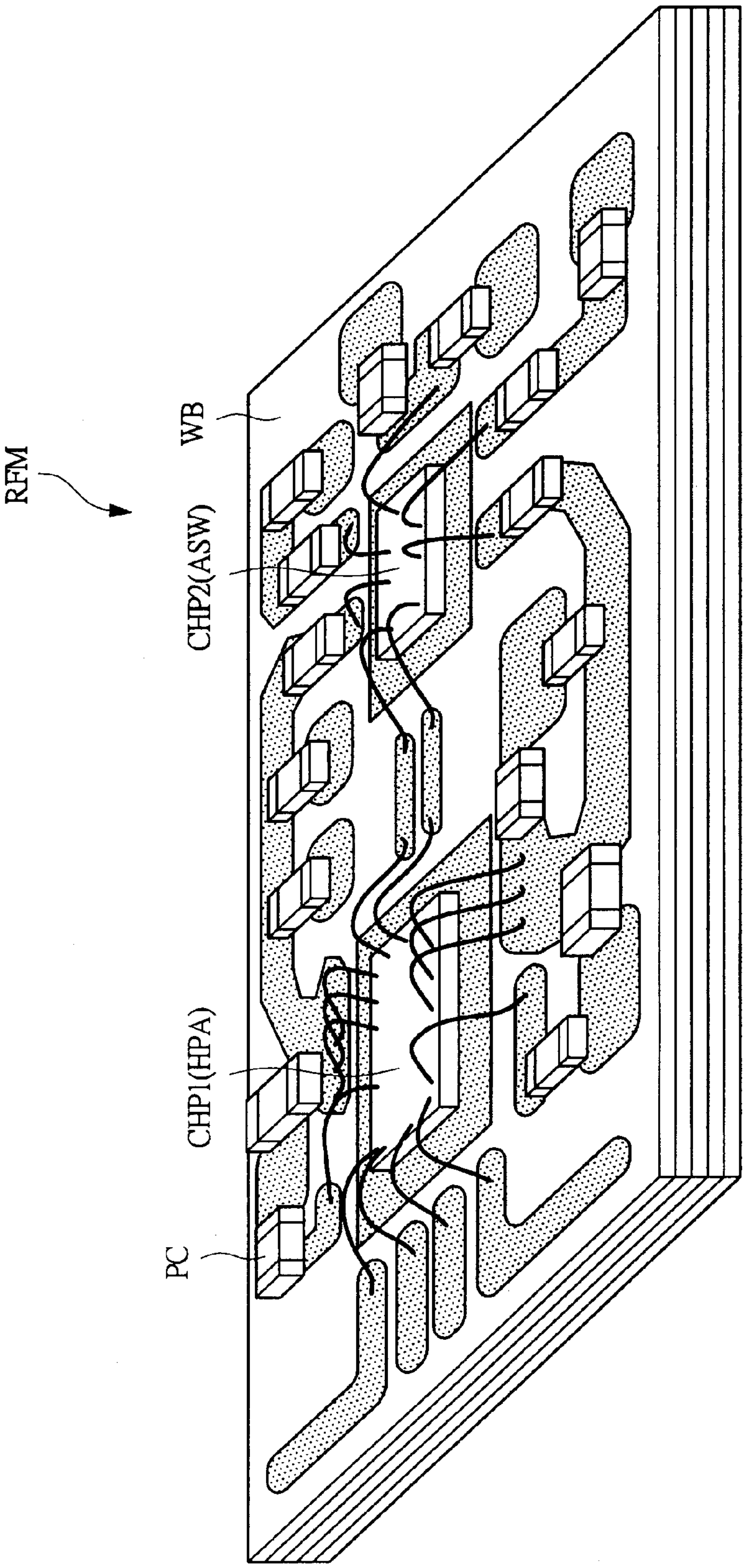
FIG. 15 is a perspective view showing a configuration of mounting an RF module according to the first embodiment.

Next, a configuration of mounting the antenna switch ASW1 in the first embodiment will be described. The antenna switch ASW1 according to the first embodiment configures one RF module RFM together with the power amplifier HPA. FIG. 15 is a perspective view showing the configuration of mounting the RF module RFM in the first embodiment. As shown in FIG. 15, the RF module RFM in the present embodiment includes a semiconductor chip CHP1, a semiconductor chip CHP2 and passive components PC mounted over a wiring board WB. The semiconductor chip CHP1 is a semiconductor chip in which, for example, an LDMOSFET (Laterally Diffused Metal Oxide Semiconductor Field Effect Transistor: Laterally Diffused MOSFET) configuring the power amplifier HPA and the like are formed. On the other hand, the semiconductor chip CHP2 is a semiconductor chip in which, for example, MISFETs configuring the antenna switch ASW1 and the like are formed. The passive component PC is comprised of passive elements such as a resistive element (e.g., chip resistor), a capacitive element (e.g., chip capacitor), or an inductive element (e.g., chip inductor), and is comprised of chip parts, for example. The passive component PC is, for example, a passive component that configures a matching circuit and the like.

The semiconductor chip CHP1 mounted over the wiring board WB is coupled to a conductor pattern formed over the wiring board WB with wires. Further, the conductor pattern is coupled to the passive component PC. Likewise, the semiconductor chip CHP2 mounted over the wiring board WB is coupled to a conductor pattern formed over the wiring board WB with wires. The semiconductor chip CHP1, the semiconductor chip CHP2, and the passive components PC are electrically coupled to one another via the conductor patterns in this manner.

Layout Configuration of Semiconductor Chip Having Formed Antenna Switch Therein

Figure 16:
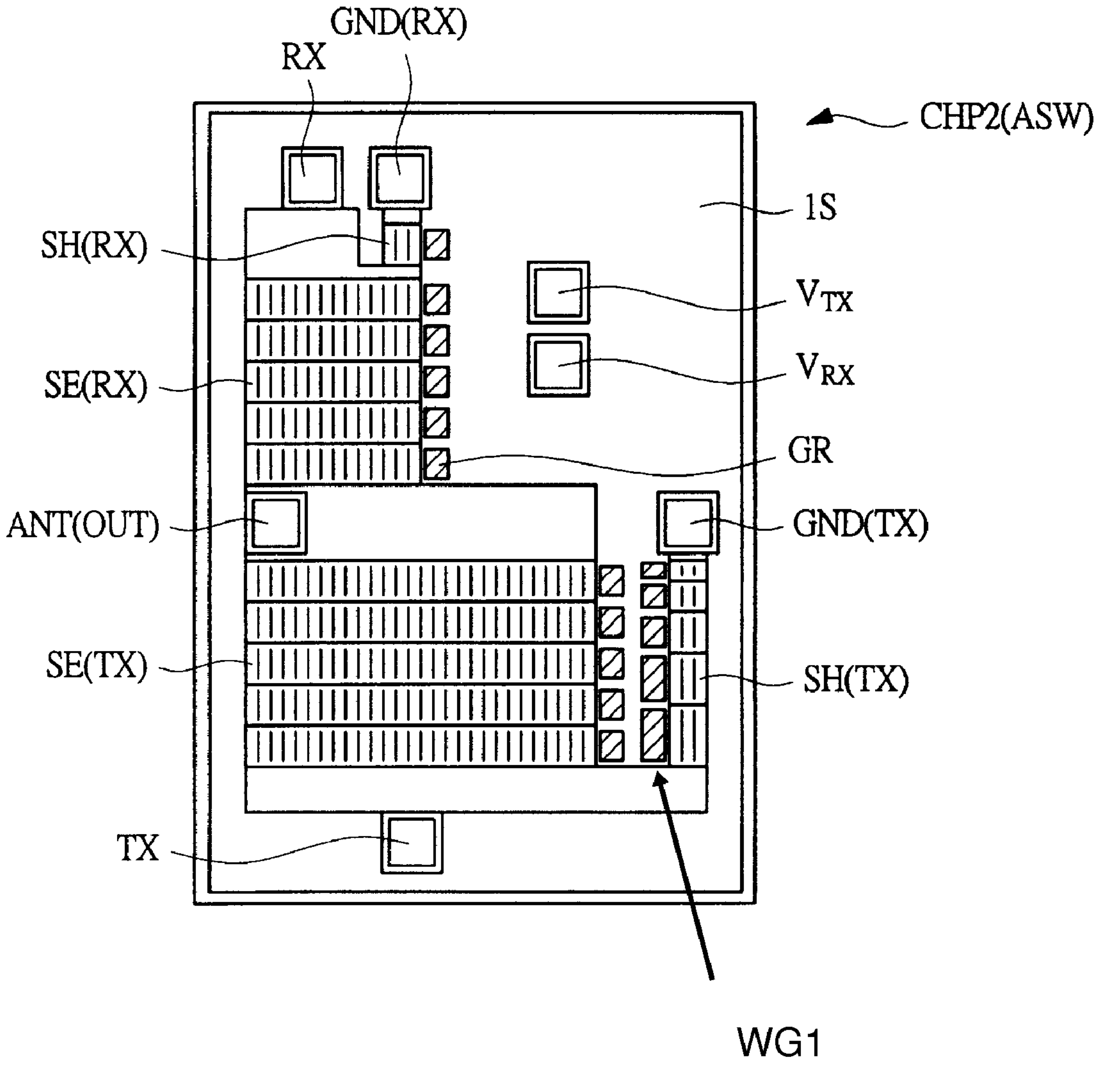
FIG. 16 is a plan view showing a semiconductor chip configuring the antenna switch according to the first embodiment.

Subsequently, a layout configuration of the semiconductor chip CHP2 having formed the antenna switch ASW1 therein will be described. FIG. 16 is a plan view showing the semiconductor chip CHP2 having formed therein the antenna switch ASW1 according to the first embodiment. As shown in FIG. 16, the semiconductor chip CHP2 includes a plurality of terminals and a plurality of elements formed over a rectangular semiconductor substrate (SOI substrate) 1S. Specifically, in FIG. 16, there are formed the reception terminal RX and the common terminal GND (RX) at the upper part of the semiconductor substrate 1S, and there is formed the RX shunt transistor SH (RX) comprised of one MISFET on the lower side of the common terminal GND (RX). The RX series transistor SE (RX) comprised of five MISFETs is formed on the lower side of the RX shunt transistor SH (RX). Then, the gate resistors GR are formed on the right side of the RX shunt transistor SH (RX) and RX series transistor SE (RX). The control terminal $V_{TX}$ and the control terminal $V_{RX}$ are formed on the further right side of the gate resistors GR.

The antenna terminal ANT (OUT) is formed on the lower side of the RX series transistor SE (RX). The TX series transistor SE (TX) comprised of five MISFETs is formed on the lower side of the antenna terminal ANT (OUT). Further, the transmission terminal TX is formed on the lower side of the TX series transistor SE (TX), and the shunt transistor SH (TX) is formed on the right side of the TX series transistor SE (TX) proximate the gate resistors GR. The TX shunt transistor SH (TX) is comprised of five MISFETs, and the common terminal GND (TX) is formed at the upper part of the TX shunt transistor SH (TX).

Here, in the first embodiment, the five MISFETs coupled in series between the common terminal GND (TX) and the transmission terminal TX are configured in such a manner that the gate widths WG1 of the MISFETs increase gradually from the MISFET coupled to the side closest to the common terminal GND (TX) to the MISFET coupled to the side closest to the transmission terminal TX.

Figure 17:
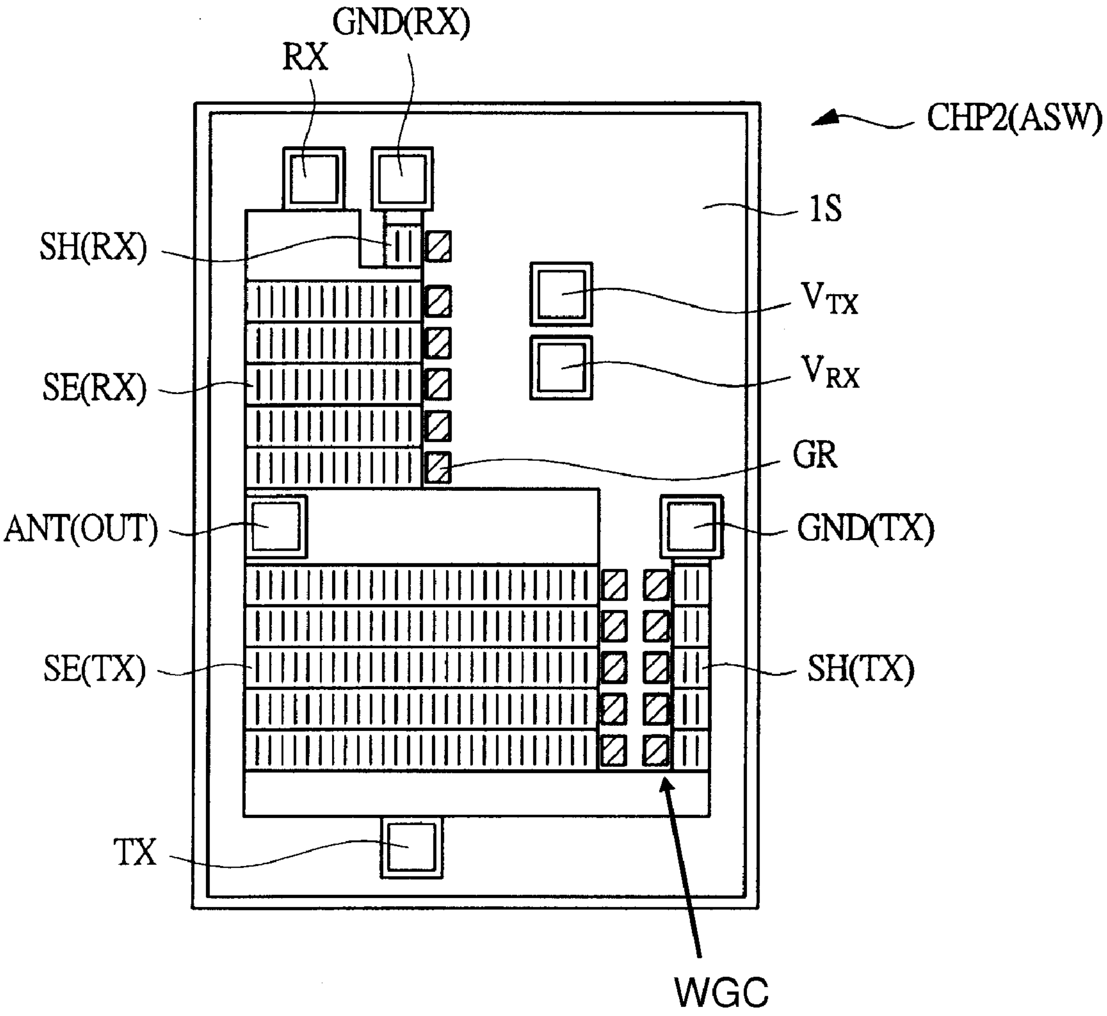
FIG. 17 is a plan view illustrating a semiconductor chip configuring the antenna switch according to a comparative example.

On the other hand, FIG. 17 is a plan view showing the semiconductor chip CHP2 having formed therein the antenna switch ASW according to the comparative example. Although the comparative example shown in FIG. 17 has a layout configuration almost similar to that of the first embodiment shown in FIG. 16, the configuration of the TX shunt transistor SH (TX) differs from that of the first embodiment. That is, although the TX shunt transistor SH (TX) is comprised of five MISFETs even in the comparative example shown in FIG. 17, the gate widths WGC of all the five MISFETs become the same.

Layout Configuration of TX Shunt Transistor

Figure 18:
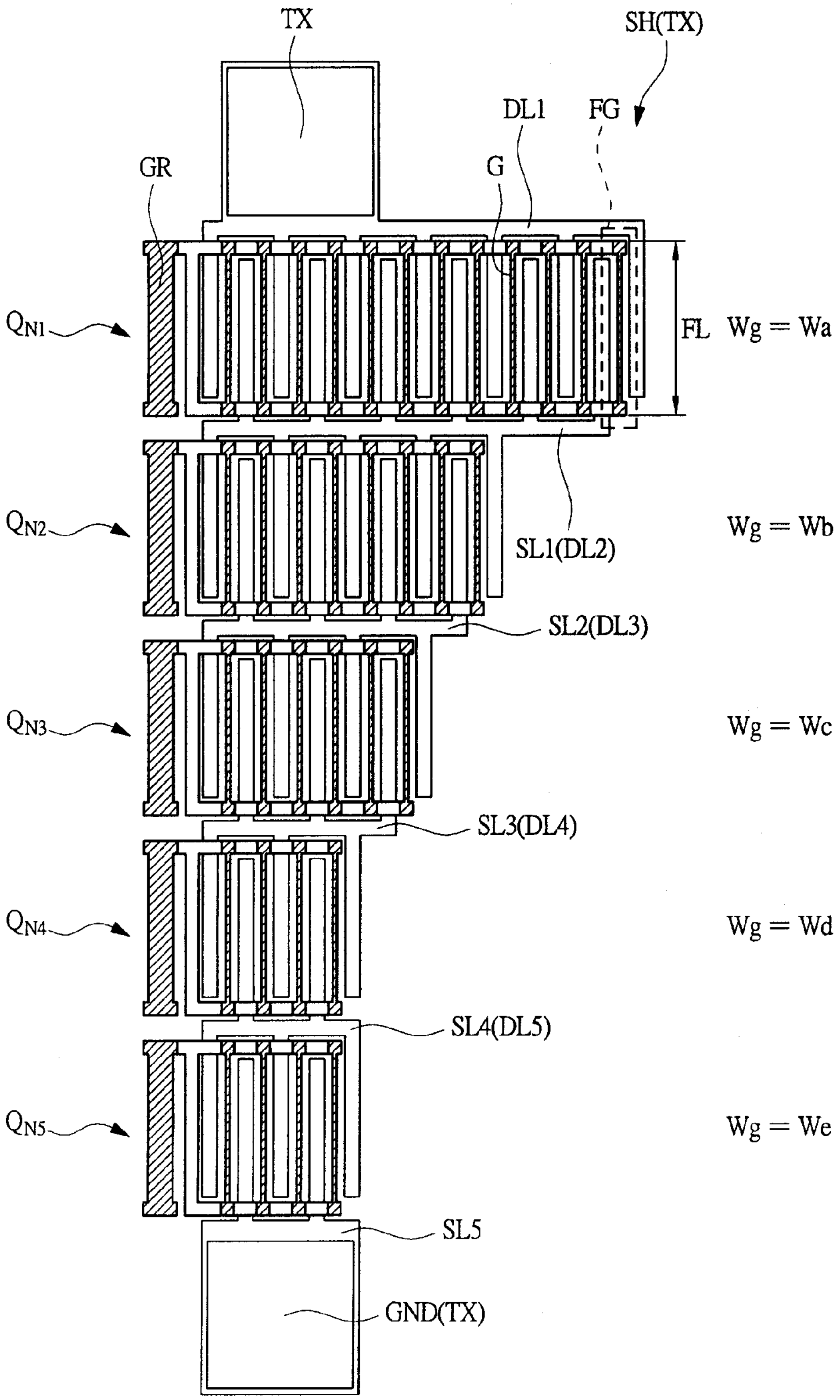
FIG. 18 is a plan view showing a layout configuration of the TX shunt transistor according to the first embodiment.

A layout configuration of the TX shunt transistor SH (TX) in the first embodiment will next be explained referring to the drawing. FIG. 18 is a plan view showing the layout configuration of the TX shunt transistor SH (TX) in the first embodiment. In FIG. 18, the TX shunt transistor SH (TX) is formed between a transmission terminal TX and a common terminal GND (TX). The TX shunt transistor SH (TX) is comprised of MISFETs $Q_{N1}$ through $Q_{N5}$ coupled in series between the transmission terminal TX and the common terminal GND. Described specifically, the MISFETs $Q_{N1}$ through $Q_{N5}$ are coupled in series to one another sequentially, starting from the transmission terminal TX to the common terminal GND (TX).

Layout configurations of the five MISFETs $Q_{N1}$ through $Q_{N5}$ that configure the TX shunt transistor SH (TX) will be sequentially explained below.

The layout configuration of the first MISFET $Q_{N1}$ will first be explained. As shown in FIG. 18, a drain wiring DL1 electrically coupled to its corresponding transmission terminal TX is formed in a comb-teeth shape. A drain region (not shown) of the MISFET $Q_{N1}$ is formed within a semiconductor substrate at a layer under the drain wiring DL1 formed in the comb-teeth shape. The drain region of the MISFET $Q_{N1}$ is electrically coupled to the drain wiring DL1 via a plug (not shown). On the other hand, a comb teeth-like source wiring SL1 is formed opposite to the drain wiring DL1 formed in the comb-teeth shape. A source region (not shown) of the MISFET $Q_{N1}$ is formed within the semiconductor substrate at the layer under the source wiring SL1 formed in the comb-teeth shape. The source region of the MISFET $Q_{N1}$ is electrically coupled to the source wiring SL1 via a plug (not shown). That is, the drain wiring DL1 and the source wiring SL1 are formed in such a manner that comb teeth-shaped electrodes that configure a part of the drain wiring DL1, and comb teeth-shaped electrodes that configure a part of the source wiring SL1 are brought into engagement alternately with one another to form a first interdigitated arrangement.

Then, unit gate electrodes G for the MISFET $Q_{N1}$ are formed between the comb teeth-shaped electrodes of the drain wiring DL1 and the comb teeth-shaped electrodes of the source wiring SL1 brought into engagement with one another in the first interdigitated arrangement. Since, at this time, the number of the comb teeth-shaped electrodes that configure the part of the drain wiring DL1 is plural, and the number of the comb teeth-shaped electrodes that configure the part of the source wiring SL1 is also plural, gaps formed between the comb teeth-shaped electrodes of the drain wiring DL1 and the comb teeth-shaped electrodes of the source wiring SL1 also exist in plural numbers, and the unit gate electrodes G are respectively formed in the gaps present in plural numbers. These unit gate electrodes G are electrically coupled to one another and electrically coupled to their corresponding gate resistor GR provided on the left side of FIG. 18.

Here, in the MISFET $Q_{N1}$ shown in FIG. 18, twelve unit gate electrodes G are arranged side by side in a first direction, along the horizontal direction of paper. Assuming that of the twelve unit gate electrodes G, each unit gate electrode G is called “a finger FG” and the twelve unit gate electrodes G configuring the MISFET $Q_{N1}$ are collectively called “a gate electrode”, the gate electrode of the MISFET $Q_{N1}$ will be comprised of twelve fingers FGs. Assuming that the length of the finger FG is called “a finger length FL”, it can be said that in the first embodiment, the gate electrode of the MISFET $Q_{N1}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N1}$ is defined by the finger length FL of the finger FG used as the unit, and the number of fingers FGs. For example, the gate width Wg of the MISFET $Q_{N1}$ shown in FIG. 18 assumes a value (Wa) defined by the twelve fingers FGs which are FL in finger length. It can be seen that the finger length FL generally is the same for all fingers FGs belonging to a given gate electrode, and therefore may be considered a "common finger length" for the fingers belonging to that gate electrode.

Subsequently, the layout configuration of the MISFET $Q_{N2}$ will be explained. As shown in FIG. 18, the source wiring SL1 of the MISFET $Q_{N1}$ functions as a drain wiring DL2 of the MISFET $Q_{N2}$. The drain wiring DL2 is formed in a comb-teeth shape, and a drain region (not shown) of the MISFET $Q_{N2}$ is formed within the semiconductor substrate at the layer under the drain wiring DL2 formed in the comb-teeth shape. The drain region of the MISFET $Q_{N2}$ is electrically coupled to the drain wiring DL2 via a plug (not shown). On the other hand, a comb teeth-like source wiring SL2 is formed opposite to the drain wiring DL2 formed in the comb-teeth shape. A source region (not shown) of the MISFET $Q_{N2}$ is formed within the semiconductor substrate at the layer under the source wiring SL2 formed in the comb-teeth shape. The source region of the MISFET $Q_{N2}$ is electrically coupled to the source wiring SL2 via a plug (not shown). That is, the drain wiring DL2 and the source wiring SL2 are formed in such a manner that comb teeth-shaped electrodes that configure a part of the drain wiring DL2, and comb teeth-shaped electrodes that configure a part of the source wiring SL2 are brought into engagement alternately with one another to form a second interdigitated arrangement.

Then, unit gate electrodes G for the MISFET $Q_{N2}$ are formed between the comb teeth-shaped electrodes of the drain wiring DL2 and the comb teeth-shaped electrodes of the source wiring SL2 brought into engagement with one another in the second interdigitated arrangement. Since, at this time, the number of the comb teeth-shaped electrodes that configure the part of the drain wiring DL2 is plural, and the number of the comb teeth-shaped electrodes that configure the part of the source wiring SL2 is also plural, gaps formed between the comb teeth-shaped electrodes of the drain wiring DL2 and the comb teeth-shaped electrodes of the source wiring SL2 also exist in plural numbers, and the unit gate electrodes G are respectively formed in the gaps present in plural numbers. These unit gate electrodes G are electrically coupled to one another and electrically coupled to their corresponding gate resistor GR provided on the left side of FIG. 18.

Here, in the MISFET $Q_{N2}$ shown in FIG. 18, eight unit gate electrodes G are arranged side by side in the first, horizontal direction of paper. Assuming that of the eight unit gate electrodes G, each unit gate electrode G is called "a finger FG" and the eight unit gate electrodes G configuring the MISFET $Q_{N2}$ are collectively called "a gate electrode", the gate electrode of the MISFET $Q_{N2}$ will be comprised of eight fingers FGs. Assuming that the length of the finger FG is called "a finger length FL", it can be said that in the first embodiment, the gate electrode of the MISFET $Q_{N2}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N2}$ is defined by the finger length FL of the finger FG used as the unit, and the number of fingers FGs. For example, the gate width Wg of the MISFET $Q_{N2}$ shown in FIG. 18 assumes a value (Wb) defined by the eight fingers FGs which are FL in finger length.

Next, the layout configuration of the MISFET $Q_{N3}$ will be explained. As shown in FIG. 18, the source wiring SL2 of the MISFET $Q_{N2}$ functions as a drain wiring DL3 of the MISFET $Q_{N3}$. The drain wiring DL3 is formed in a comb-teeth shape, and a drain region (not shown) of the MISFET $Q_{N3}$ is formed within the semiconductor substrate at the layer under the drain wiring DL3 formed in the comb-teeth shape. The drain region of the MISFET $Q_{N3}$ is electrically coupled to the drain wiring DL3 via a plug (not shown). On the other hand, a comb teeth-like source wiring SL3 is formed opposite to the drain wiring DL3 formed in the comb-teeth shape. A source region (not shown) of the MISFET $Q_{N3}$ is formed within the semiconductor substrate at the layer under the source wiring SL3 formed in the comb-teeth shape. The source region of the MISFET $Q_{N3}$ is electrically coupled to the source wiring SL3 via a plug (not shown). That is, the drain wiring DL3 and the source wiring SL3 are formed in such a manner that comb teeth-shaped electrodes that configure a part of the drain wiring DL3, and comb teeth-shaped electrodes that configure a part of the source wiring SL3 are brought into engagement alternately with one another to form a third interdigitated arrangement.

Then, unit gate electrodes G for the MISFET $Q_{N3}$ are formed between the comb teeth-shaped electrodes of the drain wiring DL3 and the comb teeth-shaped electrodes of the source wiring SL3 brought into engagement with one another in the third interdigitated arrangement. Since, at this time, the number of the comb teeth-shaped electrodes that configure the part of the drain wiring DL3 is plural, and the number of the comb teeth-shaped electrodes that configure the part of the source wiring SL3 is also plural, gaps formed between the comb teeth-shaped electrodes of the drain wiring DL3 and the comb teeth-shaped electrodes of the source wiring SL3 also exist in plural numbers, and the unit gate electrodes G are respectively formed in the gaps present in plural numbers. These unit gate electrodes G are electrically coupled to one another and electrically coupled to their corresponding gate resistor GR provided on the left side of FIG. 18.

Here, in the MISFET $Q_{N3}$ shown in FIG. 18, six unit gate electrodes G are arranged side by side in the horizontal direction of paper. Assuming that of the six unit gate electrodes G, each unit gate electrode G is called "a finger FG" and the six unit gate electrodes G configuring the MISFET $Q_{N3}$ are collectively called "a gate electrode", the gate electrode of the MISFET $Q_{N3}$ will be comprised of six fingers FGs. Assuming that the length of the finger FG is called "a finger length FL", it can be said that in the first embodiment, the gate electrode of the MISFET $Q_{N3}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N3}$ is defined by the finger length FL of the finger FG used as the unit, and the number of fingers FGs. For example, the gate width Wg of the MISFET $Q_{N3}$ shown in FIG. 18 assumes a value (Wc) defined by the six fingers FGs which are FL in finger length.

Further, the layout configuration of the MISFET $Q_{N4}$ will be explained. As shown in FIG. 18, the source wiring SL3 of the MISFET $Q_{N3}$ functions as a drain wiring DL4 of the MISFET $Q_{N4}$. The drain wiring DL4 is formed in a comb-teeth shape, and a drain region (not shown) of the MISFET $Q_{N4}$ is formed within the semiconductor substrate at the layer under the drain wiring DL4 formed in the comb-teeth shape. The drain region of the MISFET $Q_{N4}$ is electrically coupled to the drain wiring DL4 via a plug (not shown). On the other hand, a comb teeth-like source wiring SL4 is formed opposite to the drain wiring DL4 formed in the comb-teeth shape. A source region (not shown) of the MISFET $Q_{N4}$ is formed within the semiconductor substrate at the layer under the source wiring SL4 formed in the comb-teeth shape. The source region of the MISFET $Q_{N4}$ is electrically coupled to the source wiring SL4 via a plug (not shown). That is, the drain wiring DL4 and the source wiring SL4 are formed in such a manner that comb teeth-shaped electrodes that configure a part of the drain wiring DL4, and comb teeth-shaped electrodes that configure a part of the source wiring SL4 are brought into engagement alternately with one another to form a fourth interdigitated arrangement.

Then, unit gate electrodes G for the MISFET $Q_{N4}$ are formed between the comb teeth-shaped electrodes of the drain wiring DL4 and the comb teeth-shaped electrodes of the source wiring SL4 brought into engagement with one another in the third interdigitated arrangement. Since, at this time, the number of the comb teeth-shaped electrodes that configure the part of the drain wiring DL4 is plural, and the number of the comb teeth-shaped electrodes that configure the part of the source wiring SL4 is also plural, gaps formed between the comb teeth-shaped electrodes of the drain wiring DL4 and the comb teeth-shaped electrodes of the source wiring SL4 also exist in plural numbers, and the unit gate electrodes G are respectively formed in the gaps present in plural numbers. These unit gate electrodes G are electrically coupled to one another and electrically coupled to their corresponding gate resistor GR provided on the left side of FIG. 18.

Here, in the MISFET $Q_{N4}$ shown in FIG. 18, four unit gate electrodes G are arranged side by side in the horizontal direction of paper. Assuming that of the four unit gate electrodes G, each unit gate electrode G is called "a finger FG" and the four unit gate electrodes G configuring the MISFET $Q_{N4}$ are collectively called "a gate electrode", the gate electrode of the MISFET $Q_{N4}$ will be comprised of four fingers FGs. Assuming that the length of the finger FG is called "a finger length FL", it can be said that in the first embodiment, the gate electrode of the MISFET $Q_{N4}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N4}$ is defined by the finger length FL of the finger FG as the unit, and the number of fingers FGs. For example, the gate width Wg of the MISFET $Q_{N4}$ shown in FIG. 18 assumes a value (Wd) defined by the four fingers FGs which are FL in finger length.

Next, the layout configuration of the MISFET $Q_{N5}$ will be explained. As shown in FIG. 18, the source wiring SL4 of the MISFET $Q_{N4}$ functions as a drain wiring DL5 of the MISFET QN5. The drain wiring DL5 is formed in a comb-teeth shape, and a drain region (not shown) of the MISFET $Q_{N5}$ is formed within the semiconductor substrate at the layer under the drain wiring DL5 formed in the comb-teeth shape. The drain region of the MISFET $Q_{N5}$ is electrically coupled to the drain wiring DL5 via a plug (not shown). On the other hand, a comb teeth-like source wiring SL5 is formed opposite to the drain wiring DL5 formed in the comb-teeth shape. A source region (not shown) of the MISFET $Q_{N5}$ is formed within the semiconductor substrate at the layer under the source wiring SL5 formed in the comb-teeth shape. The source region of the MISFET $Q_{N5}$ is electrically coupled to the source wiring SL5 via a plug (not shown). That is, the drain wiring DL5 and the source wiring SL5 are formed in such a manner that comb teeth-shaped electrodes that configure a part of the drain wiring DL5, and comb teeth-shaped electrodes that configure a part of the source wiring SL5 are brought into engagement alternately with one another to form a fifth interdigitated arrangement.

Then, unit gate electrodes G for the MISFET $Q_{N5}$ are formed between the comb teeth-shaped electrodes of the drain wiring DL5 and the comb teeth-shaped electrodes of the source wiring SL5 brought into engagement with one another to form the fifth interdigitated arrangement. Since, at this time, the number of the comb teeth-shaped electrodes that configure the part of the drain wiring DL5 is plural, and the number of the comb teeth-shaped electrodes that configure the part of the source wiring SL5 is also plural, gaps formed between the comb teeth-shaped electrodes of the drain wiring DL5 and the comb teeth-shaped electrodes of the source wiring SL5 also exist in plural numbers, and the unit gate electrodes G are respectively formed in the gaps present in plural numbers. These unit gate electrodes G are electrically coupled to one another and electrically coupled to their corresponding gate resistor GR provided on the left side of FIG. 18. Incidentally, the source wiring SL5 is coupled to the common terminal GND (TX).

Here, in the MISFET $Q_{N5}$ shown in FIG. 18, four unit gate electrodes G are arranged side by side in the horizontal direction of paper. Assuming that of the four unit gate electrodes G, each unit gate electrode G is called "a finger FG" and the four unit gate electrodes G configuring the MISFET $Q_{N5}$ are collectively called "a gate electrode", the gate electrode of the MISFET $Q_{N5}$ will be comprised of four fingers FGs. Assuming that the length of the finger FG is called "a finger length FL", it can be said that in the first embodiment, the gate electrode of the MISFET $Q_{N5}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N5}$ is defined by the finger length FL of the finger FG as the unit, and the number of fingers FGs. For example, the gate width Wg of the MISFET $Q_{N5}$ shown in FIG. 18 assumes a value (We) defined by the four fingers FGs which are FL in finger length.

In the first embodiment, the gate widths of the transistors increase monotonically in the direction from the common terminal GND (TX) to the transmission terminal TX, the term "increase monotonically" meaning that in the stated direction, the gate widths from one transistor to the next either increases or stays the same, but does not decrease. Alternatively, it can be said that the gate widths of the transistors decrease monotonically in the direction from the transmission terminal TX to the common terminal GND (TX), the term "decrease monotonically" meaning that in the stated direction, the gate widths from one transistor to the next either decreases or stays the same, but does not increase. In the first embodiment, the TX shunt transistor SH (TX) is layout-configured in the above-described manner in such a manner that a relationship of the gate width Wg (Wa) of first MISFET $Q_{N1}$>the gate width Wg (Wb) of MISFET $Q_{N2}$>the gate width Wg (Wc) of MISFET $Q_{N3}$>the gate width Wg (Wd) of MISFET $Q_{N4}$=the gate width Wg (We) of last MISFET $Q_{N5}$ is established. That is, in the first embodiment, the MISFETs $Q_{N1}$ through $Q_{N5}$ are configured in such a manner that the gate widths of the MISFETs increase monotonically and gradually from the MISFET coupled to the side closest to the common terminal GND (TX) to the MISFET coupled to the side close to the transmission terminal TX by changing the number of the fingers FGs while making the finger length FL of each finger FG constant. Thus, when the TX shunt transistor SH (TX) is OFF, the voltage amplitudes applied to the respective MISFETs $Q_{N1}$ through $Q_{N5}$ configuring the TX shunt transistor SH (TX) can be made uniform even when the parasitic capacitances are taken into consideration.

Particularly, the layout configuration of the TX shunt transistor SH (TX) shown in FIG. 18 shows an example of a layout configuration where in the MISFETs $Q_{N1}$ through $Q_{N5}$, the gate widths of the MISFETs increase on a quadric function basis gradually from the MISFET coupled to the side close to the common terminal GND (TX) to the MISFET coupled to the side close to the transmission terminal TX.

In terms of making uniform the voltage amplitudes applied to the respective MISFETs QN1 through $Q_{N5}$ when the TX shunt transistor SH (TX) comprised of the MISFETs $Q_{N1}$ through $Q_{N5}$ is OFF, the above relationship of Wa>Wb>Wc>Wd>We is preferred. In the layout configuration shown in FIG. 18, however, the relationship of Wa>Wb>Wc>Wd=We is established. Even in this case, the voltage amplitudes applied to the respective MISFETs QN1 through $Q_{N5}$ can be made sufficiently uniform as compared with the comparative example in which (Wa=Wb=We=Wd=We). As a result, high-order harmonics generated from the TX shunt transistor SH (TX) that is OFF can be sufficiently suppressed. That is, the desired form in the first embodiment is of the case in which the relationship of Wa>Wb>Wc>Wd>We is established, but the condition for realizing the problem (reduction in the high-order harmonics) to be solved by the technical idea in the first embodiment will not be limited to the above-described relation. For example, even when the relationship of Wa>Wb>Wc>Wd=We shown in the layout configuration of FIG. 18 is being established, the purpose of suppressing the generation of the high-order harmonics can be achieved as compared with the comparative example.

That is, the technical idea in the first embodiment is that if it is brought into superordinate conceptualization in a problem-solvable scope, then at least the first MISFET coupled closest to the transmission terminal TX, in the plural MISFETs configuring the TX shunt transistor SH (TX), rather than the last MISFET coupled closest to the common terminal GND (TX) is configured in such a manner that the off capacitance indicative of the capacitance provided between the source region and the drain region of the MISFET being OFF increases. Thus, at least, the voltage amplitudes applied to the plural MISFETs respectively configuring the TX shunt transistor SH (TX) can be made sufficiently uniform as compared with the comparative example (Wa=Wb=We=Wd=We). As a result, there can be obtained an outstanding advantage that high-order harmonics generated from the TX shunt transistor SH (TX) that is OFF can be sufficiently suppressed.

Layout Configuration (First Modification) of TX Shunt Transistor

Figure 19:
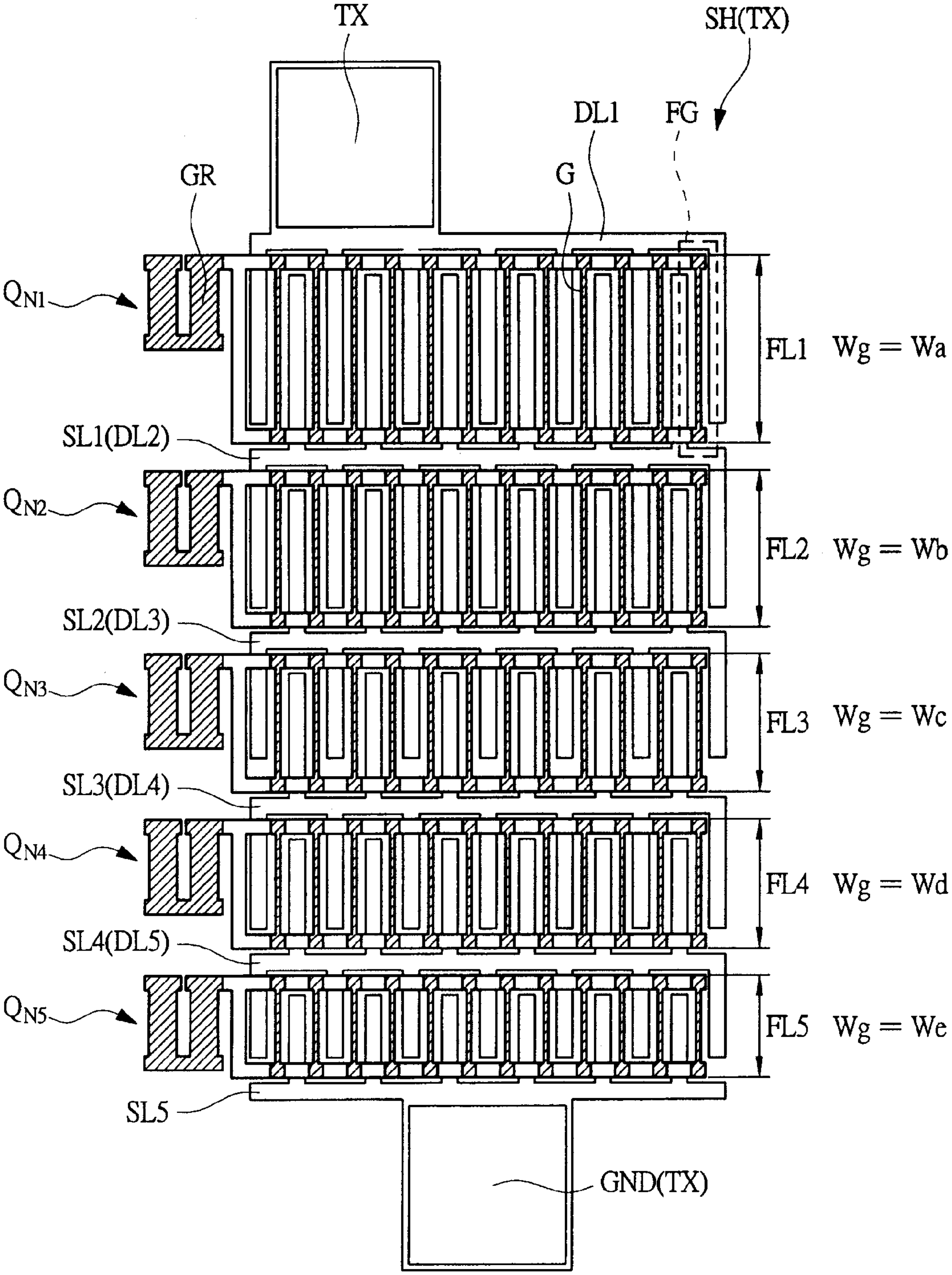
FIG. 19 is a plan view depicting a layout configuration of a TX shunt transistor according to a first modification.

A layout configuration of the TX shunt transistor SH (TX) in the first modification will next be explained with reference to the drawing. FIG. 19 is a plan view showing the layout configuration of the TX shunt transistor SH (TX) in the first modification. In FIG. 19, the TX shunt transistor SH (TX) is formed between a transmission terminal TX and a common terminal GND (TX). The TX shunt transistor SH (TX) is comprised of MISFETs $Q_{N1}$ through $Q_{N5}$ coupled in series between the transmission terminal TX and the common terminal GND. Specifically, the MISFETs $Q_{N1}$ through $Q_{N5}$ are coupled in series sequentially from the transmission terminal TX to the common terminal GND (TX).

As apparent from FIG. 19, the respective gate electrodes of the five MISFETs $Q_{N1}$ through $Q_{N5}$ configuring the TX shunt transistor SH (TX) are formed with twelve fingers FGs (unit gate electrodes G). That is, in the first modification, the gate electrodes of the five MISFETs QN1 through $Q_{N5}$ are respectively formed from the fingers FGs which are the same in number. In the first modification, however, the finger lengths of the fingers FGs contained in the respective five MISFETs $Q_{N1}$ through $Q_{N5}$ are different from one another. Specifically, a relationship of FL1>FL2>FL3>FL4>FL5 is established among the finger length FL1 of the first MISFET $Q_{N1}$, the finger length FL2 of the MISFET $Q_{N2}$, the finger length FL3 of the MISFET $Q_{N3}$, the finger length FL4 of the MISFET $Q_{N4}$, and the finger length FL5 of the last MISFET QN5. At this time, the gate widths Wg of the MISFETs $Q_{N1}$ through $Q_{N5}$ are respectively defined by the finger length FL of the finger FG as the unit and the number of fingers FGs. In the present modification, the number of the fingers FGs (twelve) of the MISFETs $Q_{N1}$ through $Q_{N5}$ is the same but their finger lengths are different from each other. Therefore, the finger lengths are respectively set in such a manner that the relationship of FL1>FL2>FL3>FL4>FL5 is established. It can be seen that in FIG. 19, the finger length FLN generally is the same for all fingers belonging to a given gate electrode, and therefore may be considered a "common finger length" for the fingers belonging to that gate electrode. However, in the modification of FIG. 19, the common finger length may be different for each gate electrode.

As a result, in the first modification, the gate widths of the transistors again increase monotonically from the common terminal GND (TX) to the transmission terminal TX, or equivalently, decrease monotonically from the transmission terminal TX to the common terminal GND (TX). In the first modification, the TX shunt transistor SH (TX) can be layout-configured in such a manner that a relationship of the gate width Wg (Wa) of first MISFET $Q_{N1}$>the gate width Wg (Wb) of MISFET $Q_{N2}$>the gate width Wg (Wc) of MISFET $Q_{N3}$>the gate width Wg (Wd) of MISFET $Q_{N4}$>the gate width Wg (We) of last MISFET $Q_{N5}$ is established.

That is, in the first modification, the MISFETs $Q_{N1}$ through $Q_{N5}$ are configured in such a manner that the gate widths Wg of the MISFETs increase gradually from the MISFET coupled to the side close to the common terminal GND (TX) to the MISFET coupled to the side close to the transmission terminal TX by changing the finger lengths FL1 through FL5 of the fingers FGs while making the number of fingers FGs constant. Thus, when the TX shunt transistor SH (TX) is OFF, the voltage amplitudes applied to the respective MISFETs $Q_{N1}$ through $Q_{N5}$ configuring the TX shunt transistor SH (TX) can be made uniform even when the parasitic capacitances are taken into consideration.

The first modification (refer to FIG. 19) layout-configured in this manner has the following advantages as compared with the first embodiment (refer to FIG. 18). Namely, since the number of the fingers FG (unit gate electrodes G) is varied in the MISFETs $Q_{N1}$ through $Q_{N5}$ in the layout configuration example shown in FIG. 18, a stepwise layout configuration is formed in which a good deal of extra space remains unused and thus is wasted. In contrast, in the layout configuration example shown in FIG. 19, only the finger lengths FL1 through FL5 are varied without changing the number of the fingers FGs (unit gate electrodes G) in the MISFETs $Q_{N1}$ through $Q_{N5}$. It is therefore possible to match the outer shape of each of the MISFETs $Q_{N1}$ through $Q_{N5}$ with a rectangular shape. In other words, since the extra space areas are not formed in the layout configuration example shown in FIG. 19, the MISFETs $Q_{N1}$ through $Q_{N5}$ can be efficiently laid out. As a result, in the present modification, the semiconductor chip CHP2 having formed therein the antenna switch ASW including the TX shunt transistor SH (TX) can be miniaturized.

Layout Configuration (Second Modification) of TX Shunt Transistor

Figure 20:
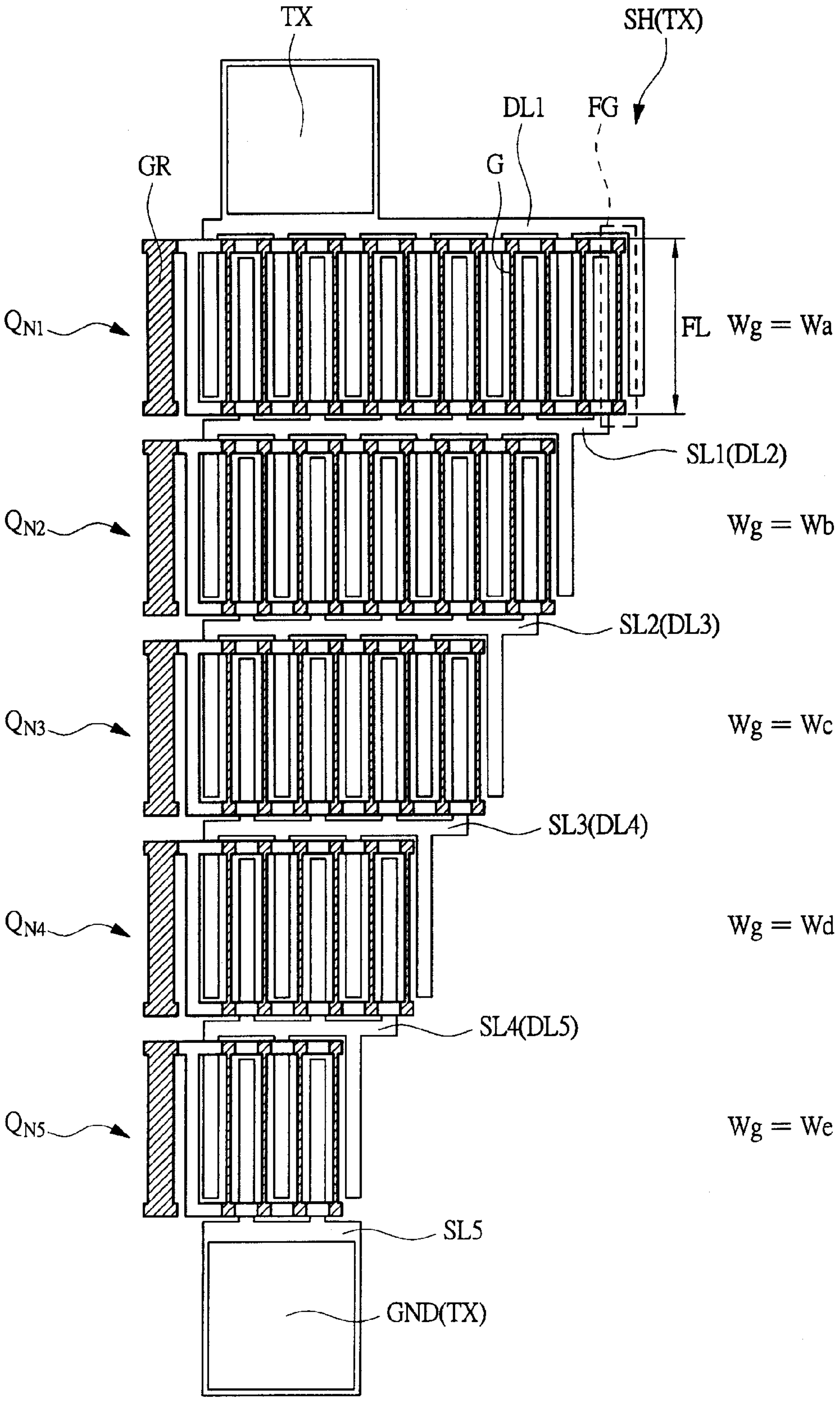
FIG. 20 is a plan view showing a layout configuration of a TX shunt transistor according to a second modification.

A layout configuration of the TX shunt transistor SH (TX) in the second modification will next be explained with reference to the drawing. FIG. 20 is a plan view showing the layout configuration of the TX shunt transistor SH (TX) in the second modification. In FIG. 20, the TX shunt transistor SH (TX) is formed between a transmission terminal TX and a common terminal GND (TX). The TX shunt transistor SH (TX) is comprised of MISFETs $Q_{N1}$ through $Q_{N5}$ coupled in series between the transmission terminal TX and the common terminal GND. Specifically, the MISFETs $Q_{N1}$ through $Q_{N5}$ are coupled in series sequentially from the transmission terminal TX to the common terminal GND (TX).

The layout configuration of the TX shunt transistor SH (TX) shown in FIG. 20 shows an example of a layout configuration where in the MISFETs $Q_{N1}$ through $Q_{N5}$, the gate widths of the MISFETs increase on a linear function basis gradually from the MISFET coupled to the side close to the common terminal GND (TX) to the MISFET coupled to the side close to the transmission terminal TX.

Here, in the first MISFET $Q_{N1}$ shown in FIG. 20, twelve unit gate electrodes G are arranged side by side in the horizontal direction of paper. Assuming that of the twelve unit gate electrodes G, each unit gate electrode G is called "a finger FG" and the twelve unit gate electrodes G configuring the first MISFET $Q_{N1}$ are collectively called "a gate electrode", the gate electrode of the first MISFET $Q_{N1}$ will be comprised of twelve fingers FGs. Assuming that the length of the finger FG is called "a finger length FL", it can be said that in the second modification, the gate electrode of the first MISFET $Q_{N1}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the first MISFET $Q_{N1}$ is defined by the finger length FL of the finger FG as the unit, and the number of fingers FGs. For example, the gate width Wg of the first MISFET $Q_{N1}$ shown in FIG. 20 assumes a value (Wa) defined by the twelve fingers FGs which are FL in finger length.

In the MISFET $Q_{N2}$ shown in FIG. 20, ten unit gate electrodes G are arranged side by side in the horizontal direction of paper. Assuming that of the ten unit gate electrodes G, each unit gate electrode G is called "a finger FG" and the ten unit gate electrodes G configuring the MISFET $Q_{N2}$ are collectively called "a gate electrode", the gate electrode of the MISFET $Q_{N2}$ will be comprised of ten fingers FGs. Assuming that the length of the finger FG is called "a finger length FL", it can be said that in the second modification, the gate electrode of the MISFET $Q_{N2}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N2}$ is defined by the finger length FL of the finger FG as the unit, and the number of fingers FGs. For example, the gate width Wg of the MISFET $Q_{N2}$ shown in FIG. 20 assumes a value (Wb) defined by the ten fingers FGs which are FL in finger length.

Further, in the MISFET $Q_{N3}$ shown in FIG. 20, eight unit gate electrodes G are arranged side by side in the horizontal direction of paper. Assuming that of the eight unit gate electrodes G, each unit gate electrode G is called "a finger FG" and the eight unit gate electrodes G configuring the MISFET $Q_{N3}$ are collectively called "a gate electrode", the gate electrode of the MISFET $Q_{N3}$ will be comprised of eight fingers FGs. Assuming that the length of the finger FG is called "a finger length FL", it can be said that in the second modification, the gate electrode of the MISFET $Q_{N3}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N3}$ is defined by the finger length FL of the finger FG as the unit, and the number of fingers FGs. For example, the gate width Wg of the MISFET $Q_{N3}$ shown in FIG. 20 assumes a value (Wc) defined by the eight fingers FGs which are FL in finger length.

In the MISFET $Q_{N4}$ shown in FIG. 20, six unit gate electrodes G are arranged side by side in the horizontal direction of paper. Assuming that of the six unit gate electrodes G, each unit gate electrode G is called "a finger FG" and the six unit gate electrodes G configuring the MISFET $Q_{N4}$ are collectively called "a gate electrode", the gate electrode of the MISFET $Q_{N4}$ will be comprised of six fingers FGs. Assuming that the length of the finger FG is referred to as "finger length FL", it can be said that in the second modification, the gate electrode of the MISFET $Q_{N4}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N4}$ is defined by the finger length FL of the finger FG as the unit, and the number of fingers FGs. For example, the gate width Wg of the MISFET $Q_{N4}$ shown in FIG. 20 assumes a value (Wd) defined by the six fingers FGs which are FL in finger length.

Likewise, in the MISFET $Q_{N5}$ shown in FIG. 20, four unit gate electrodes G are arranged side by side in the horizontal direction of paper. Assuming that of the four unit gate electrodes G, each unit gate electrode G is called "a finger FG" and the four unit gate electrodes G configuring the MISFET $Q_{N5}$ are collectively called "a gate electrode", the gate electrode of the MISFET $Q_{N5}$ will be comprised of four fingers FGs. Assuming that the length of the finger FG is referred to as "finger length FL", it can be said that in the second modification, the gate electrode of the MISFET $Q_{N5}$ is configured from a finger structure in which with a line segment-like finger FG as a unit, a plurality of fingers FGs are arranged in the direction that intersects with line segments thereof, and a plurality of the fingers FGs are electrically coupled to one another. At this time, the gate width Wg of the MISFET $Q_{N5}$ is defined by the finger length FL of the finger FG as the unit, and the number of fingers FGs. For example, the gate width Wg of the MISFET $Q_{N5}$ shown in FIG. 20 assumes a value (We) defined by the four fingers FGs which are FL in finger length.

In the second modification, the gate widths of the transistors again increase monotonically from the common terminal GND (TX) to the transmission terminal TX, or equivalently, decrease monotonically from the transmission terminal TX to the common terminal GND (TX). In the second modification, a relationship of the gate width Wg (Wa) of first MISFET $Q_{N1}$>the gate width Wg (Wb) of MISFET $Q_{N2}$>the gate width Wg (Wc) of MISFET $Q_{N3}$>the gate width Wg (Wd) of MISFET $Q_{N4}$>the gate width Wg (We) of last MISFET $Q_{N5}$ is established in this manner. The TX shunt transistor SH (TX) is layout-configured in such a manner that the gate widths of the MISFETs $Q_{N5}$ through $Q_{N1}$ increase on a linear function basis. That is, in the second modification, the MISFETs $Q_{N1}$ through $Q_{N5}$ are configured in such a manner that the gate widths of the MISFETs increase on the linear function basis gradually from the MISFET coupled to the side close to the common terminal GND (TX) to the MISFET coupled to the side close to the transmission terminal TX by changing the number of the fingers FGs while making the finger length FL of each finger FG constant. Thus, when the TX shunt transistor SH (TX) is OFF, the voltage amplitudes applied to the respective MISFETs $Q_{N1}$ through $Q_{N5}$ configuring the TX shunt transistor SH (TX) can be made uniform even when the parasitic capacitances are taken into consideration.

Incidentally, even in the second modification, the gate widths of the MISFETs may be increased on the linear function basis gradually from the MISFET coupled to the side close to the common terminal GND (TX) to the MISFET coupled to the side close to the transmission terminal TX by changing only the finger lengths without changing the number of the fingers FGs (unit gate electrodes G) (See FIG. 19) as in the first modification.

Layout Configuration (Third Modification) of TX Shunt Transistor

Figure 21:
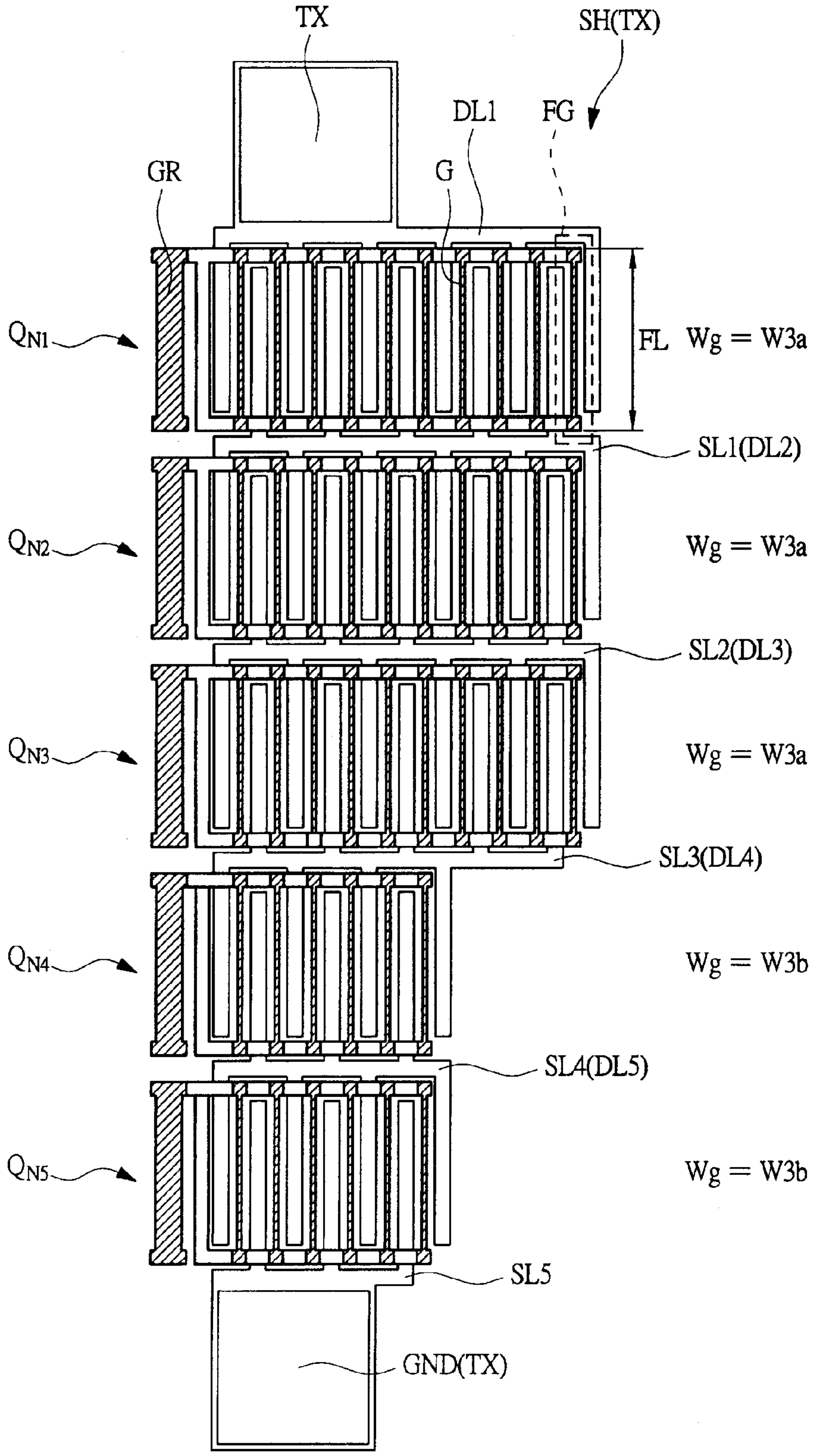
FIG. 21 is a plan view illustrating a layout configuration of a TX shunt transistor according to a third modification.

A layout configuration of the TX shunt transistor SH (TX) in the third modification will next be explained with reference to the drawing. FIG. 21 is a plan view showing the layout configuration of the TX shunt transistor SH (TX) in the third modification. In FIG. 21, the TX shunt transistor SH (TX) is formed between a transmission terminal TX and a common terminal GND (TX). The TX shunt transistor SH (TX) is comprised of MISFETs $Q_{N1}$ through $Q_{N5}$ coupled in series between the transmission terminal TX and the common terminal GND. Specifically, the MISFETs $Q_{N1}$ through $Q_{N5}$ are coupled in series sequentially from the transmission terminal TX to the common terminal GND (TX).

Here, in the MISFETs $Q_{N1}$ through $Q_{N3}$ shown in FIG. 21, ten unit gate electrodes G are arranged side by side in the horizontal direction of paper. Assuming that of the ten unit gate electrodes G, each unit gate electrode G is called "a finger FG" and the ten unit gate electrodes G configuring the MISFETs $Q_{N1}$ through $Q_{N3}$ are collectively called "a gate electrode", the gate electrodes of the MISFETs $Q_{N1}$ through $Q_{N3}$ will be respectively comprised of ten fingers FGs. Assuming that the length of the finger FG is called "a finger length FL", it can be said that in the third modification, the gate electrodes of the MISFETs $Q_{N1}$ through $Q_{N3}$ are configured from a finger structure in which with a line segment-like finger FG as a unit, a plurality of fingers FGs are arranged in the direction that intersects with line segments thereof, and a plurality of the fingers FGs are electrically coupled to one another. At this time, the gate widths Wg of the MISFETs $Q_{N1}$ through $Q_{N3}$ are respectively defined by the finger length FL of the finger FG as the unit, and the number of fingers FGs. For example, the gate widths Wg of the MISFETs QN1 through $Q_{N3}$ shown in FIG. 21 respectively assume a value (W3*a*) defined by the ten fingers FGs which are FL in finger length.

In the MISFETs $Q_{N4}$ and $Q_{N5}$ shown in FIG. 21, six unit gate electrodes G are arranged side by side in the horizontal direction of paper. Assuming that of the six unit gate electrodes G, one unit gate electrode G is called "a finger FG" and the six unit gate electrodes G configuring the MISFETs $Q_{N4}$ and $Q_{N5}$ are collectively called "a gate electrode", the gate electrodes of the MISFETs $Q_{N4}$ and $Q_{N5}$ will be respectively comprised of six fingers FGs. Assuming that the length of the finger FG is called "a finger length FL", it can be said that in the third modification, the gate electrodes of the MISFETs $Q_{N4}$ and $Q_{N5}$ are configured from a finger structure in which with a line segment-like finger FG as a unit, a plurality of fingers FGs are arranged in the direction that intersects with line segments thereof, and a plurality of the fingers FGs are electrically coupled to one another. At this time, the gate widths Wg of the MISFETs $Q_{N4}$ and $Q_{N5}$ are respectively defined by the finger length FL of the finger FG as the unit, and the number of fingers FGs. For example, the gate widths Wg of the MISFETs $Q_{N4}$ and $Q_{N5}$ shown in FIG. 21 respectively assume a value (W3*b*) defined by the six fingers FGs which are FL in finger length.

Even when a relationship of W3*a*=W3*a*=W3*a*>W3*b*=W3*b* shown in the layout configuration of FIG. 21 is established in this manner, the gate widths of the transistors again increase monotonically from the common terminal GND (TX) to the transmission terminal TX, or equivalently, decrease monotonically from the transmission terminal TX to the common terminal GND (TX). Thus, the purpose of suppressing the generation of high-order harmonics can be achieved than the comparative example. That is, the technical idea in the third modification is that in the plural MISFETs configuring the TX shunt transistor SH (TX), at least the first MISFET $Q_{N1}$ coupled to the transmission terminal TX rather than the last MISFET $Q_{N5}$ coupled to the common terminal GND (TX) is configured in such a manner as to increase the off capacitance indicative of the capacitance provided between the source region and the drain region of the MISFET that is OFF. Thus, at least, the voltage amplitudes applied to the plural MISFETs $Q_{N1}$ through $Q_{N5}$ respectively, configuring the TX shunt transistor SH (TX) can be made sufficiently uniform as compared with the comparative example (Wa=Wb=We=Wd=We). As a result, the high-order harmonics generated from the TX shunt transistor SH (TX) that is OFF can be sufficiently suppressed.

Device Structure of Antenna Switch

The device structure of each MISFET that configure the antenna switch will next be explained. The antenna switch is required to have performance to secure high quality in high-power transmission signals and reduce the generation of interfering waves (high-order harmonics) adversely affecting the communications in other frequency bands. Therefore, when field effect transistors are used as the switching elements that configure the antenna switch, each field effect transistor is required to have performance to have not only high breakdown-voltage characteristics but also performance that can reduce high-order harmonic distortion.

Therefore, as the field effect transistor configuring the antenna switch, a field effect transistor (e.g., HEMT (High Electron Mobility Transistor)) formed over a GaAs substrate or sapphire substrate having a small parasitic capacitance and being excellent in linearity is typically used in order to achieve a low loss and low harmonic distortion. However, a compound semiconductor substrate excellent in high frequency characteristics is expensive, and is not preferable in view of reducing the cost of the antenna switch. In order to achieve a cost reduction in the antenna switch, it is effective to use a field effect transistor formed over an inexpensive silicon substrate. However, the inexpensive silicon substrate has a large parasitic capacitance as compared with the expensive compound semiconductor substrate and has harmonic distortion higher than a field effect transistor formed over the compound semiconductor substrate.

Thus, in view of achieving a cost reduction in the antenna switch, the first embodiment will be described in particular on the assumption that harmonic distortion generated in the antenna switch can be reduced as much as possible even when the antenna switch is configured by field effect transistors formed over a silicon substrate. Specifically, the first embodiment will explain an example in which each MISFET $Q_N$ is formed over an SOI (silicon on insulator) substrate. In the first embodiment, the structure of each of the MISFETs $Q_N$ that configure the TX series transistor SE (TX), the RX series transistor SE (RX), the TX shunt transistor SH (TX) and the RX shunt transistor SH (RX) will be explained.

Figure 22:
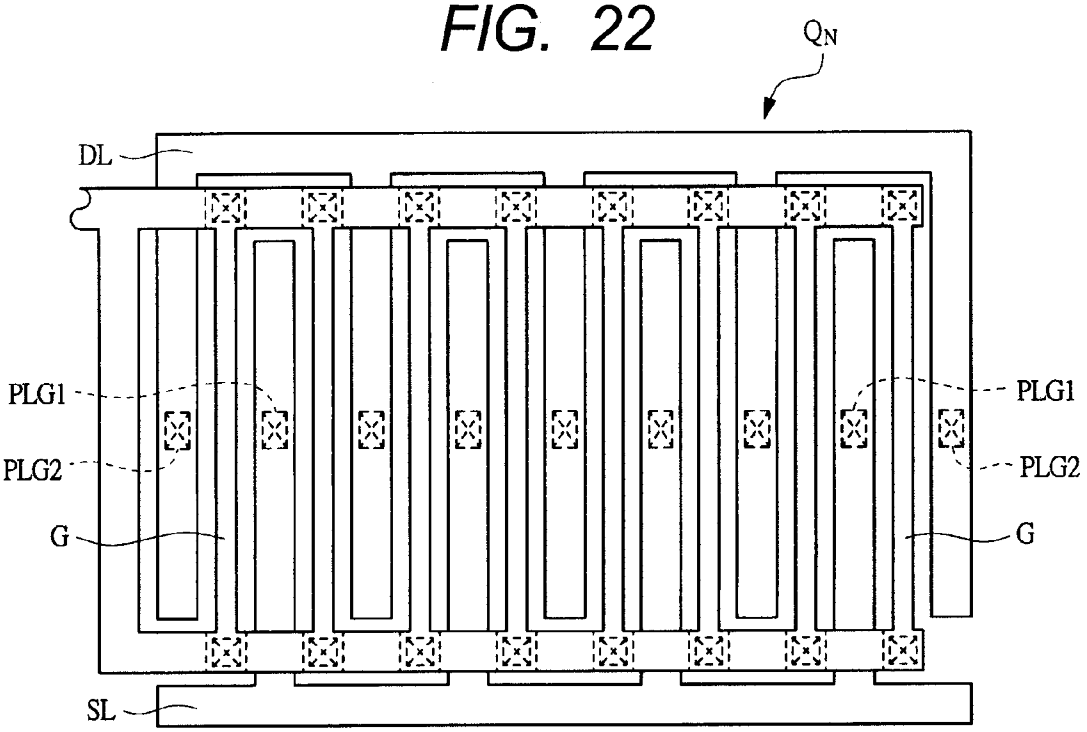
FIG. 22 is a plan view showing a device structure of each MISFET in the first embodiment.

FIG. 22 is a plan view showing the device structure of the MISFET in the first embodiment. In FIG. 22, the MISFET $Q_N$ is coupled to a source wiring SL and a drain wiring DL, which are laid out so as to be alternately positioned to form an interdigitated array. Then, a unit gate electrode G is formed between the source wiring SL and the drain wiring DL within the array. A source region (not shown in FIG. 22) of the MISFET $Q_N$ is coupled to the source wiring SL via a plug PLG1. A drain region (not shown in FIG. 22) of the MISFET $Q_N$ is coupled to the drain wiring DL via a plug PLG2.

Figure 23:
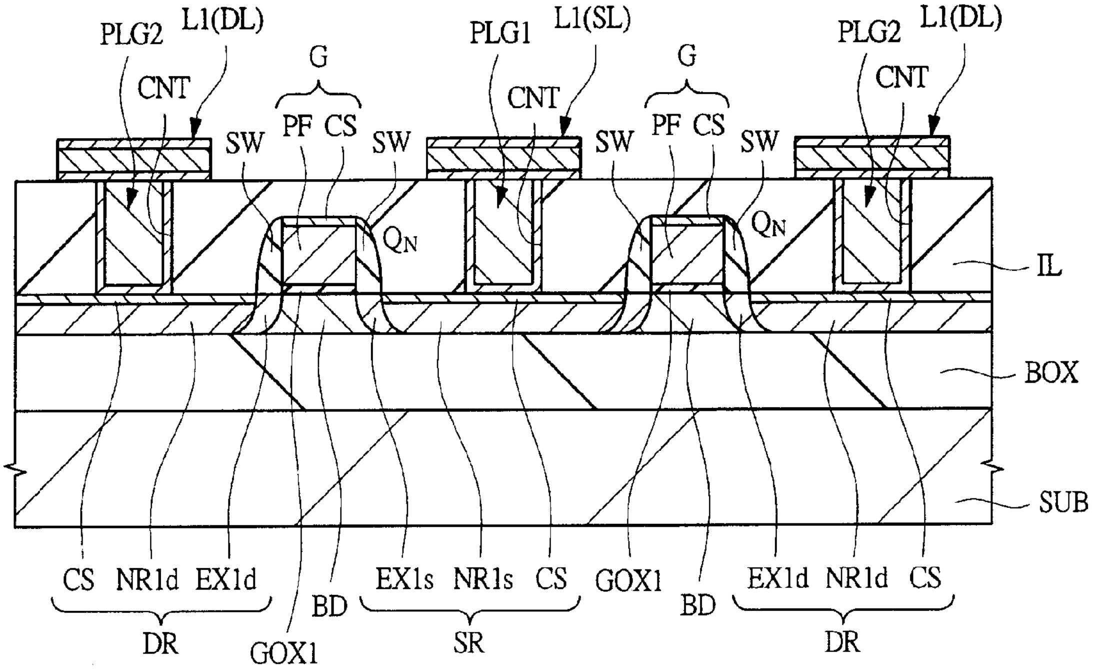
FIG. 23 is a cross sectional view illustrating a cross section of each MISFET in the first embodiment.

A cross-sectional structure of the MISFET $Q_N$ will next be explained. FIG. 23 is a cross sectional view showing the cross section of the MISFET $Q_N$. In FIG. 23, an embedded insulating layer BOX is formed over its corresponding semiconductor substrate (support substrate) SUB, and a silicon layer is formed over the embedded insulating layer BOX. An SOI substrate is formed by the semiconductor substrate SUB, the embedded insulating layer BOX, and the silicon layer. Then, the MISFET $Q_N$ is formed over the SOI substrate. A body region BD is formed in the silicon layer of the SOI substrate. The body region BD is formed from, for example, a p-type semiconductor region into which boron or other p-type impurity is introduced. A gate insulating film GOX1 is formed over the body region BD, and the unit gate electrode G is formed over the gate insulating film GOX1. The gate insulating film GOX1 is formed from a silicon oxide film, for example. On the other hand, the unit gate electrode G is formed from a laminated film of a polysilicon film PF and a first cobalt silicide film CS. The cobalt silicide film CS that configures a part of the unit gate electrode G is formed for reducing the resistance of the unit gate electrode G.

Subsequently, a sidewall SW is formed in each of side walls on both sides of the unit gate electrode G, and low concentration impurity diffusion regions EX1*s* and EX1*d* are formed in the silicon layer that is placed in a layer under the sidewalls SW. The low concentration impurity diffusion regions EX1*s* and EX1*d* are formed in alignment with the unit gate electrode G. Then, a high concentration impurity diffusion region NR1*s* is formed on the outer opposite side of the low concentration impurity diffusion region EX1*s* from the body region BD, and a high concentration impurity diffusion region NR1*d* is formed on the outer, opposite side of the low concentration impurity diffusion region EX1*d* from the body region BD. The high concentration impurity diffusion regions NR1*s* and NR1*d* are formed in alignment with the sidewalls SW. Further, a second cobalt silicide film CS is formed in the surfaces of the high concentration impurity diffusion regions NR1*s* and NR1*d*. The source region SR is formed from the low concentration impurity diffusion region EX1*s*, the high concentration impurity diffusion region NR1*s*, and the second cobalt silicide film CS. The drain region DR is formed from the low concentration impurity diffusion region EX1*d*, the high concentration impurity diffusion region NR1*d*, and the cobalt silicide film CS.

The low concentration impurity diffusion regions EX1*s* and EX1*d* and the high concentration impurity diffusion regions NR1*s* and NR1*d* are both semiconductor regions into which an n-type impurity such as phosphorus or arsenic is introduced, wherein the concentration of the impurity introduced into the low concentration impurity diffusion regions EX1*s* and EX1*d* is lower than that of the impurity introduced into the high concentration impurity diffusion regions NR and NR1*d*.

The MISFET $Q_N$ in the first embodiment is configured as described above. A wiring structure formed over the MISFET $Q_N$ will be described below. In FIG. 23, an interlayer insulating film IL is formed so as to cover the MISFET $Q_N$ in the first embodiment. The interlayer insulating film IL is formed from a silicon oxide film, for example. Then, a contact hole CNT reaching the source region SR, and a contact hole CNT reaching the drain region DR are formed in the interlayer insulating film IL. A titanium/titanium nitride film and a tungsten film are embedded into the contact holes CNT to form the first and second plugs PLG1 and PLG2, respectively. The wiring L1 (source wiring SL, drain wiring DL) is formed over the interlayer insulating film IL in which the plug PLG1 and the plug PLG2 are formed. For example, the wiring L1 is formed from a laminated film of a titanium/titanium nitride film, an aluminum film, and a titanium/titanium nitride film. Further, a multilayer wiring is formed over the wiring L1, but this is omitted in FIG. 23. The MISFET $Q_N$ in the first embodiment is formed in the above-described manner.

Advantages by the First Embodiment

Figure 24:
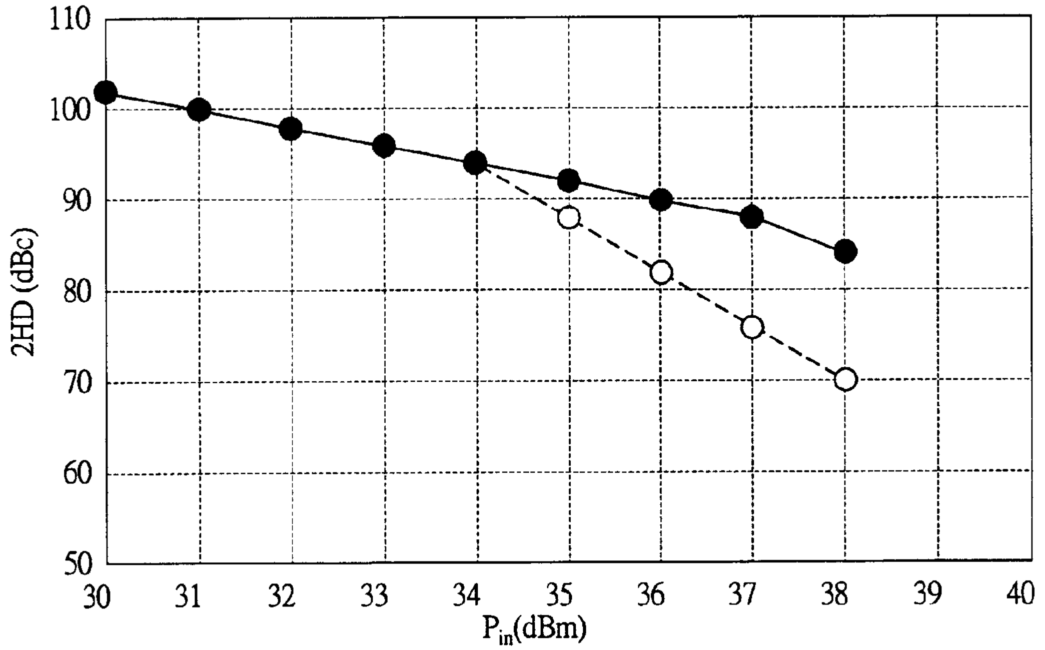
FIG. 24 is a graph showing the dependence of second-order harmonic distortion on input power at a frequency of 0.9 GHz in the antenna switch to which the technical idea according to the first embodiment is applied (open circle), and the antenna switch according to the comparative example (filled circle)

Advantageous effects in the first embodiment will be finally explained with reference to the drawings. FIG. 24 is a graph showing the dependence of second-order harmonic distortion (2HD) on input power ($P_{in}$) at a frequency of 0.9 GHz in the antenna switch to which the technical idea according to the first embodiment is applied, and the antenna switch according to the comparative example. In FIG. 24, the horizontal axis indicates the input power ($P_{in}$), and the vertical axis indicates the second-order harmonic distortion (2HD), respectively. A graph indicated by a solid line in FIG. 24 corresponds to the antenna switch to which the technical idea according to the first embodiment is applied, and a graph indicated by a broken line corresponds to the antenna switch according to the comparative example. Although the second-order harmonic distortion (2HD) is now expressed in decibels in FIG. 24, the expression in decibels indicates how much the magnitude of a high-order harmonic is attenuated from the power for the input power. That is, the smaller the expression of the high-order harmonic in decibels, the lower the attenuation of the power, and hence this shows that the magnitude of the high-order harmonic increases. It is thus understood that referring to FIG. 24, in the antenna switch according to the comparative example, the second-order harmonic distortion increases due to the nonuniformity of a voltage amplitude applied to each of the MISFETs of the turned-OFF TX shunt transistor when the input power ($P_{in}$) reaches 34 dBm or higher. In contrast, in the antenna switch according to the first embodiment, it is understood that the generation of the second-order harmonic distortion can be sufficiently suppressed even if the input power ($P_{in}$) is brought to 37 dBm or so. Specifically, according to the antenna switch in the first embodiment, it is understood that the second-order harmonic distortion at the frequency of 0.9 GHz and the input power ($P_{in}$) of 37 dBm can be reduced by 12 dB or so, as compared with the comparative example.

Figure 25:
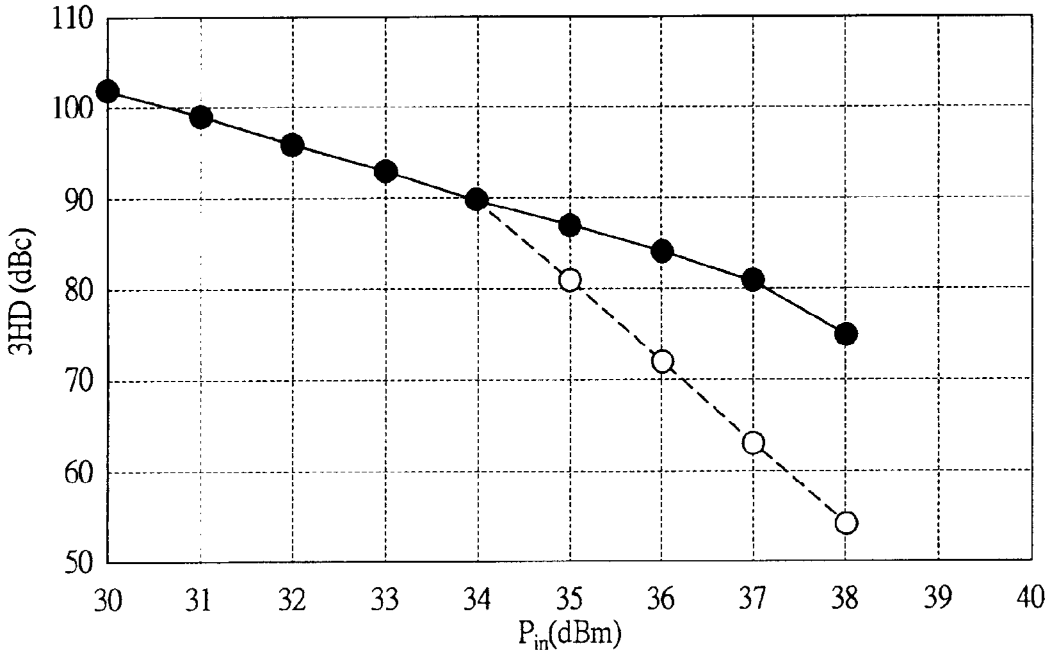
FIG. 25 is a graph showing the dependence of third-order harmonic distortion on input power at the frequency of 0.9 GHz in the antenna switch to which the technical idea according to the first embodiment is applied, and the antenna switch according to the comparative example.

Subsequently, FIG. 25 is a graph showing the dependence of third-order harmonic distortion (3HD) on input power ($P_{in}$) at the frequency of 0.9 GHz in the antenna switch to which the technical idea according to the first embodiment is applied, and the antenna switch according to the comparative example. In FIG. 25, the horizontal axis indicates the input power ($P_{in}$), and the vertical axis indicates the third-order harmonic distortion (3HD), respectively. A graph indicated by a solid line in FIG. 25 corresponds to the antenna switch to which the technical idea according to the first embodiment is applied, and a graph indicated by a broken line corresponds to the antenna switch according to the comparative example.

Although the third-order harmonic distortion (3HD) is now expressed in decibels in FIG. 25, the expression in decibels indicates how much the magnitude of a high-order harmonic is attenuated from the power for the input power. That is, the smaller the expression of the high-order harmonic in decibels, the lower the attenuation of the power, and hence this shows that the magnitude of the high-order harmonic increases. It is thus understood that referring to FIG. 25, in the antenna switch according to the comparative example, the third-order harmonic distortion increases due to the nonuniformity of a voltage amplitude applied to each of the MISFETs of the turned-OFF TX shunt transistor when the input power ($P_{in}$) reaches 34 dBm or higher. In contrast, in the antenna switch according to the first embodiment, it is understood that the generation of the third-order harmonic distortion can be sufficiently suppressed even if the input power ($P_{in}$) is brought to 37 dBm or so. Specifically, according to the antenna switch in the first embodiment, it is understood that the third-order harmonic distortion at the frequency of 0.9 GHz and the input power ($P_{in}$) of 37 dBm can be reduced by 17 dB or so, as compared with the comparative example.

Incidentally, even depending on the antenna switch according to the first modification, the second-order harmonic distortion and the third-order harmonic distortion at the frequency of 0.9 GHz, the input power ($P_{in}$) and 35 dBm can be respectively reduced by 5 dB as compared with the comparative example. Even in the antenna switch according to the second modification, the second-order harmonic distortion and the third-order harmonic distortion at the frequency of 0.9 GHz, the input power ($P_{in}$) and 35 dBm can be respectively reduced by 4 dB as compared with the comparative example. Further, even in the antenna switch according to the third modification, the second-order harmonic distortion and the third-order harmonic distortion at the frequency of 0.9 GHz, the input power ($P_{in}$) and 35 dBm can be respectively reduced by 3 dB as compared with the comparative example.

Second Embodiment

While the first embodiment has explained the example in which the technical idea of the invention of the present application is applied to the TX shunt transistor SE (TX), a second embodiment will describe an example in which the technical idea of the invention of the present application is applied to the RX series transistor SE (RX).

Consider a case in which as shown in FIG. 4, for example, the TX series transistor SE (TX) is turned ON to bring the transmission terminal TX and the antenna terminal ANT (OUT) into conduction, whereby the transmission signal is transmitted from the antenna terminal ANT (OUT) through the transmission terminal TX. In this case, as shown in FIG. 4, the voltage amplitude $V_{L(peak)}$ is applied to the TX shunt transistor SH (TX) that is OFF, and the voltage amplitude $V_{L(peak)}$ is applied to the RX series transistor SE (RX) that is OFF. Accordingly, high-order harmonics are considered to be generated even at the RX series transistor SE (RX) being OFF by a mechanism similar to the mechanism in which the high-order harmonics are generated due to the nonuniformity of the voltage amplitudes applied to the respective MISFETs configuring the TX shunt transistor SH (TX) that is OFF.

However, even in the case of the TX shunt transistor SH (TX) and RX series transistor SE (RX) to which the same voltage amplitude $V_{L(peak)}$ is applied, the generation of the high-order harmonics from the TX shunt transistor SH (TX) will pose a problem rather than the generation of the high-order harmonics from the RX series transistor SE (RX). For this reason, the first embodiment has explained the example in which the technical idea according to the invention of the present application is applied to the TX shunt transistor SH (TX).

This is because since the transmission signal that leaks from the transmission terminal TX to the common terminal GND becomes large when the off capacitance of the TX shunt transistor SH (TX) is large, the off capacitance of the TX shunt transistor SH (TX) is set to about one-tenth or so of the off capacitance of the RX series transistor SE (RX). On the other hand, in the RX series transistor SE (RX), there is no problem because even when the off capacitance is large, the reception terminal RX is set to the ground potential by turning ON the RX shunt transistor SH (RX) provided between the reception terminal RX and the common terminal GND. That is, although the amount of the transmission signal leaking from the antenna terminal ANT (OUT) to the reception terminal RX becomes large when the off capacitance of the RX series transistor SE (RX) is set large, there is no problem because the transmission signal having leaked to the reception terminal RX is sufficiently reflected by grounding the reception terminal RX. It is therefore more important for the RX series transistor SE (RX) to have a reduced on resistance. For this reason, even if the off capacitance becomes large, the gate widths of the respective MISFETs configuring the RX series transistor SE (RX) are increased in order to reduce the on resistance.

From the above, the point of difference between the TX shunt transistor SH (TX) and the RX series transistor SE (RX) resides in that the off capacitance of each of the MISFETs configuring the TX shunt transistor SH (TX) is smaller than that of each of the MISFETs configuring the RX series transistor SE (RX).

Now, as shown in FIG. 7, for example, the nonuniformity of the voltage amplitudes of the MISFETs coupled in series will increase as the ratio of the parasitic capacitance to the off capacitance (to ground capacitance) becomes larger. As described above, the off capacitance of the TX shunt transistor SH (TX) is about one-tenth or so of the off capacitance of the RX series transistor SE (RX). Since the off capacitance is substantially proportional to the gate width, the gate width of each of the MISFETs configuring the TX shunt transistor SH (TX) is about one-tenth or so of the gate width of each of the MISFETs configuring the RX series transistor SE (RX). On the other hand, the parasitic capacitance is largely independent of the gate width, and so the difference between the parasitic capacitance of the TX shunt transistor SH (TX) and the parasitic capacitance of the RX series transistor SE (TX) is almost nothing. Accordingly, the TX shunt transistor SH (TX) is larger than the RX series transistor SE (RX) in the ratio of the parasitic capacitance to the off capacitance. For this reason, the nonuniformity of the voltage amplitudes applied to the respective MISFETs configuring the TX shunt transistor SH (TX) increases, and hence the generation of high-order harmonics arising from it becomes a problem.

Since, however, the mechanism of generation of the high-order harmonics from the TX shunt transistor SH (TX) is the same even in the RX series transistor SE (TX) even if there is a difference in magnitude, the high-order harmonics are generated from the RX series transistor SE (RX). Thus, even in the RX series transistor SE (RX), the high-order harmonics generated from the antenna switch can be further suppressed by applying the technical idea of the invention of the present application.

Figure 26:
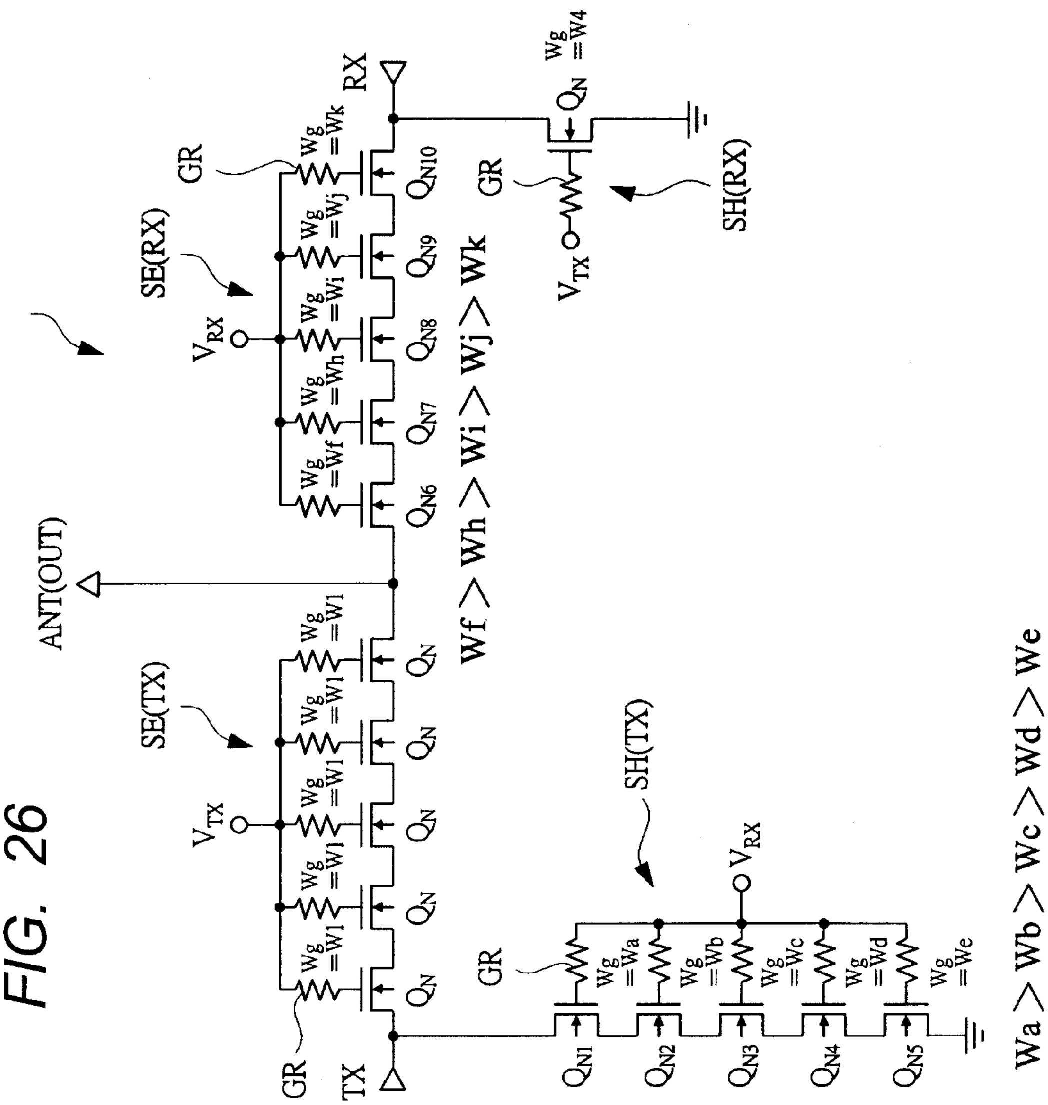
FIG. 26 is a diagram showing a circuit configuration of an antenna switch according to a second embodiment.

FIG. 26 is a diagram showing a circuit configuration of an antenna switch ASW2 according to the second embodiment. As shown in FIG. 26, the antenna switch ASW2 according to the second embodiment has a transmission terminal TX, a reception terminal RX, and an antenna terminal ANT (OUT). The antenna switch ASW2 according to the second embodiment has a TX series transistor SE (TX) between the transmission terminal TX and the antenna terminal ANT (OUT) and has an RX series transistor SE (RX) between the reception terminal RX and the antenna terminal ANT (OUT). Further, the antenna switch ASW2 according to the second embodiment has a TX shunt transistor SH (TX) between the transmission terminal TX and the common terminal GND and has an RX shunt transistor SH (RX) between the reception terminal RX and the common terminal GND.

Here, even in the antenna switch ASW2 according to the second embodiment shown in FIG. 26, the TX shunt transistor SH (TX) is comprised of five MISFETs $Q_{N1}$ through $Q_{N5}$ coupled in series between the transmission terminal TX and the common terminal GND, for example. Even in the second embodiment as with the first embodiment, the five MISFETs QN1 through $Q_{N5}$ configuring the TX shunt transistor SH (TX) are configured in such a manner that their gate widths are different from each other. That is, even in the second embodiment, the gate widths Wg of the five MISFETs $Q_{N1}$ through $Q_{N5}$ configuring the TX shunt transistor SH (TX) are different from one another. Described in detail, assuming that as shown in FIG. 26, the gate width Wg of the first MISFET $Q_{N1}$=Wa, the gate width Wg of the MISFET $Q_{N2}$=Wb, the gate width Wg of the MISFET $Q_{N3}$=Wc, the gate width Wg of the MISFET $Q_{N4}$=Wd, and the gate width Wg of the MISFET $Q_{N5}$=We, the gate electrodes of the MISFETs $Q_{N1}$ through $Q_{N5}$ are formed in such a manner that a relationship of Wa>Wb>Wc>Wd>We is established.

Thus, for the TX shunt transistor SH (TX) of the second embodiment seen in FIG. 26, the gate widths of the transistors increase monotonically from the common terminal GND (TX) to the transmission terminal TX, or equivalently, decrease monotonically from the transmission terminal TX to the common terminal GND (TX). In other words, it can be said that even in the second embodiment, the gate widths Wg of the plural MISFETs $Q_{N1}$ through $Q_{N5}$ increase gradually from the MISFET $Q_{N5}$ coupled to the side close to the common terminal GND to the first MISFET $Q_{N1}$ coupled to the side close to the transmission terminal TX. Thus, according to the second embodiment, when a high-power transmission signal is output, high-order harmonics generated from the TX shunt transistor SH (TX) which is OFF, can be suppressed.

Further, in the second embodiment, five MISFETs $Q_{N6}$ through $Q_{N10}$ configuring the RX series transistor SE (RX) are configured in such a manner that their gate widths are different from each other. That is, in the second embodiment, the gate widths Wg of the five MISFETs $Q_{N6}$ through $Q_{N10}$ configuring the RX series transistor SE (RX) are different from one another. The first MISFET $Q_{N6}$ configuring the RX series transistor SE (RX) is closest the antenna terminal ANT (OUT) while the last MISFET $Q_{N10}$ is configuring the RX series transistor SE (RX) closest to the reception terminal RX. Described in detail, assuming that as shown in FIG. 26, the gate width Wg of the first MISFET $Q_{N6}$=Wf, the gate width Wg of the MISFET $Q_{N7}$=Wh, the gate width Wg of the MISFET $Q_{N8}$=Wi, the gate width Wg of the MISFET $Q_{N9}$=Wj, and the gate width Wg of the last MISFET $Q_{N10}$=Wk, the gate electrodes of the MISFETs $Q_{N6}$ through $Q_{N10}$ are formed in such a manner that a relationship of Wf>Wh>Wi>Wj>Wk is established.

Thus, for the RX series transistor SE (RX) of the second embodiment seen in FIG. 26, the gate widths of the transistors increase monotonically from the reception terminal RX to the antenna terminal ANT (OUT) or equivalently, decrease monotonically from the antenna terminal ANT (OUT) to the reception terminal RX. In other words, it can be said that in the second embodiment, the gate widths Wg of the plural MISFETs $Q_{N6}$ through $Q_{N10}$ increase gradually from the MISFET $Q_{N10}$ coupled to the side close to the reception terminal RX to the MISFET $Q_{N6}$ coupled to the side close to the antenna terminal ANT (OUT). Thus, according to the second embodiment, when a high-power transmission signal is output, high-order harmonics generated from the RX series transistor SE (RX) which is OFF, can be suppressed. In the second embodiment as described above, the generation of high-order harmonics from the antenna switch ASW2 can be further suppressed by applying the technical idea of the invention of the present application not only the TX shunt transistor SH (TX) but also to the RX series transistor SE (RX).

In particular, as one example of means for embodying the relationship of Wf>Wh>Wi>Wj>Wk in the five MISFETs $Q_{N6}$ through $Q_{N10}$ configuring the RX series transistor SE (RX), it is considered that a layout configuration thereof is taken in such a manner that the gate widths of the MISFETs increase on a linear function basis or a quadric function basis gradually from the MISFET coupled to the side close to the reception terminal RX to the MISFET coupled to the side close to the antenna terminal ANT (OUT).

Incidentally, the essence of the technical idea according to the second embodiment resides in that in a plurality of MISFETs configuring the RX series transistor SE (RX), at least the MISFET coupled to the antenna terminal ANT (OUT) rather than the MISFET coupled to the reception terminal RX is configured in such a manner that the off capacitance indicative of the capacitance provided between the source and drain regions of the MISFET that is OFF increases. Thus, at least, the voltage amplitudes applied to the plural MISFETs respectively, configuring the RX series transistor SE (RX) can be made sufficiently uniform as compared with the case in which Wf=Wh=Wi=Wj=Wk is established. As a result, there can be obtained an outstanding advantage that the high-order harmonics generated from the RX series transistor SE (RX) that is OFF can be sufficiently suppressed.

Third Embodiment

Circuit Configuration of Antenna Switch According to the Third Embodiment

The present embodiment will explain an example in which capacitive elements different in electrostatic capacitance value are coupled in parallel with MISFETs $Q_{N1}$ through $Q_{N5}$ configuring a TX shunt transistor SH (TX).

Figure 27:
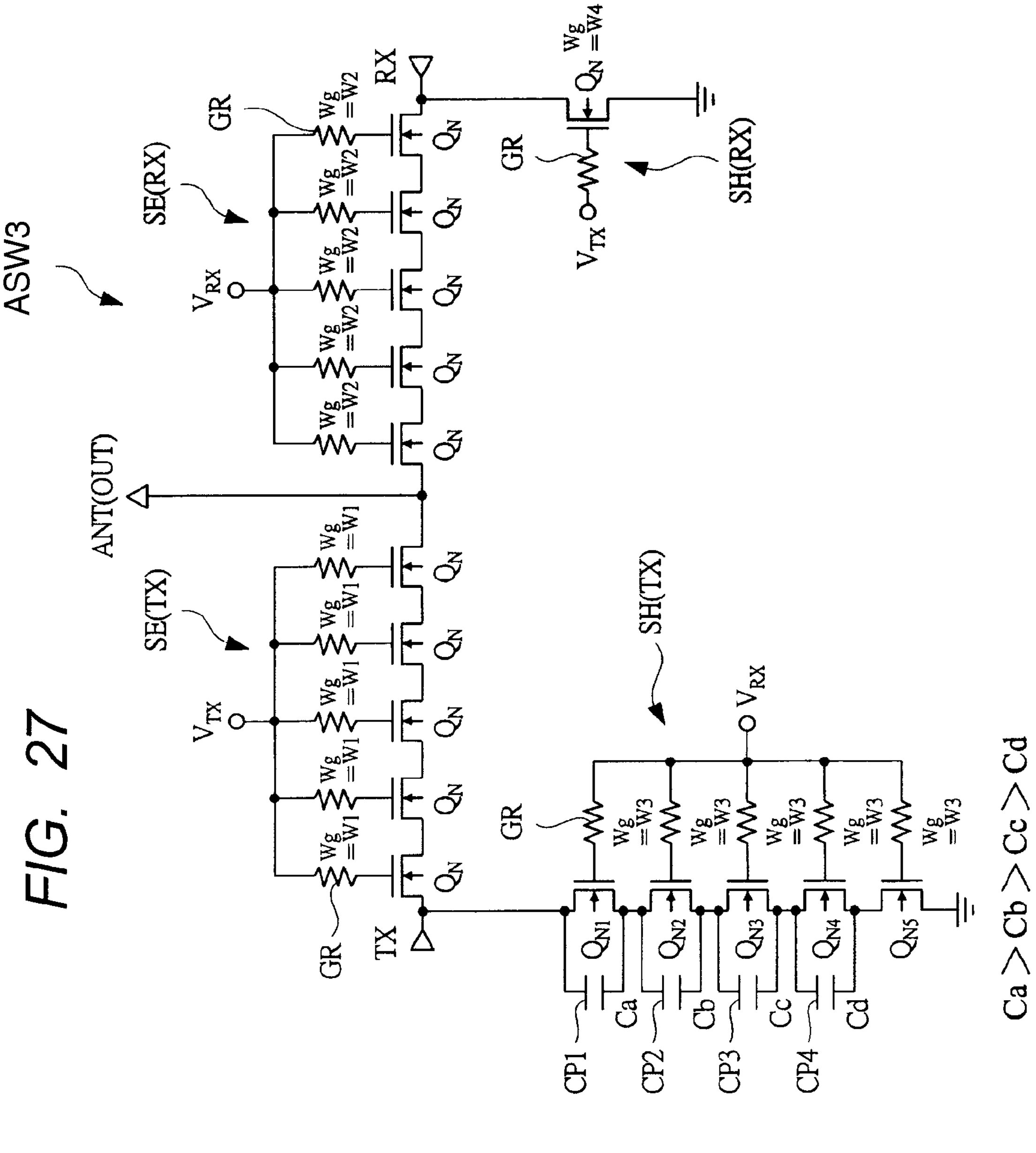
FIG. 27 is a diagram illustrating a circuit configuration of an antenna switch according to a third embodiment.

FIG. 27 is a diagram showing a circuit configuration of an antenna switch ASW3 according to the third embodiment. As shown in FIG. 27, the antenna switch ASW3 according to the third embodiment has a transmission terminal TX, a reception terminal RX, and an antenna terminal ANT (OUT). The antenna switch ASW3 according to the third embodiment has a TX series transistor SE (TX) between the transmission terminal TX and the antenna terminal ANT (OUT) and has an RX series transistor SE (RX) between the reception terminal RX and the antenna terminal ANT (OUT). Further, the antenna switch ASW3 according to the third embodiment has a TX shunt transistor SH (TX) between the transmission terminal TX and the common terminal GND and has an RX shunt transistor SH (RX) between the reception terminal RX and the common terminal GND.

Here, even in the antenna switch ASW3 according to the third embodiment shown in FIG. 27, the TX shunt transistor SH (TX) is comprised of five MISFETs $Q_{N1}$ through $Q_{N5}$ coupled in series between the transmission terminal TX and the common terminal GND, for example. At this time, the gate widths Wg of the MISFETs $Q_{N1}$ through $Q_{N5}$ are the same (Wg=W3).

In the third embodiment, however, the capacitive elements different in electrostatic capacitance value are coupled to the MISFETs $Q_{N1}$ through $Q_{N4}$ which are coupled in series to the common terminal GND via last MISFET $Q_{N5}$. The capacitive elements are connected across the source and drain regions of each of the first MISFET $Q_{N1}$ through the next-to-last MISFET $Q_{N4}$, but not across the source and drain regions of the last MISFET $Q_{N5}$. Specifically, a first capacitive element CP1 having an electrostatic capacitance value Ca is coupled in parallel with the first MISFET $Q_{N1}$, and a second capacitive element CP2 having an electrostatic capacitance value Cb is coupled in parallel with the second MISFET $Q_{N2}$. Then, a third capacitive element CP3 having an electrostatic capacitance value Cc is coupled in parallel with the third MISFET $Q_{N3}$, and a fourth capacitive element CP4 having an electrostatic capacitance value Cd is coupled in parallel with the fourth MISFET $Q_{N4}$. The electrostatic capacitance values are such that Ca>Cb>Cc>Cd is established.

Accordingly, a relationship of the combined capacitance of the off capacitance of first MISFET $Q_{N1}$ and the electrostatic capacitance value Ca of the first capacitive element CP1>the combined capacitance of the off capacitance of second MISFET $Q_{N2}$ and the electrostatic capacitance value Cb of the second capacitive element CP2>the combined capacitance of the off capacitance of third MISFET $Q_{N3}$ and the electrostatic capacitance value Cc of the third capacitive element CP3>the combined capacitance of the off capacitance of fourth MISFET $Q_{N4}$ and the electrostatic capacitance value Cd of the capacitive element fourth CP4>the off capacitance of MISFET $Q_{N5}$ is established. Thus, according to the third embodiment, when a high-power transmission signal is output, high-order harmonics generated from the TX shunt transistor SH (TX) that is OFF can be suppressed. That is, the first embodiment has realized the configuration of varying the off capacitances of the MISFETs $Q_{N1}$ through $Q_{N5}$ by using the configuration of changing the gate widths of the five MISFETs $Q_{N1}$ through $Q_{N5}$ configuring the TX shunt transistor SH (TX). In contrast, the third embodiment has a configuration in which the off capacitances of the MISFETs $Q_{N1}$ through $Q_{N5}$ are respectively varied by coupling the capacitive elements different in the electrostatic capacitance value in parallel with the MISFETs $Q_{N1}$ through $Q_{N4}$ except for the last MISFET $Q_{N5}$ coupled in series to the common terminal GND.

In particular, as one example of means for embodying the relationship of Ca>Cb>Cc>Cd in the capacitive elements CP1 through CP4 coupled in parallel with the four MISFETs QN1 through $Q_{N4}$ configuring the TX shunt transistor SH (TX), there is considered such a configuration that the electrostatic capacitance values of the capacitive elements CP1 through CP4 increase on a linear function basis or a quadric function basis gradually from the MISFET $Q_{N4}$ coupled to the side close to the common terminal GND to the MISFET $Q_{N1}$ coupled to the side close to the transmission terminal TX. Thus, for the TX shunt transistor SH (TX) of the third embodiment seen in FIG. 27, the electrostatic capacitance values of the capacitive elements CP1 through CP4 corresponding to all but the last MISFET $Q_{N5}$ which closest to the common terminal GND (TX) decrease monotonically from the transmission terminal TX to the common terminal GND (TX).

Layout Configuration of TX Shunt Transistor

Figure 28:
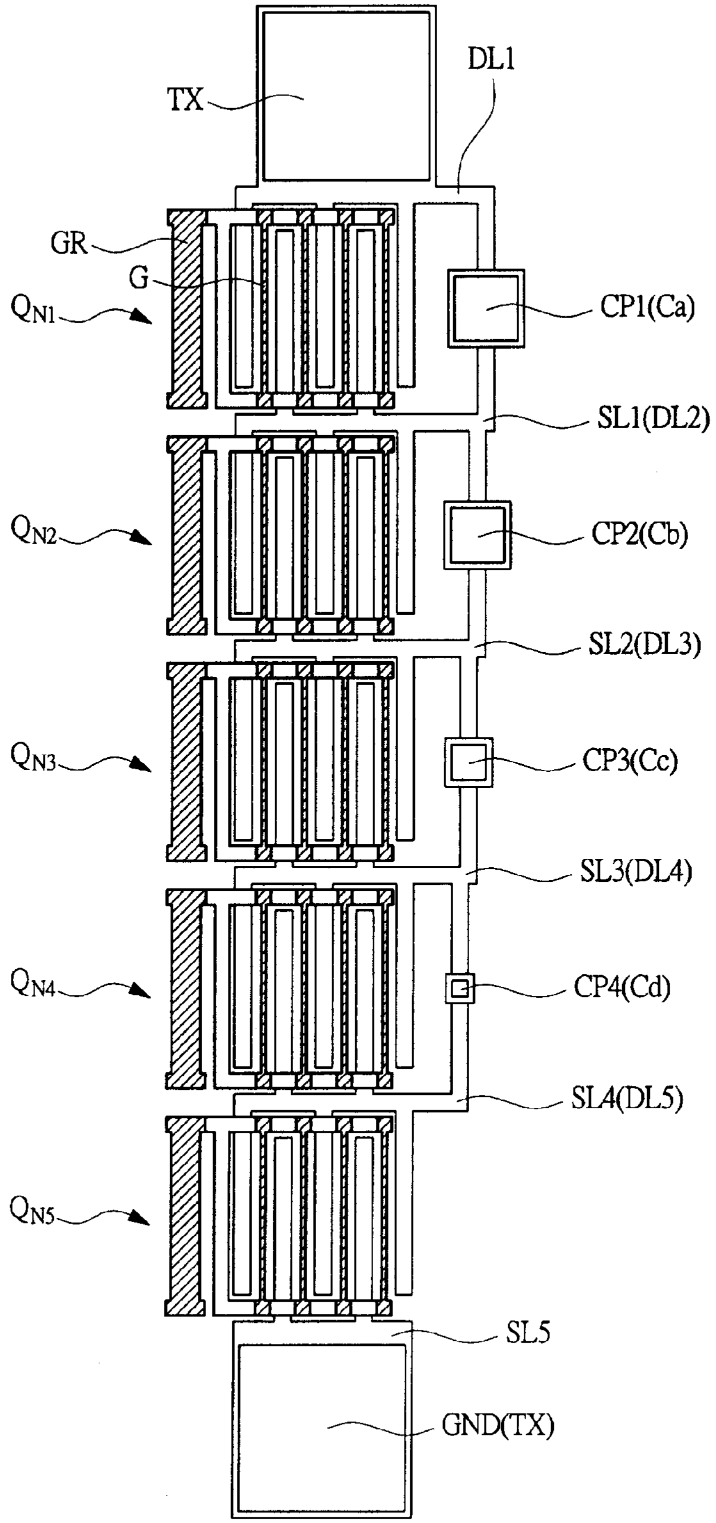
FIG. 28 is a plan view depicting a layout configuration of a TX shunt transistor and capacitive elements in the third embodiment.

A layout configuration of the TX shunt transistor SH (TX) and the capacitive elements CP1 through CP4 in the third embodiment will next be explained with reference to the drawing. FIG. 28 is a plan view showing the layout configuration of the TX shunt transistor SH (TX) and the capacitive elements CP1 through CP4 in the third embodiment. In FIG. 28, the TX shunt transistor SH (TX) and the capacitive elements CP1 through CP4 are formed between the transmission terminal TX and the common terminal GND (TX). The TX shunt transistor SH (TX) is comprised of MISFETs $Q_{N1}$ through $Q_{N5}$ coupled in series between the transmission terminal TX and the common terminal GND. Specifically, the MISFETs $Q_{N1}$ through $Q_{N5}$ are coupled in series sequentially from the transmission terminal TX toward the common terminal GND (TX). In the third embodiment, the gate widths of the MISFETs $Q_{N1}$ through $Q_{N5}$ are the same (finger lengths are the same and the number of fingers is four and the same).

Subsequently, the layout configuration of the capacitive elements CP1 and CP2 will be explained. In FIG. 28, the capacitive element CP1 is provided between a drain wiring DL1 and a source wiring SL1. Accordingly, the capacitive element CP1 is coupled in parallel with the MISFET QN1. Then, the capacitive element CP2 is provided between a drain wiring DL2 and a source wiring SL2. Therefore, the capacitive element CP2 is coupled in parallel with the MISFET $Q_{N2}$. Further, the capacitive element CP3 is provided between a drain wiring DL3 and a source wiring SL3. Accordingly, the capacitive element CP3 is coupled in parallel with the MISFET $Q_{N3}$. Likewise, the capacitive element CP4 is provided between a drain wiring DL4 and a source wiring SL4. Therefore, the capacitive element CP4 is coupled in parallel with the MISFET $Q_{N4}$. Incidentally, no capacitive element is coupled in parallel with the MISFET QN5 coupled in series to the common terminal GND (TX).

Here, as shown in FIG. 28, the electrode area of the capacitive element CP1 is formed larger than that of the capacitive element CP2, and the electrode area of the capacitive element CP2 is formed larger than that of the capacitive element CP3. Further, the electrode area of the capacitive element CP3 is formed larger than that of the capacitive element CP4. Since the electrostatic capacitance value of the capacitive element is proportional to the electrode area, a relationship of the electrostatic capacitance value Ca of the capacitive element CP1>the electrostatic capacitance value Cb of the capacitive element CP2>the electrostatic capacitance value Cc of the capacitive element CP3>the electrostatic capacitance value Cd of the capacitive element CP4 is established in FIG. 28.

It is thus possible to realize a configuration equivalent to the configuration of varying the off capacitances of the respective MISFETs $Q_{N1}$ through $Q_{N5}$. When a high-power transmission signal is output, high-order harmonics generated from the TX shunt transistor SH (TX) that is OFF can be suppressed.

Incidentally, it is desirable that when the TX shunt transistor SH (TX) comprised of the MISFETs $Q_{N1}$ through $Q_{N5}$ is OFF, the relationship of Ca>Cb>Cc>Cd is established between the above capacitive elements CP1 and CP4 in terms of making uniform the voltage amplitudes applied to the respective MISFETs $Q_{N1}$ through $Q_{N5}$.

However, the condition for realizing the problem (reduction in the high-order harmonics) to be solved by the technical idea in the first embodiment will not be limited to or by the above-described relation. For example, only the first MISFET $Q_{N1}$ coupled in series to the transmission terminal TX may be provided with the first capacitive element CP1 in parallel therewith. Even in this case, the purpose of suppressing the generation of the high-order harmonics can be achieved as compared with the case provided with no capacitive elements. That is, the technical idea in the first embodiment is that if it is brought into superordinate conceptualization in a problem-solvable scope, then the first capacitive element CP1 is coupled between the source region and the drain region of the first MISFET $Q_{N1}$ coupled to the transmission terminal TX while the off capacitances indicative of the capacitances between the source and drain regions of the plural MISFETs $Q_{N1}$ through $Q_{N5}$ when the MISFETs QN1 through $Q_{N5}$ are OFF, are the same.

Thus, at least, the voltage amplitudes applied to the respective MISFETs $Q_{N1}$ through $Q_{N5}$ respectively, configuring the TX shunt transistor SH (TX) can be made sufficiently uniform as compared with the case free of the provision of the capacitive elements. As a result, there can be obtained an outstanding advantage that the high-order harmonics generated from the TX shunt transistor SH (TX) that is OFF can be sufficiently suppressed.

In the third embodiment, the gate widths of the MISFETs $Q_{N1}$ through $Q_{N5}$ configuring the TX shunt transistor SH (TX) are made identical to each other, but are not limited thereto. By using the configuration of coupling the capacitive elements different in the electrostatic capacitance value in parallel with the MISFETs $Q_{N1}$ through $Q_{N4}$ and varying the gate widths of the five MISFETs $Q_{N1}$ through $Q_{N5}$ as in the first embodiment, the configuration of changing the off capacitances of the respective MISFETs $Q_{N1}$ through $Q_{N5}$ may be used in conjunction therewith. Thus, in further embodiments one can vary combinations of gate widths and capacitances to achieve suitable results.

Configuration of Capacitance Element

A description will next be given about the configuration of the capacitive elements CP1 through CP4 coupled in parallel with the TX shunt transistor SH (TX). For example, the capacitive elements CP1 through CP4 are formed in a SOI substrate similar to that for the MISFETs $Q_{N1}$ through $Q_{N5}$ that configure the TX shunt transistor SH (TX). Specifically, each of the capacitive elements CP1 through CP4 can be formed from a wiring layer formed over the SOI substrate. That is, each of the capacitive elements CP1 through CP4 can be formed from, for example, a MIM (Metal Insulator Metal) capacitance in which a lower wiring made of a metal wiring is provided as a lower electrode, a capacitive insulating film is formed over the lower electrode, and an upper wiring made of a metal wiring is formed as an upper electrode over the capacitive insulating film. Further, each of the capacitive elements CP1 through CP4 can also be formed from an MOS capacitance, for example. Namely, a silicon layer of the SOI substrate is provided as a lower electrode, and a capacitive insulating film of the same layer as a gate insulating film for the MISFETs $Q_{N1}$ through $Q_{N5}$ is formed over the lower electrode. Then, an upper electrode is formed over the capacitive insulating film from a polysilicon film of the same layer as the gate electrode of each of the MISFETs $Q_{N1}$ through $Q_{N5}$, whereby each of the capacitive elements CP1 through CP4 can also be formed from the MOS capacitance, for example.

Advantage of the Third Embodiment

Even the antenna switch according to the third embodiment is capable of reducing second-order and third-order harmonics at a frequency of 0.9 GHz and an input power ($P_{in}$) of 35 dBm by 4 dB, respectively, as compared with the case in which no capacitive elements are provided.

Circuit Configuration of Antenna Switch According to Fourth Modification

The third embodiment has explained the example in which the capacitance elements different in the electrostatic capacitance value are respectively coupled between the source and drain regions of the MISFETs $Q_{N1}$ through $Q_{N5}$ configuring the TX shunt transistor SH (TX). The present modification will explain an example in which capacitive elements are coupled between source regions and gate electrodes of MISFETs $Q_{N1}$ through $Q_{N5}$ configuring a TX shunt transistor SH (TX) and between the gate electrodes and drain regions thereof.

Figure 29:
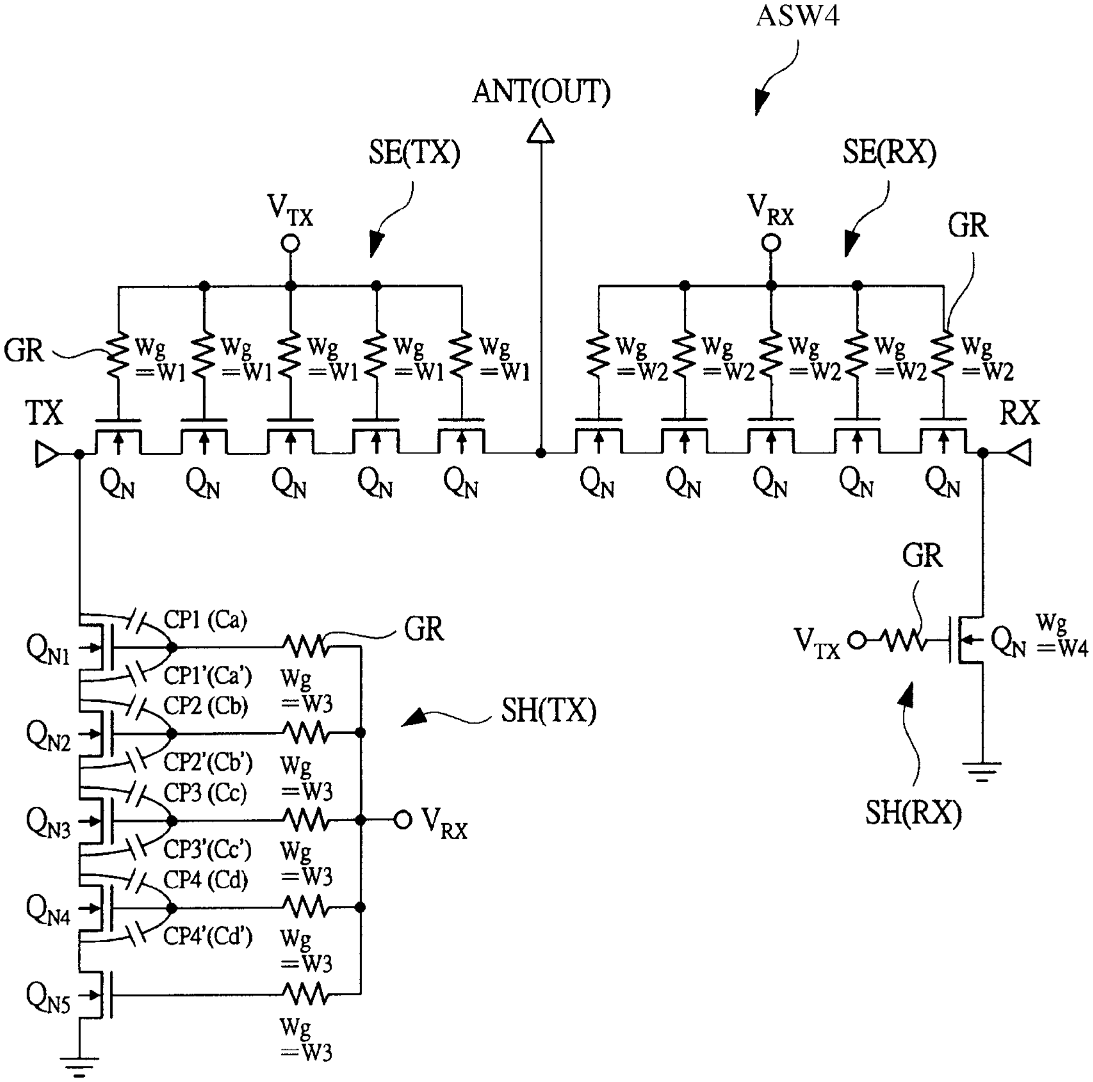
FIG. 29 is a diagram showing a circuit configuration of an antenna switch according to a fourth modification.

FIG. 29 is a diagram showing a circuit configuration of the antenna switch ASW4 according to the fourth modification. As shown in FIG. 29, the antenna switch ASW4 according to the fourth modification has a configuration substantially similar to that of the antenna switch ASW3 according to the third embodiment. That is, even in the antenna switch ASW4 according to the fourth modification shown in FIG. 29, the TX shunt transistor SH (TX) is comprised of five MISFETs $Q_{N1}$ through $Q_{N5}$ coupled in series between a transmission terminal TX and a common terminal GND, for example. At this time, the gate widths Wg of the MISFETs $Q_{N1}$ through $Q_{N5}$ are the same (Wg=W3).

In the fourth modification, however, the capacitive elements are coupled between the source regions and gate electrodes of the MISFETs $Q_{N1}$ through $Q_{N4}$ (all except for the last MISFET $Q_{N5}$ which closest to the common terminal GND) coupled in series to the common terminal GND, and between the gate electrodes and the drain regions thereof. Thus, the gate electrode of each of MISFETs $Q_{N1}$ through $Q_{N4}$ has two capacitive elements associated therewith, one with the source region and one with the drain region.

Specifically, the first MISFET $Q_{N1}$ has a first capacitive element CP1 (electrostatic capacitance value Ca) coupled between its source region and its gate electrode, and a second capacitive element CP1' (electrostatic capacitance value Ca') coupled between its gate electrode and its drain region. Likewise, the second MISFET $Q_{N2}$ has a first capacitive element CP2 (electrostatic capacitance value Cb) coupled between its source region and its gate electrode, and a second capacitive element CP2' (electrostatic capacitance value Cb') coupled between its gate electrode and its drain region. Similarly, the third MISFET $Q_{N3}$ has a first capacitive element CP3 (electrostatic capacitance value Cc) is coupled between its source region and its gate electrode, and a second capacitive element CP3' (electrostatic capacitance value Cc') coupled between its gate electrode and its drain region. Finally, the fourth MISFET $Q_{N4}$ has a first capacitive element CP4 (electrostatic capacitance value Cd) is coupled between its source region and its gate electrode, and a second capacitive element CP4' (electrostatic capacitance value Cd') coupled between its gate electrode and its drain region.

At this time, $CaCa'/(Ca+Ca')>CbCb'/(Cb+Cb')>CcCc'/(Cc+Cc')>CdCd'/(Cd+Cd')$ is established.

Accordingly, the combined capacitance of the off capacitance of first MISFET $Q_{N1}$, the capacitive element CP1 (electrostatic capacitance value Ca) and the capacitive element CP1' (electrostatic capacitance value Ca')>the combined capacitance of the off capacitance of MISFET $Q_{N2}$, the capacitive element CP2 (electrostatic capacitance value Cb) and the capacitive element CP2' (electrostatic capacitance value Cb') is established. Further, the combined capacitance of the off capacitance of MISFET $Q_{N2}$, the capacitive element CP2 (electrostatic capacitance value Cb) and the capacitive element CP2' (electrostatic capacitance value Cb')>the combined capacitance of the off capacitance of MISFET $Q_{N3}$, the capacitive element CP3 (electrostatic capacitance value Cc) and the capacitive element CP3' (electrostatic capacitance value Cc') is established. Then, a relationship of the combined capacitance of the off capacitance of MISFET $Q_{N3}$, the capacitive element CP3 (electrostatic capacitance value Cc)

and the capacitive element CP3' (electrostatic capacitance value Cc')>the combined capacitance of the off capacitance of MISFET $Q_{N4}$, the capacitive element CP4 (electrostatic capacitance value Cd) and the capacitive element CP4' (electrostatic capacitance value Cd')>the off capacitance of the MISFET $Q_{N5}$ is established.

Thus, according to the fourth modification, when a high-power transmission signal is output, high-order harmonics generated from the TX shunt transistor SH (TX) that is OFF can be suppressed. That is, in the fourth modification, the capacitive elements are coupled between the source regions and gate electrodes of the respective MISFETs $Q_{N1}$ through $Q_{N4}$ and between the gate electrodes and drain regions thereof. In this capacitance configuration, indirectly, the combined capacitance of the capacitive element formed between the source region and the gate electrode, and the capacitive element formed between the gate electrode and the drain region can be considered to have been formed between the source and drain regions of each of the MISFETs $Q_{N1}$ through $Q_{N4}$. From this, the configuration of the fourth modification is equivalent to the configuration of the third embodiment. As a result, when a high-power transmission signal is output, high-order harmonics generated from the TX shunt transistor SH (TX) that is OFF can be suppressed.

Circuit Configuration of Antenna Switch According to Fifth Modification

The present modification will explain an example in which capacitive elements are respectively coupled between source regions and gate electrodes of MISFETs $Q_{N1}$ through $Q_{N5}$ configuring a TX shunt transistor SH (TX), between the gate electrodes and drain regions thereof and between the source and drain regions thereof.

Figure 30:
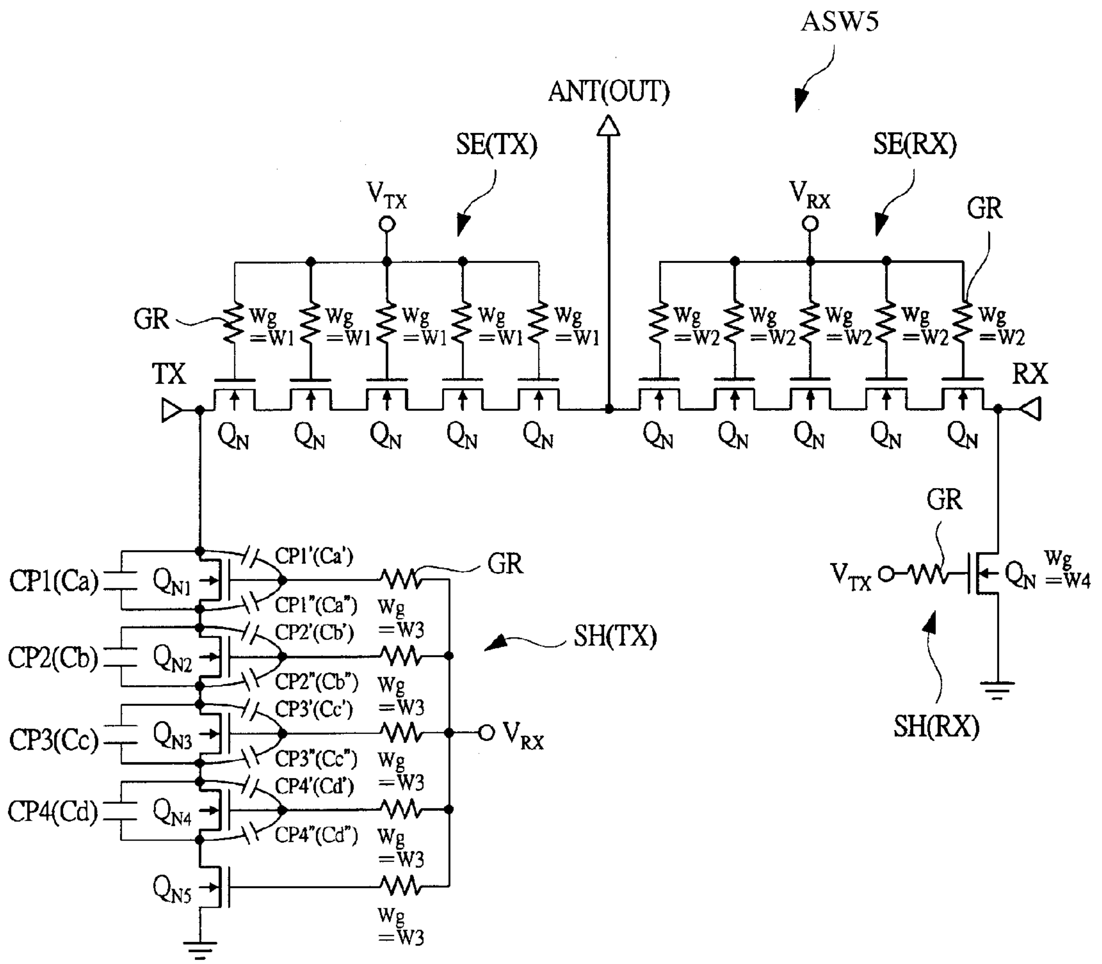
FIG. 30 is a diagram illustrating a circuit configuration of an antenna switch according to a fifth modification.

FIG. 30 is a diagram showing a circuit configuration of the antenna switch ASW5 according to the fifth modification. As shown in FIG. 30, the antenna switch ASW5 according to the fifth modification has a configuration substantially similar to that of the antenna switch ASW3 according to the third embodiment. That is, even in the antenna switch ASW5 according to the fifth modification shown in FIG. 30, the transmission shunt transistor SH (TX) is comprised of five MISFETs $Q_{N1}$ through $Q_{N5}$ coupled in series between a transmission terminal TX and a common terminal GND, for example. At this time, the gate widths Wg of the MISFETs $Q_{N1}$ through $Q_{N5}$ are the same (Wg=W3).

The fifth modification combines the source-drain capacitance feature of the third embodiment (See FIG. 27) with the source-gate and gate-drain capacitances of the fourth embodiment (See FIG. 29). In the fifth modification, the capacitive elements are coupled between the source regions and gate electrodes of the MISFETs $Q_{N1}$ through $Q_{N4}$ (all except for the last MISFET $Q_{N5}$ which is closest to the common terminal GND) coupled in series to the common terminal GND, between the gate electrodes and the drain regions thereof, and between the source and drain regions thereof. Thus, in the fifth modification, each MISFETs $Q_{N1}$ through $Q_{N4}$ has three capacitances associated therewith: a first capacitance between the source region and the drain region, a second capacitance between the source region and the gate electrode, and a third capacitance between the gate electrode and the drain region.

Specifically, a capacitive element CP1 (electrostatic capacitance value Ca) is formed between the source region and drain region of the first MISFET $Q_{N1}$, and a capacitive element CP1' (electrostatic capacitance value Ca') is coupled between the source region and gate electrode thereof. A capacitive element CP" (electrostatic capacitance value Ca") is coupled between the gate electrode and drain region of the first MISFET $Q_{N1}$. Likewise, a capacitive element CP2 (electrostatic capacitance value Cb) is formed between the source region and drain region of the second MISFET $Q_{N2}$, and a capacitive element CP2' (electrostatic capacitance value Cb') is coupled between the source region and gate electrode of the second MISFET $Q_{N2}$. Further, a capacitive element CP2" (electrostatic capacitance value Cb") is coupled between the gate electrode and drain region of the second MISFET $Q_{N2}$. Then, a capacitive element CP3 (electrostatic capacitance value Cc) is formed between the source region and drain region of the third MISFET $Q_{N3}$, and a capacitive element CP3' (electrostatic capacitance value Cc') is coupled between the source region and gate electrode thereof. A capacitive element CP3" (electrostatic capacitance value Cc") is coupled between the gate electrode and drain region of the third MISFET $Q_{N3}$. Further, a capacitive element CP4 (electrostatic capacitance value Cd) is formed between the source region and drain region of the fourth MISFET $Q_{N4}$, and a capacitive element CP4' (electrostatic capacitance value Cd') is coupled between the source region and gate electrode thereof. A capacitive element CP4" (electrostatic capacitance value Cd") is coupled between the gate electrode and drain region of the fourth MISFET $Q_{N4}$.

At this time, [Ca+Ca'Ca"/(Ca'+Ca")]>[Cb+Cb'Cb"/(Cb'+Cb")]>[Cc+Cc'Cc"/(Cc'+Cc")>[Cd+Cd'Cd"/(Cd'+Cd")] is established.

Accordingly, the combined capacitance of the off capacitance of MISFET $Q_{N1}$, the capacitive element CP1 (electrostatic capacitance value Ca), the capacitive element CP1' (electrostatic capacitance value Ca') and the capacitive element CP1" (electrostatic capacitance value Ca")>the combined capacitance of the off capacitance of MISFET $Q_{N2}$, the capacitive element CP2 (electrostatic capacitance value Cb), the capacitive element CP2' (electrostatic capacitance value Cb') and the capacitive element CP2" (electrostatic capacitance value Cb") is established.

Further, the combined capacitance of the off capacitance of MISFET $Q_{N2}$, the capacitive element CP2 (electrostatic capacitance value Cb), the capacitive element CP2' (electrostatic capacitance value Cb') and the capacitive element CP2" (electrostatic capacitance value Cb")>the combined capacitance of the off capacitance of MISFET $Q_{N3}$, the capacitive element CP3 (electrostatic capacitance value Cc), the capacitive element CP3' (electrostatic capacitance value Cc') and the capacitive element CP3" (electrostatic capacitance value Cc") is established.

Then, a relationship of the combined capacitance of the off capacitance of MISFET $Q_{N3}$, the capacitive element CP3 (electrostatic capacitance value Cc), the capacitive element CP3' (electrostatic capacitance value Cc') and the capacitive element CP3" (electrostatic capacitance value Cc")>the combined capacitance of the off capacitance of MISFET $Q_{N4}$, the capacitive element CP4 (electrostatic capacitance value Cd), the capacitive element CP4' (electrostatic capacitance value Cd') and the capacitive element CP4" (electrostatic capacitance value Cd")>the off capacitance of MISFET $Q_{N5}$ is established.

Thus, according to the fifth modification, when a high-power transmission signal is output, high-order harmonics generated from the TX shunt transistor SH (TX) that is OFF can be suppressed. That is, in the fifth modification, the capacitive elements are coupled between the source regions and drain regions of the respective MISFETs $Q_{N1}$ through $Q_{N4}$, between the source regions and gate electrodes thereof and between the gate electrodes and drain regions thereof. In this capacitance configuration, indirectly, the combined capacitance of the capacitive element formed between the source region and the drain region, the capacitive element formed between the source region and the gate electrode, and the capacitive element formed between the gate electrode and the drain region can be considered to have been formed between the source and drain regions of each of the MISFETs $Q_{N1}$ through $Q_{N4}$. From this, the configuration of the fifth modification is equivalent to the configuration of the third embodiment. As a result, when a high-power transmission signal is output, high-order harmonics generated from the TX shunt transistor SH (TX) that is OFF can be suppressed.

Fourth Embodiment

The first embodiment explained the example in which each of the MISFETs $Q_{N1}$ through $Q_{N5}$ configuring the TX shunt transistor SH (TX) is configured from the MISFET of the single-gate structure, having one unit gate electrode formed above and between the source and drain regions. A fourth embodiment will explain an example in which each of MISFETs $Q_{N1}$ through $Q_{N5}$ configuring a TX shunt transistor SH (TX) is configured from a MISFET of a multi-gate structure having a plurality of unit gate electrodes formed above and between source and drain regions thereof.

As the MISFET of the multi-gate structure, there are known a MISFET of a dual-gate structure having two unit gate electrodes formed over between source and drain regions thereof, a MISFET of a triple-gate structure having three unit gate electrodes formed over between source and drain regions thereof, etc. In the following description, the MISFET of the dual-gate structure will be explained as one example of the MISFET of the multi-gate structure.

In the fourth embodiment, each of the MISFETs $Q_{N1}$ through $Q_{N5}$ configuring the TX shunt transistor SH (TX) is formed from the MISFET of the dual-gate structure.

Figure 31:
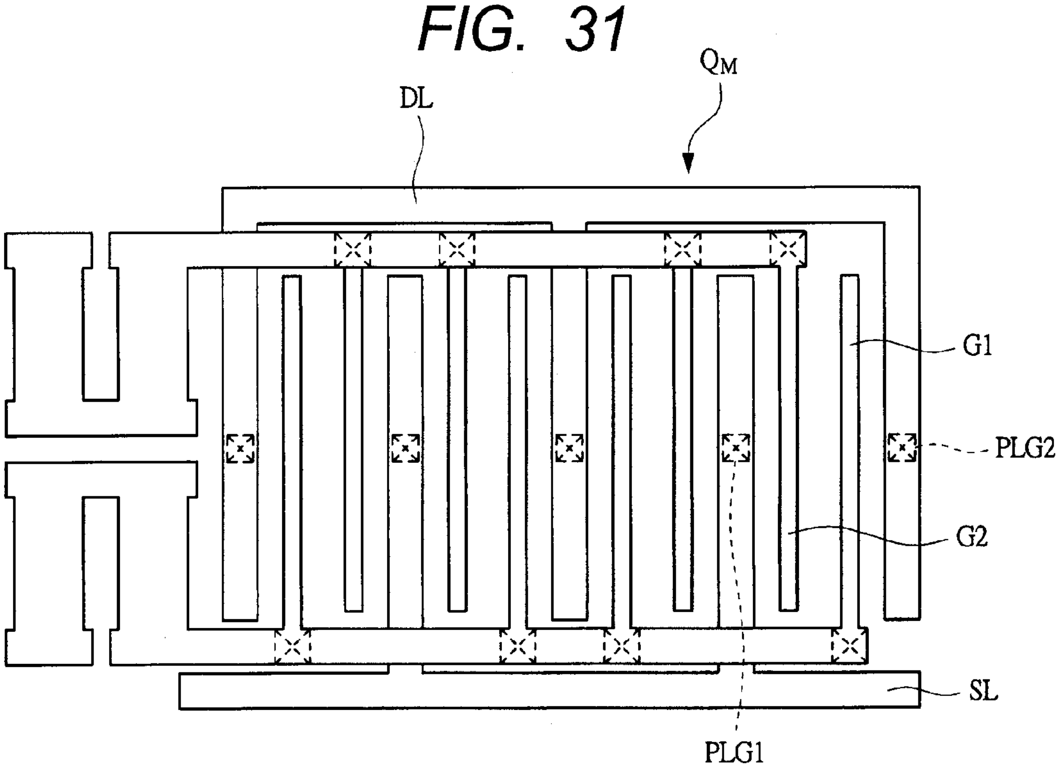
FIG. 31 is a plan view showing a device structure of a MISFET according to a fourth embodiment.

FIG. 31 is a plan view showing a device structure of the MISFET in the fourth embodiment. In FIG. 31, the MISFET $Q_M$ having a dual-gate structure is coupled to a source wiring SL and a drain wiring DL, which are laid out so as to be alternately positioned, thus forming an interdigitated array. Then, a first unit gate electrode G1 and a second unit gate electrode G2 are formed between the source wiring SL and the drain wiring DL. A source region (not shown in FIG. 31) of the MISFET $Q_M$ is coupled to the source wiring SL via a first plug PLG1. A drain region (not shown in FIG. 31) of the MISFET $Q_M$ is coupled to the drain wiring DL via a second plug PLG2.

Figure 32:
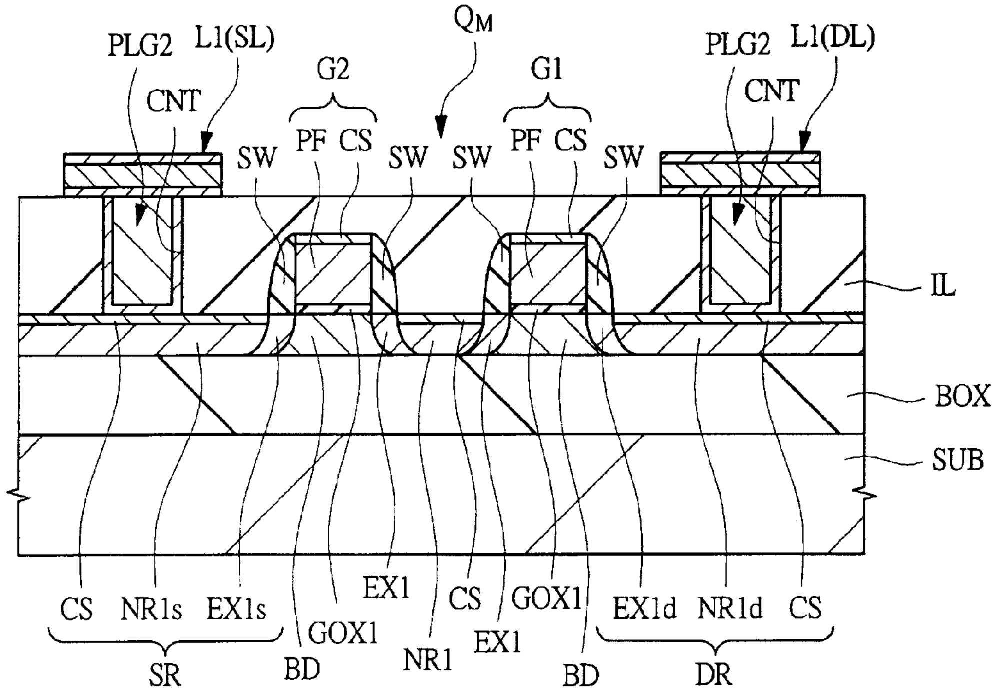
FIG. 32 is a cross sectional view illustrating a cross section of the MISFET according to the fourth embodiment.

A cross-sectional structure of the MISFET $Q_M$ of the dual-gate structure will next be explained. FIG. 32 is a cross sectional view showing the cross section of the MISFET $Q_M$. In FIG. 32, an embedded insulating layer BOX is formed over its corresponding semiconductor substrate (support substrate) SUB, and a silicon layer is formed over the embedded insulating layer BOX. An SOI substrate is formed by the semiconductor substrate SUB, the embedded insulating layer BOX, and the silicon layer. Then, the MISFET $Q_M$ is formed over the SOI substrate. A body region BD is formed in the silicon layer of the SOI substrate. The body region BD is formed from, for example, a p-type semiconductor region into which boron or other p-type impurity is introduced. A first gate insulating film GOX1 is formed over a first region of the body region BD, and the first unit gate electrode G1 is formed over the first gate insulating film GOX1. Likewise, the second gate insulating film GOX1 is formed over a second region of the body region BD, and the second unit gate electrode G2 is formed over the second gate insulating film GOX1.

The first and second gate insulating film GOX1 are formed from a silicon oxide film, for example. On the other hand, the first unit gate electrode G1 and the second unit gate electrode G2 are formed from a laminated film of a polysilicon film PF and a cobalt silicide film CS. The cobalt silicide film CS that configures parts of the first unit gate electrode G1 and the second unit gate electrode G2 is formed for reducing the resistances of the first unit gate electrode G1 and the second unit gate electrode G2.

Subsequently, a sidewall SW is formed in each of side walls on both sides of each of the unit gate electrodes G1 and G2. A first low concentration impurity diffusion region EX1*d* is formed in the silicon layer that is at the lower right of the first unit gate electrode G1. On the other hand, a second low concentration impurity diffusion region EX1*s* is formed in the silicon layer that is at the lower left of the second unit gate electrode G2. Then, a low concentration impurity diffusion region EX1 is formed in the silicon layer interposed between the first unit gate electrode G1 and the second unit gate electrode G2.

A high concentration impurity diffusion region NR1*d* is formed on the outer side of the low concentration impurity diffusion region EX1*d*, and a high concentration impurity diffusion region NR1*s* is formed on the outer side of the low concentration impurity diffusion region EX1*s*. A high concentration impurity diffusion region NR1 is formed in the center of the low concentration impurity diffusion regions EX1. A first layer of cobalt silicide film CS is formed in the surfaces of these high concentration impurity diffusion regions NR1*s*, NR1*d* and NR1. The source region SR is formed from the low concentration impurity diffusion region EX1*s*, the high concentration impurity diffusion region NR1*s*, and the first layer of cobalt silicide film CS. The drain region DR is formed from the low concentration impurity diffusion region EX1*d*, the high concentration impurity diffusion region NR1*d*, and the first layer of cobalt silicide film CS.

The low concentration impurity diffusion regions EX1*s*, EX1*d* and EX1 and the high concentration impurity diffusion regions NR1*s*, NR1*d* and NR1 are semiconductor regions into which an n-type impurity such as phosphorus or arsenic is introduced, wherein the concentration of the impurity introduced into the low concentration impurity diffusion regions EX1*s*, EX1*d* and EX1 is lower than that of the impurity introduced into the high concentration impurity diffusion regions NR1*s*, NR1*d* and NR1.

The MISFET $Q_M$ of the dual-gate structure in the first embodiment is configured as described above. A wiring structure formed over the MISFET $Q_M$ will be described below. In FIG. 32, an interlayer insulating film IL is formed so as to cover the MISFET $Q_M$ in the fourth embodiment. The interlayer insulating film IL is formed from a silicon oxide film, for example. Then, a first contact hole CNT reaching the source region SR, and a second contact hole CNT reaching the drain region DR are formed in the interlayer insulating film IL. A titanium/titanium nitride film and a tungsten film are embedded into the contact holes CNT to form the first and second plugs PLG1 and PLG2. The wiring L1 (source wiring SL, drain wiring DL) is formed over the interlayer insulating film IL in which the first plug PLG1 and the second plug PLG2 are formed. For example, the wiring L1 is formed from a laminated film of a titanium/titanium nitride film, an aluminum film, and a titanium/titanium nitride film. Further, a multilayer wiring is formed over the wiring L1, but this is not shown in FIG. 32. The MISFET $Q_M$ of the dual-gate structure in the fourth embodiment is formed in the above-described manner.

The advantage of the MISFET $Q_M$ of the dual-gate structure configured in this way resides in that its occupied area can be made smaller than that of the MISFET of the single-gate structure. Specifically, in the MISFET $Q_N$ of the single-gate structure shown in FIG. 23, the first plug PLG1 is formed between the two unit gate electrodes. In contrast, in the MISFET $Q_M$ of the dual-gate structure shown in FIG. 32, there is no need to ensure the plug forming area because no plug is formed between the two unit gate electrodes G1 and G2. Hence, the space between the first unit gate electrode G1 and the second unit gate electrode G2 can be narrowed. It is thus understood that in the MISFET $Q_M$ of the dual-gate structure, the occupied area can be made smaller than that for the MISFET $Q_N$ of the single-gate structure.

The following shows the advantage of the technical idea of the invention of the present application as applied to the MISFET $Q_M$ of the dual-gate structure. That is, it is assumed that the MISFETs $Q_{N1}$ through $Q_{N5}$ configuring the TX shunt transistor SH (TX) are respectively comprised of the MISFETs $Q_M$ of the dual-gate structure. In the plural MISFETs $Q_M$ of the dual-gate structure, the number of fingers (unit gate electrodes G1 and G2) is changed while the finger lengths thereof are set constant. Thus, the gate widths of the MISFETs $Q_M$ increase gradually from the MISFET $Q_M$ coupled to the side close to the common terminal GND (TX) to the MISFET $Q_M$ coupled to the side close to the transmission terminal TX. As a result, when the TX shunt transistor SH (TX) is OFF, the voltage amplitudes applied to the respective MISFETs $Q_{N1}$ through $Q_{N5}$ (plural MISFETs $Q_M$) configuring the TX shunt transistor SH (TX) can be made uniform even when the parasitic capacitances are taken into consideration.

Incidentally, although the fourth embodiment has explained the example in which the MISFETs $Q_{N1}$ through $Q_{N5}$ configuring the TX shunt transistor SH (TX) are comprised of the MISFETs $Q_M$ of the dual-gate structure, it is also possible to configure a part of the MISFETs $Q_{N1}$ through $Q_{N5}$ configuring the TX shunt transistor SH (TX) from the MISFETs $Q_N$ of the single-gate structure and configure another part thereof from the MISFETs $Q_M$ of the dual-gate structure. Thus, it is possible to form a hybrid antenna switch having both single-gate MISFETs and dual-gate MISFETs. For example, in the second embodiment seen in FIG. 6, one may use single-gate MISFETs for one of the shunt transistor SH (TX) and the series resistor SE (RX), and use dual-gate MISFETs for the other of the shunt transistor SH (TX) and the series resistor SE (RX).

While the invention made above by the present inventors has been described specifically on the basis of the preferred embodiments, the present invention is not limited to the embodiments referred to above. It is needless to say that various changes can be made thereto within the scope not departing from the gist thereof.

Although each of the above embodiments has explained the example in which the antenna switch is configured from the field effect transistors formed over the SOI substrate, the technical idea of the invention of the present application can be applied even to the case in which an antenna switch is configured from field effect transistors formed over a compound semiconductor substrate, for example. A semi-insulating substrate may be used as the compound semiconductor substrate.

The semi-insulating substrate may, for example, be formed from a GaAs substrate that is a compound semiconductor. That is, in a compound semiconductor having a large forbidden bandwidth, a deep level is formed inside a forbidden band when a certain kind of impurity is added thereto. Then, electrons and positive poles placed in the deep level are fixed, and an electron density in a conduction band or a hole density in a valence band becomes very low, so that the compound semiconductor becomes like an insulator. Such a substrate is called "a semi-insulating substrate". In the GaAs substrate, the deep level is formed by adding Cr, In, oxygen and the like or introducing arsenic excessively, so that the GaAs substrate assumes a semi-insulating substrate. According to the semi-insulating substrate, the parasitic capacitance to GND can be reduced. Even in such a case, however, the nonuniformity of the voltage amplitudes applied to the MISFETs coupled in series is suppressed by applying the technical idea of the invention of the present application, so that further generation of high-order harmonics can be suppressed.

Further, although each of the above embodiments has been explained with the field effect transistors typified by the MISFETs taken by way of example, the technical idea of the present invention can be applied even to a case where a junction FET (JFET), an HEMT or a bipolar transistor is used.

The present invention can be utilized widely in the industries for manufacturing semiconductor devices.

What is claimed is:

1. A semiconductor antenna switch comprising a transmission terminal, an antenna terminal, and a reception terminal, and further comprising:

(a) a plurality of first field effect transistors coupled in series between the antenna terminal and transmission terminal;

(b) a plurality of second field effect transistors coupled in series between the antenna terminal and the reception terminal, a first of the second field effect transistors being closest to the antenna terminal and a last of the second field effect transistors being closest to the reception terminal;

(c) a plurality of third field effect transistors coupled in series between the transmission terminal and a common terminal, a first of the third effect transistors being closest to the transmission terminal and a last of the third field effect transistors being closest to the common terminal; and (d) a fourth field effect transistor coupled between the reception terminal and the common terminal, wherein:

each of the third field effect transistors has a gate electrode, a source region, a drain region, and a first off capacitance indicative of a capacitance between the source and drain regions when said each of the third field effect transistors is OFF; and the first off capacitance of at least the first of the third field effect transistors is larger than the first off capacitance of the last of the third field effect transistors.

2. The semiconductor antenna switch according to claim 1, wherein a gate width of the first of the third field effect transistors is larger than a gate width of the last of the third field effect transistors.

3. The semiconductor antenna switch according to claim 1, wherein the first off capacitances increase monotonically from the last of the third field effect transistors to the first of the third field effect transistors.

4. The semiconductor antenna switch according to claim 3, wherein gate widths of the third field effect transistors increase monotonically from the last of the third field effect transistors to the first of the third field effect transistors.

5. The semiconductor antenna switch according to claim 4, wherein gate widths of the third field effect transistors increase on a linear function basis from the last of the third field effect transistors to the first of the third field effect transistors.

6. The semiconductor antenna switch according to claim 4, wherein gate widths of the third field effect transistors increase on a quadric function basis from the last of the third field effect transistors to the first of the third field effect transistors.

7. The semiconductor antenna switch according to claim 4, wherein:

each gate electrode of the third field effect transistors comprises a finger structure including a plurality of fingers which: are arranged side by side, are electrically coupled to one another, and have a common finger length;

the number of fingers in the gate electrodes of the third field effect transistors increases monotonically from the last of the third field effect transistors to the first of the third field effect transistors; and the common finger length is the same for all gate electrodes of the third field effect transistors.

8. The semiconductor antenna switch according to claim 4, wherein:

each gate electrode comprises a finger structure including a plurality of fingers which: are arranged side by side, are electrically coupled to one another, and have a common finger length;

the number of fingers is the same for all gate electrodes of the third field effect transistors; and the common finger length for the gate electrodes of the third field effect transistors increases monotonically from the last of the third field effect transistors to the first of the third field effect transistors.

9. The semiconductor antenna switch according to claim 1, wherein:

each of the second field effect transistors has a source region, a drain region, and a first off capacitance indicative of a capacitance between the source and drain regions when said each of the second field effect transistors is OFF; and the first off capacitance of at least the first of the second field effect transistors is larger than the first off capacitance of the last of the second field effect transistors.

10. The semiconductor antenna switch according to claim 9, wherein a gate width of the first of the second field effect transistors is larger than a gate width of the last of the second field effect transistors.

11. The semiconductor antenna switch according to claim 9, wherein the first off capacitances increase monotonically from the last of the second field effect transistors to the first of the second field effect transistors.

12. The semiconductor antenna switch according to claim 11, wherein gate widths of the second field effect transistors increase monotonically from the last of the second field effect transistors to the first of the second field effect transistors.

13. The semiconductor antenna switch according to claim 12, wherein gate widths of the second field effect transistors increase on a linear function basis from the last of the second field effect transistors to the first of the second field effect transistors.

14. The semiconductor antenna switch according to claim 12, wherein gate widths of the second field effect transistors increase on a quadric function basis from the last of the second field effect transistors to the first of the second field effect transistors.

15. The semiconductor antenna switch according to claim 1, wherein the pluralities of the first, second, third and fourth field effect transistors are formed over a silicon oxide insulator (SOI) substrate comprised of a support substrate, an embedded insulating layer formed over the support substrate and an active layer formed over the embedded insulating layer.

16. A radio frequency (RF) communication module comprising:

a first semiconductor chip comprising a first power amplifier; and a second semiconductor chip comprising a semiconductor antenna switch in accordance with claim 1; wherein an output of the first power amplifier is connected to the transmission terminal of said semiconductor antenna switch.

17. A portable phone comprising:

an antenna; and a semiconductor antenna switch in accordance with claim 1; wherein:

the antenna terminal of the semiconductor antenna switch is connected to the antenna.

18. A semiconductor antenna switch comprising a transmission terminal, an antenna terminal, and a reception terminal, and further comprising:

(a) a plurality of first field effect transistors coupled in series between the antenna terminal and the transmission terminal;

(b) a plurality of second field effect transistors coupled in series between the antenna terminal and the reception terminal, a first of the second field effect transistors being closest to the antenna terminal and a last of the second field effect transistors being closest to the reception terminal;

(c) a plurality of third field effect transistors coupled in series between the transmission terminal and a common terminal, a first of the third effect transistors being closest to the transmission terminal and a last of the third field effect transistors being closest to the common terminal; and (d) a fourth field effect transistor coupled between the reception terminal and the common terminal, wherein:

each of the third field effect transistors has a gate electrode, a source region, a drain region, and a first off capacitance indicative of a capacitance between the source and drain regions when said each of the third field effect transistors is OFF;

the off capacitances are the same for all the third field effect transistors; and a capacitive element is coupled between the source and drain regions of each of at least some of third field effect transistors, including between the source and drain regions of the first of the third field effect transistors.

19. The semiconductor antenna switch according to claim 18, wherein a capacitive element is coupled between the source and drain regions of a next-to-last of the third field effect transistors, and wherein the capacitance of the capacitive element coupled between the source and drain regions of the first of the third field effect transistors is larger than that of the capacitive element coupled between the source and drain regions of the next-to-last of the third field effect transistors.

20. The semiconductor antenna switch according to claim 18, wherein a capacitive element is coupled between source and drain regions of each of the third field effect transistors other than the last of the third field effect transistors, and wherein the capacitance increases monotonically from the capacitive element coupled between the source and drain regions of a next-to-last of the third field effect transistors to the capacitive element coupled between the source and drain regions of the first of the third field effect transistors.

21. The semiconductor antenna switch according to claim 20, wherein:

each of the third field effect transistors provided with a capacitive element has a combined capacitance comprising the off capacitance of that third field effect transistor and the capacitive element coupled between the source and drain regions of that third field effect transistor; and the combined capacitance of the third field effect transistors increases on a linear function basis from the next-to-last of the third field effect transistors to the first of the third field effect transistors.

22. The semiconductor antenna switch according to claim 20, wherein:

each of the third field effect transistors provided with a capacitive element has a combined capacitance comprising the off capacitance of that third field effect transistor and the capacitive element coupled between the source and drain regions of that third field effect transistor; and the combined capacitance of the third field effect transistors increases on a quadric function basis from the next-to-last of the third field effect transistors to the first of the third field effect transistors.

23. The semiconductor antenna switch according to claim 18, wherein:

each capacitive element is directly coupled between the source and drain regions.

24. The semiconductor antenna switch according to claim 18, wherein each capacitive element comprises:

a first capacitive element coupled between the source region of the third field effect transistor and the gate electrode of the third field effect transistor, and a second capacitive element coupled between the drain region of the third field effect transistor and the gate electrode of the third field effect transistor.

25. The semiconductor antenna switch according to claim 18, wherein:

each capacitive element is directly coupled between the source and drain regions; and the antenna switch further comprises:

a second capacitive element coupled between the source region of the third field effect transistor and the gate electrode of the third field effect transistor, and a third capacitive element coupled between the drain region of the third field effect transistor and the gate electrode of the third field effect transistor.

* * * * *